(12) United States Patent
Meier et al.

(10) Patent No.: US 12,229,909 B2
(45) Date of Patent: **\*Feb. 18, 2025**

(54) METHOD AND SYSTEM FOR DISPLAY OF AN ELECTRONIC REPRESENTATION OF PHYSICAL EFFECTS AND PROPERTY DAMAGE RESULTING FROM A PARAMETRIC NATURAL DISASTER EVENT

(71) Applicant: New Paradigm Group, LLC, Fort Lauderdale, FL (US)

(72) Inventors: Bradley I. Meier, Golden Beach, FL (US); Rik Basu, Morgan Hill, CA (US); Varun Bachalli, Bangalore (IN); Erich Anderson Peske, Tucson, AZ (US); Sabyasachi Basu, Morgan Hill, CA (US)

(73) Assignee: NormanMax Insurance Holdings, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,213

(22) Filed: Nov. 17, 2023

(65) Prior Publication Data

US 2024/0087259 A1 Mar. 14, 2024

Related U.S. Application Data

(63) Continuation of application No. 17/675,915, filed on Feb. 18, 2022, now Pat. No. 11,823,338.
(Continued)

(51) Int. Cl.
G06T 19/00 (2011.01)
G06T 19/20 (2011.01)

(52) U.S. Cl.
CPC ............ G06T 19/006 (2013.01); G06T 19/20 (2013.01)

(58) Field of Classification Search
None
See application file for complete search history.

(56) References Cited

U.S. PATENT DOCUMENTS

| 2006/0223637 | A1 | 10/2006 | Rosenberg |
| 2014/0368378 | A1 | 12/2014 | Crain et al. |
| 2019/0377102 | A1 | 12/2019 | Glassman et al. |

FOREIGN PATENT DOCUMENTS

CN 101980226 A 2/2011

OTHER PUBLICATIONS

Mitsuhara et al. "Expressing Disaster Situations for Evacuation Training Using Markerless Augmented Reality", Procedia Computer Science vol. 192, 01.10.2021. Retrieved on Aug. 4, 2022.
(Continued)

*Primary Examiner* — Robert J Craddock

(57) ABSTRACT

A method is provided for displaying an augmented reality (AR) representation of physical effects and property damage resulting from a parametric earthquake event. The method includes scanning, using one or more sensors of a user device, a scene in proximity to a user. The method also includes identifying a background and objects in the scene. The method further includes creating an AR background for the background of the scene and AR objects for the objects in the scene. In addition, the method includes receiving at least one seismic characteristic from the user through the display of the user device. The method additionally includes displaying at least one seismic effect on the AR objects and the AR background in the scene based on the at least one received seismic characteristic.

20 Claims, 36 Drawing Sheets

Related U.S. Application Data

(60) Provisional application No. 63/169,801, filed on Apr. 1, 2021, provisional application No. 63/152,739, filed on Feb. 23, 2021.

(56) References Cited

OTHER PUBLICATIONS

Pamenang et al. "An Augmented Reality Application for the Community Learning about the Risk of Earthquake in a Multi-storey Building Area", Emitter International Journal of Engineering Technology vol. 5, No. 2, Dec. 2017. Retrieved on Aug. 4, 2022.

Patent Cooperation Treaty: International Search Report and Written Opinion for PCT/US22/17152 (related application); Harry Kim; May 25, 2022; 13 pages.

Seymour & Lerhn "VR Earthquake in 360! Education in 360; Powers of Nature: Part 3", Youtube video, Sep. 20, 2019. Retrieved on Apr. 15, 2022.

Patent Cooperation Treaty: International Preliminary Report on Patentability of PCT/US22/17152 (related application); Yukari Nakamura; Sep. 7, 2023; 8 pages.

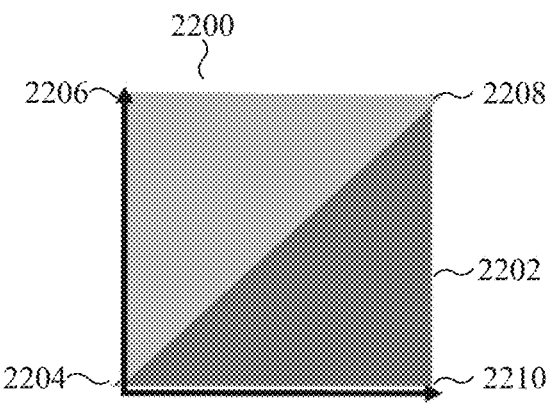
FIG. 22
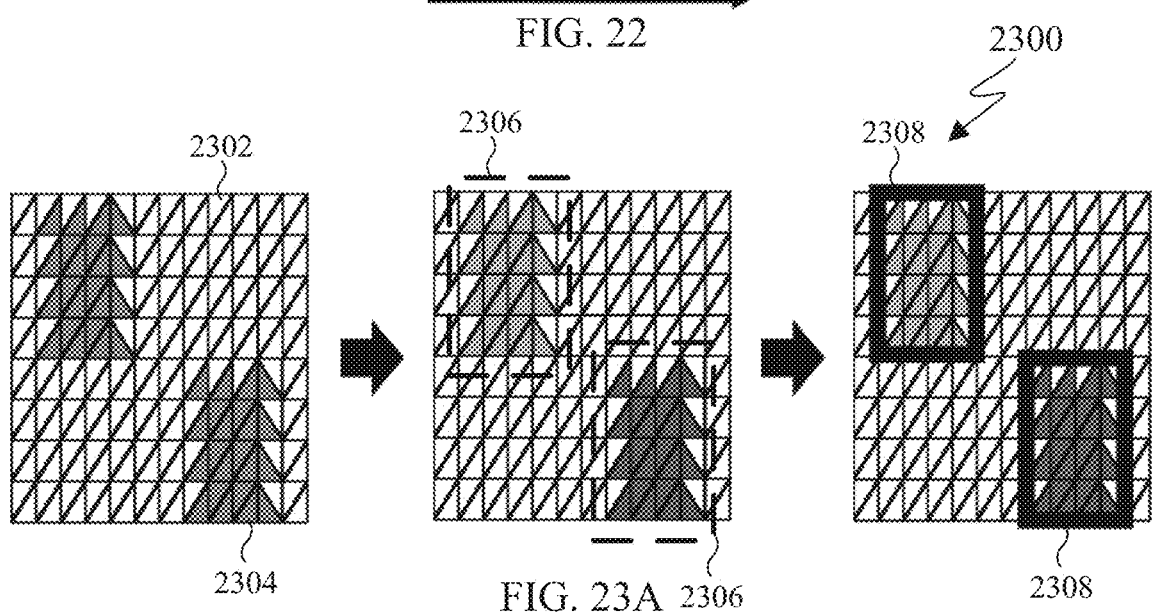
FIG. 23A
FIG. 23B

METHOD AND SYSTEM FOR DISPLAY OF AN ELECTRONIC REPRESENTATION OF PHYSICAL EFFECTS AND PROPERTY DAMAGE RESULTING FROM A PARAMETRIC NATURAL DISASTER EVENT

CROSS-REFERENCE TO RELATED APPLICATIONS

This application is a Continuation of U.S. patent application Ser. No. 17/675,915, filed Feb. 18, 2022, entitled METHOD AND SYSTEM FOR DISPLAY OF AN ELECTRONIC REPRESENTATION OF PHYSICAL EFFECTS AND PROPERTY DAMAGE RESULTING FROM A PARAMETRIC NATURAL DISASTER EVENT, issuing as U.S. Pat. No. 11,823,338 on Nov. 21, 2023, which claims the benefit of U.S. Provisional Application Ser. No. 63/152,739 filed on Feb. 23, 2021, and entitled METHOD AND SYSTEM FOR DISPLAY OF AN ELECTRONIC REPRESENTATION OF PHYSICAL EFFECTS AND PROPERTY DAMAGE RESULTING FROM A PARAMETRIC EARTHQUAKE EVENT. U.S. patent application Ser. No. 17/675,915 also claims the benefit of U.S. Provisional Application No. 63/169,801, filed on Apr. 1, 2021, entitled METHOD AND SYSTEM FOR DISPLAY OF AN ELECTRONIC REPRESENTATION OF PHYSICAL EFFECTS AND PROPERTY DAMAGE RESULTING FROM A PARAMETRIC NATURAL DISASTER EVENT. U.S. application Ser. Nos. 17/675,915, 63/152,739 and 63/169,801 are incorporated by reference in their entireties.

TECHNICAL FIELD

The present invention relates to techniques and technology for producing an electronic representation of the effects of a parametric earthquake event on a specific property comprising one or more structures, and more specifically to methods and systems of processing video and still images of the specific property taken during normal conditions to show the calculated movement and damage to the respective structures of the property attributable to a parametric earthquake event.

BACKGROUND

The public is familiar with fictitious depictions of earthquakes from motion pictures and even the depiction of actual earthquake events in documentary footage. However, such depictions do not serve to inform the public regarding the likely damage to their own property (both real and personal property) in the event of an earthquake event. Better information regarding the effects of earthquake events on property at a specific geographic location and the likely property damage resulting from such earthquake events can be useful in assessing the need for earthquake preparation.

A need therefore exists, for a system that can identify structures comprising property pictured at a specific geographic location and display an electronic representation, e.g., a video program and/or audiovisual program, showing a representation of the motion of the respective structures caused by a seismic event having known parameters, e.g., location, strength and/or duration.

A need further exists, for a system that can identify structures comprising a property pictured at a specific geographic location and display an electronic representation, e.g., still photo images, a video program and/or an audiovisual program showing a representation of damage to the respective structures caused by a seismic event having known parameters, e.g., location, strength and/or duration.

SUMMARY

In one aspect, a system receives images of property at a specified geographic location. The system processes, using an image recognition processor, the received images and identifies one or more structures comprising the property. The system retrieves parametric data regarding a designated seismic event. The system defines a key data pair corresponding to the specified geographic location and the designated seismic event. The system determines key attributes relating the key data pair. The system determines, using a computer or processor, values of a deemed seismic action at the specified geographic location by modifying the parametric data for the designated seismic event using the key attributes. The system produces images showing an electronic representation the one or more structures comprising the property moving in accordance with the deemed seismic action.

In one embodiment thereof, the images comprise a video program showing an electronic representation of the one or more structures moving in accordance with the deemed seismic action.

In another embodiment thereof, the images comprise an audiovisual program showing an electronic representation of the one or more structures moving in accordance with the deemed seismic action.

In yet another embodiment thereof, a key attribute determined by the system is the distance from the designated seismic event to the specified geographic location.

In still another embodiment thereof, a key attribute determined by the system is the intervening geology between the designated seismic event to the specified geographic location.

In a further embodiment thereof, the system assigns to one or more of the identified structures a respective structure attribute. The system determines values of deemed structure action for each respective structure by modifying the values of the deemed seismic action at the specified geographic location using the respective structure attribute. The system produces images showing an electronic representation of the one or more structures moving in accordance with the deemed seismic action and as further modified by the deemed structure action.

In a yet further embodiment thereof, the respective structure attribute is correlated to a determined mass of the structure.

In a still further embodiment thereof, the respective structure attribute is correlated to a determined resonant frequency of the structure.

In another aspect, a system receives images of property at a specified geographic location. The system processes, using an image recognition processor, the received images and identifies one or more structures comprising the property. The system receives parametric data regarding a designated seismic event. The system defines a key data pair corresponding to the specified geographic location and the designated seismic event. The system determines key attributes relating the key data pair. The system determines, using a computer or processor, values of a deemed seismic action at the specified geographic location by modifying the parametric data for the designated seismic event using the key attributes. The system determines a respective deemed damage corresponding to each structure based on the deemed seismic action. The system produces images showing an electronic representation the one or more structures comprising the property modified with respective electronic representations of the respective deemed damage.

In one embodiment thereof, the images comprise a video program showing an electronic representation of the one or more structures modified to show the respective deemed damage.

In another embodiment thereof, the images comprise an audiovisual program showing an electronic representation of the one or more structures modified to show the respective deemed damage.

In yet embodiment thereof, the images comprise one or more still images showing an electronic representation of the one or more structures modified to show the respective deemed damage.

In still another embodiment thereof, a key attribute determined by the system is the distance from the designated seismic event to the specified geographic location.

In a further embodiment thereof, a key attribute determined by the system is the intervening geology between the designated seismic event to the specified geographic location.

In a yet further embodiment thereof, the system assigns to one or more of the identified structures a respective structure attribute. The system determines values of deemed structure damage for each respective structure by modifying the values of the deemed seismic action at the specified geographic location using the respective structure attribute. The system produces images showing an electronic representation of the one or more structures modified with the respective deemed damage corresponding to each structure based on the deemed seismic action and further corresponding to the respective structure attribute.

In a still further embodiment thereof, the respective structure attribute is correlated to a determined mass of the structure.

In another embodiment thereof, the respective structure attribute is correlated to a determined resonant frequency of the structure.

In yet another embodiment thereof, the respective structure attribute is correlated to a construction material of the structure.

In a third aspect, a method is provided for displaying an augmented reality (AR) representation of physical effects and property damage resulting from a parametric earthquake event. The method includes scanning, using one or more sensors of a user device, a scene in proximity to a user. The method also includes identifying a background and objects in the scene. The method further includes creating an AR background for the background of the scene and AR objects for the objects in the scene. The method further includes displaying the AR background and the AR objects on the display of the user device. In addition, the method includes receiving at least one seismic characteristic from the user through the display of the user device. The method additionally includes displaying at least one seismic effect on the AR objects and on the AR background in the scene displayed on the user device based on the at least one received seismic characteristic.

In one embodiment thereof, the background is a wall and the objects are picture frames.

In another embodiment thereof, displaying the at least one seismic effect on the AR objects comprises independently applying the at least one seismic effect on the AR objects and the AR background.

In another embodiment thereof, displaying the at least one seismic effect on the AR objects comprises independently applying the at least one seismic effect using a first effect type on the AR objects and using a second effect type on the AR background.

In yet another embodiment thereof, the first effect type is applying an AR oscillation and the second effect type is generating an AR crack.

In another embodiment thereof, independently applying the at least one seismic effect using a first effect type on the AR objects and using a second effect type on the AR background comprises selecting the first effect type based on a first identity of the AR objects and selecting the second effect type based on a second identity of the AR background.

In yet embodiment thereof, displaying the at least one seismic effect on the AR background comprises generating an AR crack on the AR background.

In yet another embodiment thereof, displaying the at least one seismic effect on the AR objects comprises generating an AR crack on at least one of the AR objects.

In yet another embodiment thereof, displaying the at least one seismic effect on the AR objects comprises applying an AR oscillation on at least one of the AR objects.

In still another embodiment thereof, displaying the at least one seismic effect on the AR objects comprises breaking an AR object into two or more AR partial objects, wherein each of the AR partial objects is smaller than the AR object.

In still another embodiment thereof, breaking the AR object into two or more AR partial objects comprises selecting respective sizes for the AR partial objects such that a cumulative size of the two or more partial objects is equal to a size of the AR object.

In a further embodiment thereof, displaying the at least one seismic effect on the AR objects comprises generating an AR crack on the AR background.

In a further embodiment thereof, generating an AR crack on the AR background comprises adding dynamic shading to the AR crack simulating parallax effects based on point of view.

In a yet further embodiment thereof, the method further includes displaying a control for a seismic intensity as one of the at least one seismic characteristic.

In a fourth aspect, a non-transitory computer readable medium is provided for displaying an augmented reality (AR) representation of physical effects and property damage resulting from a parametric earthquake event. The non-transitory computer readable medium contains instructions that when executed cause a processor to scan, using one or more sensors of a user device, a scene in proximity to a user. The non-transitory computer readable medium also contains instructions that when executed cause a processor to identify a background and objects in the scene. The non-transitory computer readable medium further contains instructions that when executed cause a processor to create an AR background for the background of the scene and AR objects for the objects in the scene. The non-transitory computer readable medium further contains instructions that when executed cause a processor to display the AR background and the AR objects on the display of the user device In addition, non-transitory computer readable medium contains instructions that when executed cause a processor to receive at least one seismic characteristic from the user through the display of the user device. The non-transitory computer readable medium additionally contains instructions that when executed cause a processor to display at least one seismic effect on the AR objects and on the AR background in the scene displayed on the user device based on the at least one received seismic characteristic.

In one embodiment thereof, the background is a wall and the objects are picture frames.

In another embodiment thereof, the instructions when executed cause the processor to display the at least one seismic effect on the AR objects comprise instructions that when executed cause the processor to independently apply the at least one seismic effect on the AR objects and the AR background.

In yet embodiment thereof, the instructions when executed cause the processor to display the at least one seismic effect on the AR objects comprise instructions that when executed cause the processor to generate a crack on at least one of the AR objects.

In still another embodiment thereof, the instructions when executed cause the processor to display the at least one seismic effect on the AR objects comprise instructions that when executed cause the processor to break an AR object into two or more AR partial objects. A cumulative size of the two or more partial objects is equal to a size of the AR object.

In a further embodiment thereof, the instructions when executed cause the processor to display the at least one seismic effect on the AR objects comprise instructions that when executed cause the processor to generate a crack on the AR background.

In a yet further embodiment thereof, the instructions when executed further cause the processor to display a control for a seismic intensity as one of the at least one seismic characteristic.

In a fifth aspect, a user device is provided for displaying an augmented reality (AR) representation of physical effects and property damage resulting from a parametric earthquake event. The user device includes one or more sensors, a display, and a processor operably couple to the one or more sensors and the display. The one or more sensors are configured to scan a scene in proximity to a user. The display is configured to display the scene. The processor is configured to identify a background and objects in the scene. The processor is also configured to create an AR background for the background of the scene and AR objects for the objects in the scene. The processor is further configured to display the AR background and the AR objects on the display of the user device. The processor is further configured to receive at least one seismic characteristic from the user through the display of the user device. The processor is additionally configured to display at least one seismic effect on the AR objects and on the AR background in the scene displayed on the user device based on the at least one received seismic characteristic.

In one embodiment thereof, the background is a wall and the objects are picture frames.

In another embodiment thereof, the processor is further configured to independently apply the at least one seismic effect on the AR objects and the AR background.

In another embodiment thereof, the processor is further configured to apply the at least one seismic effect using a first effect type on the AR objects and using a second effect type on the AR background.

In yet another embodiment thereof, the first effect type is applying an AR oscillation and the second effect type is generating an AR crack.

In another embodiment thereof, independently applying the at least one seismic effect using a first effect type on the AR objects and using a second effect type on the AR background comprises selecting the first effect type based on a first identity of the AR objects and selecting the second effect type based on a second identity of the AR background.

In yet another embodiment thereof, displaying the at least one seismic effect on the AR background comprises generating an AR crack on the AR background.

In yet another embodiment thereof, to display the at least one seismic effect on the AR objects, the processor is further configured to generate an AR crack on at least one of the AR objects.

In still another embodiment thereof, to display the at least one seismic effect on the AR objects, the processor is further configured to break an AR object into two or more AR partial objects, wherein each of the AR partial objects is smaller than the AR object.

In still another embodiment thereof, to display breaking the AR object into two or more AR partial objects, the processor is configured to select respective sizes for the AR partial objects such that a cumulative size of the two or more partial objects is equal to a size of the AR object.

In a further embodiment thereof, to display the at least one seismic effect on the AR objects, the processor is further configured to generate an AR crack on the AR background.

In a further embodiment thereof, to generate an AR crack on the AR background, the processor is further configured to add dynamic shading to the AR crack simulating parallax effects based on point of view.

In a yet further embodiment thereof, the processor is further configured to display a control for a seismic intensity as one of the at least one seismic characteristic.

In a sixth aspect, a method is provided for displaying an augmented reality (AR) representation of physical effects and property damage resulting from a parametric earthquake event including a damage inventory and assessment. The method includes scanning, using one or more sensors of a user device, a scene in proximity to a user. The method also includes identifying a background and objects in the scene. The method further includes determining a number of the objects identified in the scene. The method further includes determining an area of the background identified in the scene. The method further includes creating an AR background for the background of the scene and AR objects for the objects in the scene. The method further includes displaying the AR background and the AR objects on the display of the user device. In addition, the method includes receiving at least one seismic characteristic from the user through the user device. The method additionally includes displaying at least one seismic effect on the AR objects and on the AR background in the scene displayed on the user device based on the at least one received seismic characteristic. The method further includes determining a seismic damage factor based on the at least one received seismic characteristic. The method further includes determining an estimated object damage amount for the objects identified in the scene based on the determined number of objects and the determined seismic damage factor. The method further includes determining an estimated structure damage amount for the background identified in the scene based on the determined area of the background and the determined seismic damage factor.

In one embodiment, determining an estimated object damage amount further includes assigning a respective initial value to each respective object identified in the scene, determining a respective final value for each object based a respective assigned value and the respective determined seismic damage factor, and totaling the respective differences between the respective initial values and the respective final values for all the respective objects.

In another embodiment, the method further includes displaying the estimated object damage amount to the user.

In yet another embodiment, determining an estimated structure damage amount further includes assigning an initial unit value to the background identified in the scene, determining a respective final unit value for the background based an assigned unit value and the determined seismic damage factor, and multiplying the differences between the initial unit value and the final unit value by the determined area of the background.

In still another embodiment, the method further includes displaying the estimated structure damage amount to the user.

In another embodiment, the method further includes categorizing each identified object into one of at least two predetermined object classes, wherein a first initial value is assigned to each of the objects categorized in the first predetermined object class, and a second initial value is assigned to each of the objects categorized in the second predetermined object class.

In yet another embodiment, the method further includes displaying to the user a list of the respective objects identified in the scene and the respective initial values, allowing the user to provide a respective custom value for each respective object, and replacing the respective initial value with the respective custom value as the respective assigned value used to determine the respective final value of the respective object.

In still another embodiment, the method further includes displaying to the user the initial unit value for the background, allowing the user to provide a custom unit value for the background, and replacing the initial unit value with the custom unit value as the assigned unit value used to determine the final unit value for the estimated structure damage.

In another embodiment, the method further includes creating a first list of objects identified in a first scene and their respective assigned values, creating a second list of objects identified in a second scene and their respective assigned values, and combining the first list and the second list into a consolidated object list including all the object identified in the first scene and in the second scene and their respective assigned values.

In yet another embodiment, the method further includes using the consolidated object list to determine a consolidated object damage value for all the objects identified in the first scene and in the second scene and displaying the consolidated object damage value to the user.

BRIEF DESCRIPTION OF THE DRAWINGS

For a more complete understanding, reference is now made to the following description taken in conjunction with the accompanying Drawings in which:

FIG. 22 illustrates an example meshes for assigning to a plane in accordance with this disclosure;

FIGS. 23A and 23B illustrate an example object extraction from mesh in accordance with this disclosure;

DETAILED DESCRIPTION

Figure 1:
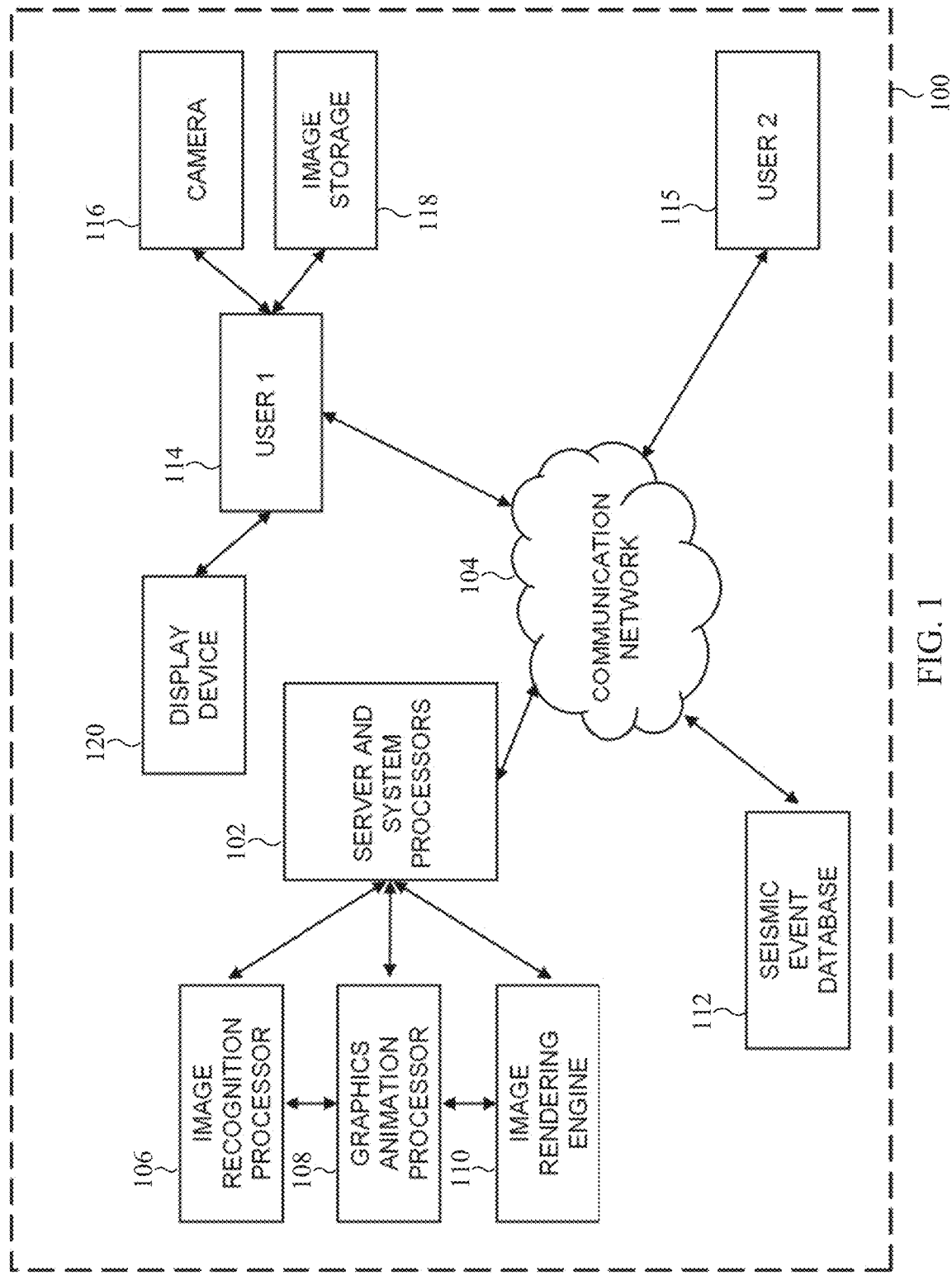
FIG. 1 is a block diagram of a system for display of an electronic representation of physical effects and property damage resulting from a parametric earthquake event in accordance with this disclosure.

Referring now to the drawings, wherein like reference numbers are used herein to designate like elements throughout, the various views and embodiments of method and systems for display of an electronic representation of physical effects and property damage resulting from a parametric natural disaster event are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, there is illustrated a system 100 for display of an electronic representation of physical effects and property damage resulting from a parametric earthquake event in accordance with one aspect. Unless otherwise noted, in this application the terms "parametric earthquake event" and "parametric seismic event" have the same meaning. A parametric earthquake event is a set of parameters and values for defining an earthquake event in terms of scientific principles, e.g., physics and geological principles. Such parameters can include, but are not limited to, date, time, epicenter location, hypocenter location (i.e., focus), duration, magnitude, peak ground acceleration ("PGA"), and maximum shaking intensity ("SI"), maximum ground amplitude, mean ground amplitude, shaking frequency, soil type, rock type and fault classification. A parametric earthquake event can include some or all parameter values measured during an actual, i.e., "historical" earthquake event, but can also include some or all parameters values selected by a user. The system 100 includes a system server 102 or computing device. The system server 102 contains one or more processors, RAM memory, storage units and communication interfaces for sending and receiving data to and from other devices. The system server 102 may comprise a single machine or multiple machines, including virtual machines resident on "cloud servers." The system server 102 is operably connected to a communication network 104 and to one or more subsystems, e.g., an image recognition processor 106, a graphics animation processor 108 and/or an image rendering engine 110. In some embodiments, the communication network 104 is the internet; however, the communication network 104 can be any type of network that allows the system server 102 and subsystems 106, 108 and 110 to communicate with one another and with a user device 114. In the embodiment illustrated in FIG. 1, the server 102 is directly connected to the subsystems 106, 108 and 110; however, in other embodiments some or all of the subsystems may be connected to the server via the communication network 104. In some embodiments, the subsystems 106, 108 and 110 can communicate directly with one another for improved data transfer.

The image recognition processor 106 can include or incorporate an image labeling or annotation tool (i.e., "labeling tool"). The labeling tool can be used to process and label the images for bounding box object detection and segmentation so that the image is readable by machines. In some embodiments, the labeling tool can utilize human assistance and in other embodiments the labeling tool can operate solely with machine learning or artificial intelligence processes. In some embodiments, different image labeling tools may be used for processing images of different image types (e.g., interior images, exterior images, etc.). Using the image labeling tools, the various objects in the provided image (e.g., user image 300, exterior image 1100, interior image 1700) can be labeled for specific purposes. In some embodiments, labeled objects can be selected for replacement by a computer graphic object (e.g., 2D sprite or 3D polygon), which can be moved on-screen and otherwise manipulated as a single entity, e.g., for purposes of event animation. In some embodiments, labeled objects may be classified into different types or categories of objects for different purposes. For example, in some embodiments, labeled objects can be categorized for properties relating to event animation, e.g., movable-type objects, bendable-type objects, breakable-type objects, waterproof-type objects, water damageable-type objects, etc. In other embodiments, labeled objects can be categorized for properties relating to inventory or damage assessment, e.g., table-type objects, chair-type objects, window-type objects, hanging art-type objects, TV/computer screen-type objects. Such classification may be performed by the image recognition processor 106 or by another processor, e.g., the system processor 102 or graphics animation processor 108. The image labeling tools can use known or future-developed detection techniques for detection of the object including, but not limited to, semantic, bounding box, key-point and cuboid techniques.

A seismic event database 112 is operably connected to the server 102, either via the communication network 104 or directly. The seismic event database 112 stores parametric seismic event data corresponding to one or more earthquakes or other seismic events. The parametric seismic event data can include, but is not limited to, values for the following parameters: event name, event date, event epicenter location, event focus (i.e., hypocenter) location, event duration, event magnitude, event PGA, event maximum shaking intensity ("SI"), event maximum ground amplitude, event mean ground amplitude, and event shaking frequency for each seismic event. The seismic events data in the seismic event database 112 may be actual historical earthquake data, "relocated" earthquake data (i.e., where the majority of the data corresponds to a historical earthquake, but the epicenter/hypocenter location is changed to a different location) or hypothetical earthquake data specified by a user or otherwise generated. In some embodiments, the seismic event database 112 can be located within the server 102 or one of the subsystems. In some embodiments, the seismic event database 112 can include data and/or values from public or private earthquake reporting agencies, such as the U.S. Geological Survey.

User devices 114, 115 can connect to the system 100 through the communication network 104. The user devices 114, 115 can be mobile devices such as mobile phones, tablets, laptop computers or they can be stationary devices such as desktop computers or smart appliances including, but not limited to, smart televisions. In some embodiments, aspects of the current system 100 may include downloadable software or "apps" resident on the user devices 114, 115 and/or non-downloadable software (e.g., "cloud based software") that remains resident on the server 102 or other elements of the system 100 and is accessed by the user device 114 via a web browser or other network interface.

Using the user devices 114, 115, system users can upload images of actual property via the network 104 to the server 102. The images of actual property can be captured using a camera 116 on the first user device 114 or from images stored in memory 118, e.g., a computer memory, hard drive, flash drive or other data storage technology. The images can be video programs, audiovisual programs and/or single or multiple still photo images. User devices 114 can also transmit additional information to the server 102 regarding the images, including, but not limited to, the geographic location of the property in the images (either entered by the user as text, captured via GPS or wireless location information on the user device 114, or captured vis geotagging information on the image file), the address of the property in the images, the name and/or other contact information of the user, a desired parametric seismic event and/or desired seismic parameters to be used in creating a parametric seismic event. Desired seismic parameters can include strength of the seismic event, duration of the seismic event, etc. Each of the seismic parameters can be input on the user devices 114, 115 by any suitable means. For example, the seismic parameters can be input or selected using a predetermined list, a slider associated with different values of the seismic parameters, a knob, a number entry. The inputs can be physical components on the user device 114, 115 or virtual representations on a display 120 of the user device 114, 115.

The system 100 processes, using an image recognition processor 106, the received images and identifies one or more structures comprising the property. The system 100 retrieves parametric data regarding a designated seismic event from the seismic event database 112. The system 100 defines a key data pair corresponding to the specified geographic location and the designated seismic event. The system 100 determines key attributes relating the key data pair. The key attributes correlate to how the parametric seismic data changes for distant geographic locations (i.e., at a distance from the event). In some embodiments, the values of key attributes are determined based principles known in physics and/or geology including, but not limited to principles of seismic attenuation, resonant vibration and/or soil behavior factors. In some embodiments, the values of key attributes are determined based on seismic attenuation factors and the distance between the property and the event center. In some embodiments, the values of key attributes are determined based on resonant vibration factors, the shaking frequency of the event, and the mass and/or resonant frequency of structures. In some embodiments, the values of key attributes are determined based on soil behavior factors and the soil at the property location, the event center, and/or at intervening geological features. Some key attributes may vary in direct (i.e., linear) proportion to the distance between the geographic location of the property/structure and the seismic event center, whereas other key attributes may vary according to reciprocal square of distance, logarithmic decay of distance or other mathematical functions relating to the distance. In some embodiments, the values of key attributes are selected by a user. Other key attributes may vary depending on other factors such as intervening geological features rather than distance. The system 100 determines, using a computer such as the system processor 102, values of a deemed seismic action at the specified geographic location by modifying the parametric data for the designated seismic event using all relevant key attributes. In some embodiments, multiple sets of values of the key attributes are predetermined. In this case, the system processor 102 prepare a plurality of videos each combination of key attributes for each value of the key attributes.

Figure 2:
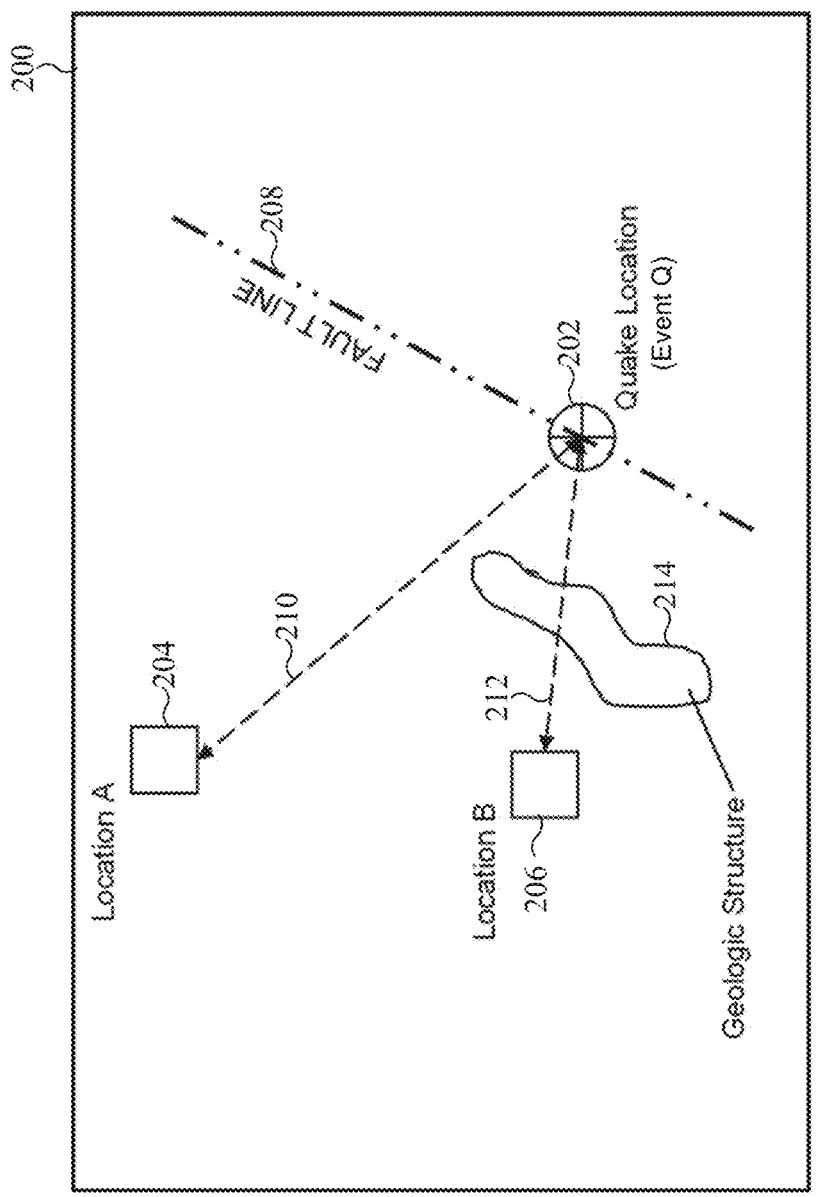
FIG. 2 is a map showing the position of a parametric earthquake event and several geographic locations.

Referring now also to FIG. 2, there is illustrated a map 200 showing the position of the epicenter of an exemplary parametric earthquake event 202 ("Event Q"), a first exemplary geographic location 204 ("Location A") and a second exemplary geographic location 206 ("Location B"). In the map 200, the epicenter of parametric Event Q is positioned on a geological fault line 208; however, in other embodiments the subject event can be positioned at any location as dictated by the parametric data values. The system 100 defines a key data pair corresponding to each pair of one specified geographic location (i.e., the location of the structures/property received) and one designated seismic event. For example, Location A and Event Q form a first key data pair for showing deemed motion and/or deemed damage to properties/structures at Location A due to Event Q, and Location B and Event Q form a second key data pair for showing deemed motion and/or deemed damage to properties/structures at Location B due to Event Q. The parametric seismic data for the event 202 can be obtained from the seismic event database 112 and can include relevant parametric data for the event including, but not limited to, event name, event date, event focus location, event duration, event magnitude, event PGA and event SI.

The system 100 can determine key attributes associated with each key data pair. The key attributes can relate to factors that change the effect of the respective parametric seismic event of the key data pair on the respective geographic location of the same key data pair. As illustrated in FIG. 2, the system 100, e.g., using the system processor 102, can determine a respective distance between the parametric seismic event 202 and each respective geographic location 204, 206 associated with respective received property images and assign a respective key attribute based on the respective determined distance. For example, in FIG. 2, the distance between the epicenter of Event Q and Location A is shown by line 210, while the distance between Event Q and Location B is shown by line 212. Thus, the system 100 may assign a first distance key attribute to the first key data pair (A, Q) based on the distance 210, and assign a second distance key attribute to the second key data pair (B, Q) based on the distance 212. In some embodiments, the distance from the geographic locations 204, 206 to the focus (hypocenter) location of the event 202 can be used instead of the distance to the epicenter location. In some embodiments, the system 100 can detect that the path between the position of the event 202 and the geographic location 204, 206 of a property/structure crosses an intervening geological feature 214 that can change the effects of the seismic event. In the embodiment of FIG. 2, the path between the second key data pair (B, Q) crosses an intervening geological feature 214. The system 100 may assign a geologic key attribute to the second key data pair (B, Q) based on a distance of the intervening geological feature 214, whereas the first key data pair (A, Q) would not receive a geologic key attribute. In some embodiments, the system 100 can modify the parametric seismic data using all key attributes associated with the key data pair to determine the deemed seismic action and/or the deemed damage on structures at the respective geographic locations 204, 206. For example, the system 100 in the example of FIG. 2 can modify the parametric seismic data for event 202 in accordance with both distance key attributes and intervening geological feature key attributes (where applicable) to determine the deemed seismic action and deemed damage on structures at the respective geographic locations 204 and 206.

The system 100 produces images showing an electronic representation(s) for the one or more structures comprising the property moving in accordance with the deemed seismic action. In some embodiments, the electronic representation(s) of the structure can be produced using a graphics animation processor 108 and an image rendering engine 110. In some embodiments, the images comprise a video program showing an electronic representation(s) of the one or more structures moving with the deemed seismic action. In another embodiment, the images comprise an audiovisual program showing an electronic representation of the one or more structures moving with the deemed seismic action.

In some embodiments, the system 100 assigns to one or more of the identified structures a respective structure attribute. In some embodiments, the values of structure attributes are determined based principles known in physics and/or engineering including, but not limited to principles of vibrational loads, fatigue failure, strength of materials and construction methods and failure analysis. The system 100 determines values of deemed structure action for each respective structure by modifying the values of the deemed seismic action at the specified geographic location using the respective structure attribute. The system 100 produces images showing an electronic representation of the one or more structures moving in accordance with the deemed seismic action and as further modified by the deemed structure action. In some embodiments, the structure attribute is correlated to a determined mass of the structure. In other embodiments, the respective structure attribute is correlated to a determined resonant frequency of the structure. In some embodiments, the structure attribute is correlated the construction material of the structure. In some embodiments, the structure attribute is correlated the construction method type of the structure.

Figure 3:
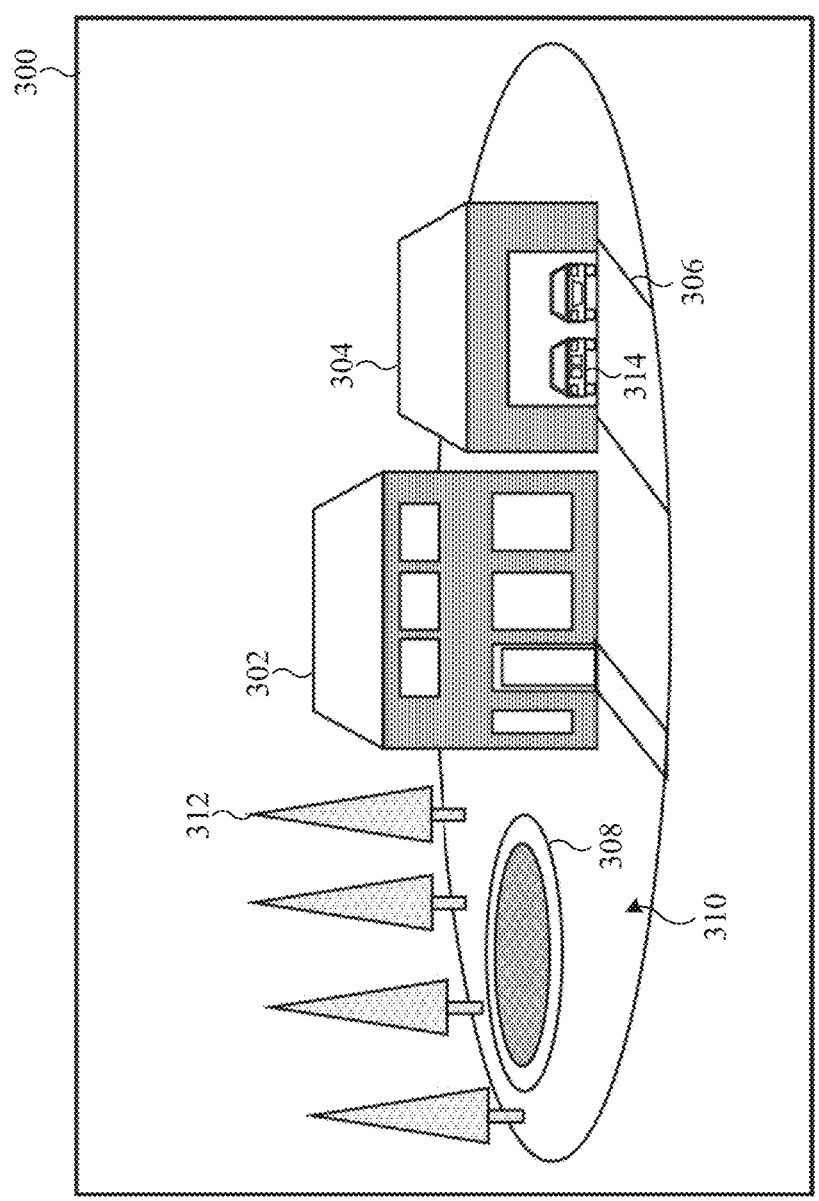
FIG. 3 shows an image of an actual property comprising multiple structures.

Referring now to FIG. 3, there is shown an exemplary image 300 of a property disposed at a geographic location, such as first geographic location 204 or second geographic location 206. The image 300 shows numerous man-made structures including a house 302, a garage 304, a driveway 306, a pool 308, natural structures including a yard 310 and trees 312, and personal property items including automobiles 314. A user of the system 100 takes the image 300 of the property and transmits it from a user device 114 to the system processor 102 via communication network 104. In some embodiments, the image 300 may be a single image. In other embodiments, the image 300 may comprise a plurality or series of images such as a video program. The system processor 102 receives the image(s) 300 of the property and sends them an image recognition processor 106. Using the image recognition processor 106, the received image(s) 300 are processed to identify the one or more structures comprising the property using image recognition technology and/or artificial intelligence or machine learning technology. The system 100 can receive parametric data regarding a designated seismic event from the seismic event database 112. The system 100 can define a key data pair corresponding to the specified geographic location of the property shown in the image 300 and the designated seismic event. The system 100 can determine, using the system processor 102, values of a deemed seismic action at the specified geographic location of the property shown in the image 300 by modifying the parametric data for the designated seismic event using the key attributes.

Figure 4:
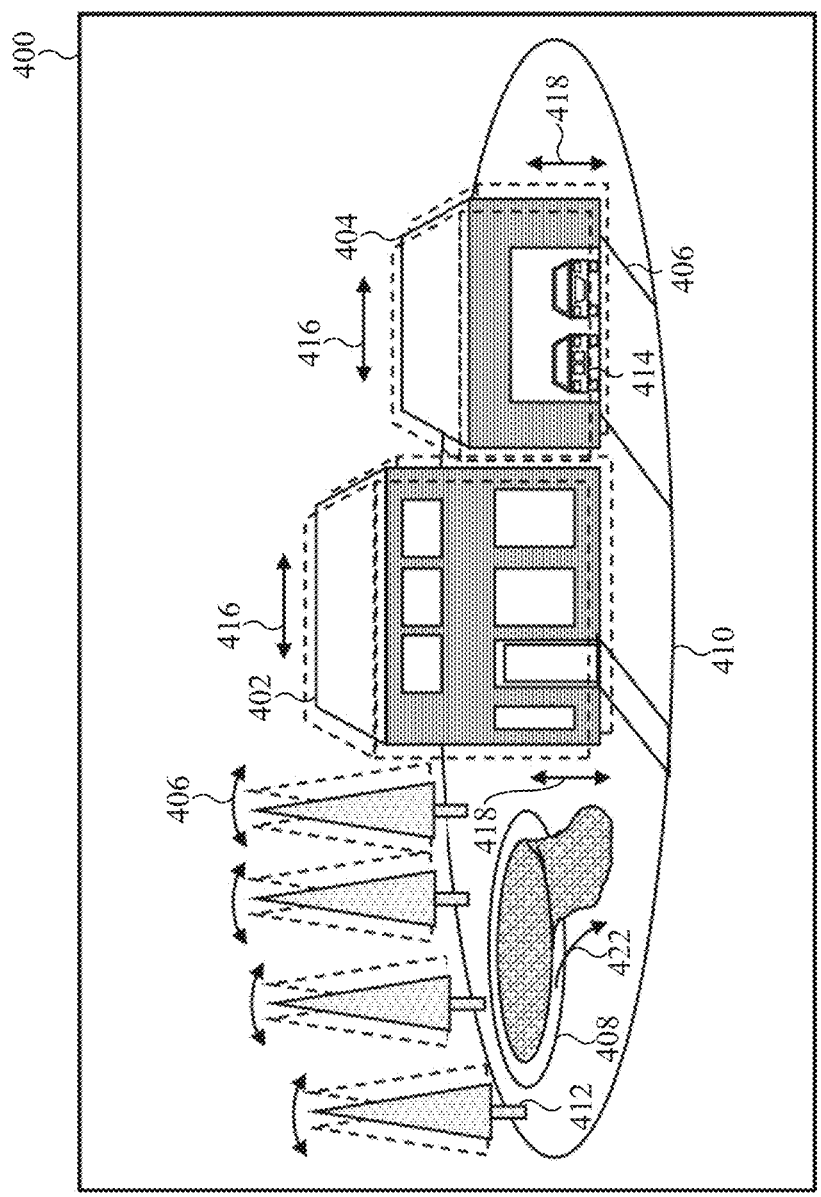
FIG. 4 shows an image of an electronic representation of the multiple structures of the property of FIG. 3 moving in accordance with the deemed seismic action from a parametric earthquake event.

Referring now to FIG. 4, in some embodiments the system 100 can produce images 400 showing an electronic representation 402, 404, 406, 408, 410, 412, and 414 of the one or more structures 302, 304, 306, 308, 310, 312 and 314 comprising the property moving in accordance with the deemed seismic action at the specified geographic location. For purposes of illustration, the representation of movement in images 400 is denoted by broken lines adjacent each structure. For example, the house 302 and garage 304 are displayed with horizontal oscillation 416 and the vertical oscillation 418 in accordance with their respective deemed seismic action. The trees 312 are shown oscillating with bending (pendulum) motion 420 in accordance with their respective deemed seismic action. The pool 308 is shown with splashing and overflowing water 422 in accordance with its respective deemed seismic action. The electronic representations 402, 404, 406, 408, 410, 412, and 414 of the respective moving structures 302, 304, 306, 308, 310, 312, and 314 can be modeled by the graphics animation processor 108 using the respective deemed seismic action and rendered by the image rendering engine 110 based on the respective structures identified in the original image 300.

After producing the image of the electronic representations 400, 402, 404, 406, 408, 410, 412, and 414 of the one or more structures 302, 304, 306, 308, 310, 312, and 314 comprising the property moving in accordance with the deemed seismic action at the specified geographic location, the system 100 can transmit the images 400 back to the first user device 114 or to another user device 115 designated by the original request. The user can then view the electronic representation 400 using a display device 120.

In another aspect, a system 100 can receive images of property at a specified geographic location, processes, using an image recognition processor 106, the received images, identify one or more structures comprising the property and receive parametric data regarding a designated seismic event, all substantially as previously described. The system 100 can further define a key data pair corresponding to the specified geographic location and the designated seismic event, determine key attributes relating the key data pair, and determine, using a computer, e.g., processor 102, values of a deemed seismic action at the specified geographic location by modifying the parametric data for the designated seismic event using the key attributes, again, all substantially as previously described. The system 100 can further determine a respective deemed damage corresponding to each structure based on the deemed seismic action. The system 100 produces images showing an electronic representation the one or more structures comprising the property modified with respective electronic representations of the respective deemed damage.

In some embodiments, the structure attribute used to determine the deemed damage is correlated to a determined mass of the structure. In other embodiments, the structure attribute is correlated to a determined resonant frequency of the structure. In still other embodiments, the structure attribute is correlated to a construction material of the structure. Thus, structures built with shake-resistant materials or building methods would have a different structure attribute than structures built with shake-damage prone materials or building methods.

Figure 5:
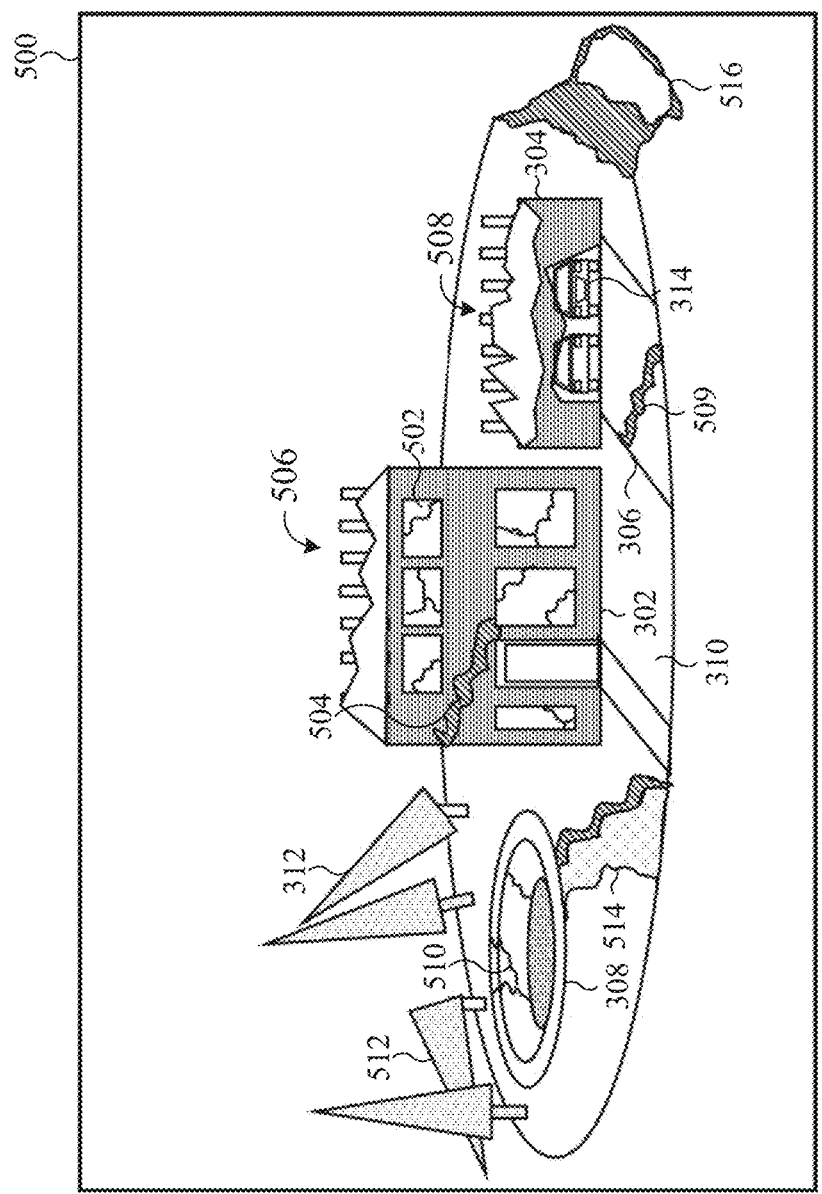
FIG. 5 shows an image of an electronic representation of the multiple structures of the property of FIG. 3 modified with electronic representations of deemed damage from a parametric earthquake event.

Referring now to FIG. 5, in one example, the system 100 can produce images 500 showing an electronic representation 400, 402, 404, 406, 408, 410, 412, and 414 the one or more structures 302, 304, 306, 308, 310, 312 and 314 comprising the property modified with respective electronic representations of the respective deemed damage. For example, the original appearance of the house 302 from image 300 is modified with electronic representations of cracked windows 502, wall cracks 504 and structural damage 506. The original appearance of the garage 304 from image 300 is modified with electronic representations of structural collapse 508 and damaged automobiles. The original appearance of the driveway 306 from image 300 is modified with electronic representations of cracking 509. The original appearance of the pool 308 from image 300 is modified with electronic representations of cracks 510 on the shell and decking. The original appearance of the trees 312 from image 300 is modified with electronic repositioning to represent leaning or toppled 512. The original appearance of the yard 310 from image 300 is modified with electronic representations of washouts 514 near the pool 308 and landslide/subsidence 516. cracks 510 on the shell and decking.

After producing image 500 the electronic representation 400, 402, 404, 406, 408, 410, 412, and 414 of the one or more structures comprising the property modified to show the respective deemed damage associated with a parametric seismic event, the system 100 can transmit the images 500 back to the original user device 114' or to another user device 114" designated by the original request. The user can then view the electronic representation 400 using a display device 120.

The system processor 102 can include any suitable hardware processor, such as a microprocessor, and in some embodiments, the hardware processor can be controlled by a program stored in the memory and/or storage. The image recognition processor 106, graphics animation processor 108 and image rendering engine 110 can include any suitable hardware, and each can be optimized for graphics-intensive computing with the incorporation of one or more graphics processing units (GPUs). Communication interfaces for the processors 102, 106, 108 and rendering engine 110 can be any suitable network communication interface, but can be optimized in some embodiments for high speed data transfer between the graphics processing devices 106, 108 and 110.

Figure 6:
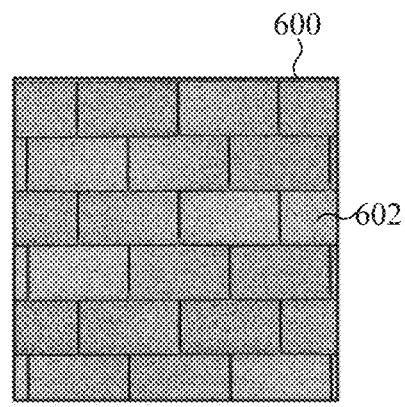
FIG. 6 shows an image of actual roofing of a structure.
Figure 7:
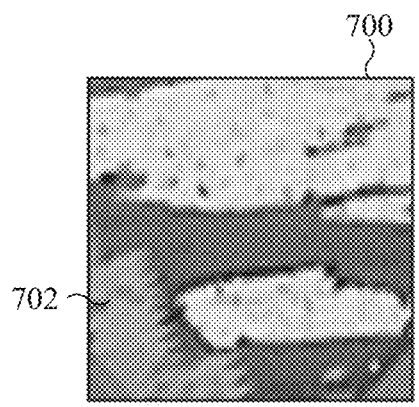
FIG. 7 shows a first damage texture representing damaged roofing.
Figure 8A:
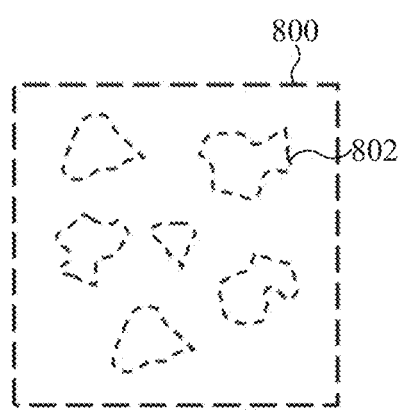
FIG. 8A shows a first texture map corresponding to a first amount of deemed damage.
Figure 8B:
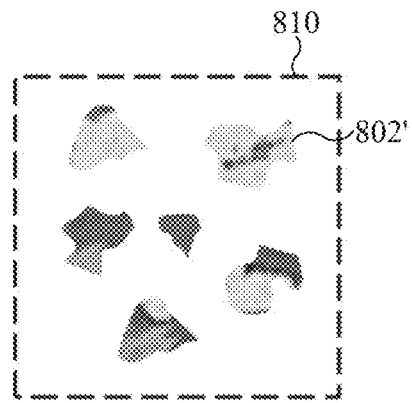
FIG. 8B shows the first texture map applied to the first damage texture to produce an electronic representation of a first level of deemed damage.
Figure 9A:
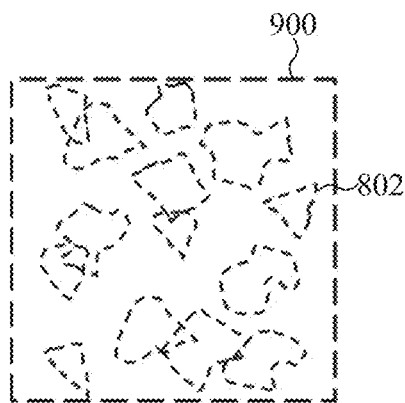
FIG. 9A shows a second texture map corresponding to a second amount of deemed damage.
Figure 9B:
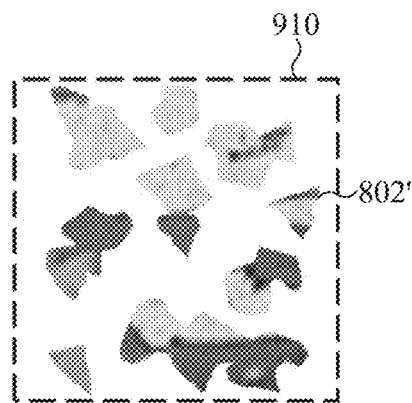
FIG. 9B shows the second texture map applied to the first damage texture to produce an electronic representation of a second level of deemed damage.

Referring now to FIGS. 6-10B, methods are illustrated methods of modifying the images of respective original structures to produce an electronic representation of the one or more structures modified to show the respective deemed damage. FIG. 6 shows an exemplary image 600 of actual roofing 602 of a structure, such as might be included in an image 300 received from a user of the system 100. The image recognition processor 106 of the system 100 can identify the image 600 as showing "roofing," therefore the graphics animation processor can select image textures corresponding to "damaged roofing." FIG. 7 shows an electronic representation 700 of an exemplary damage texture 702 representing "damaged roofing," which texture can be an actual photo of damaged roofing or a digital representation thereof. FIG. 8A shows an exemplary first texture map 800 with a randomized distribution of damage areas 802 corresponding in density to a first amount of deemed damage. In some embodiments, the shapes of the damage areas 802 included in a damage texture may be arbitrary shapes or randomly generated shapes. In some embodiments, the shapes of the damage areas 802 included in a damage texture can be predetermined based on representative types of damage. FIG. 8B shows the first damage texture 702 applied to the first texture map 800 such that the damage texture appears in the randomized damage areas 802' to produce an electronic representation 810 of a first level of deemed damage. FIG. 9A shows an exemplary second texture map 900 with a randomized distribution of damage areas 902 corresponding in density (in this case, a higher density) to a second amount (in this case, a higher amount) of deemed damage. FIG. 9B shows the first damage texture 702 applied to the second texture map 900 such that the damage texture appears in the randomized damage areas 802" to produce an electronic representation 910 of the second, higher, level of deemed damage with a greater percentage of the texture representing damage texture 702.

Figure 10B:
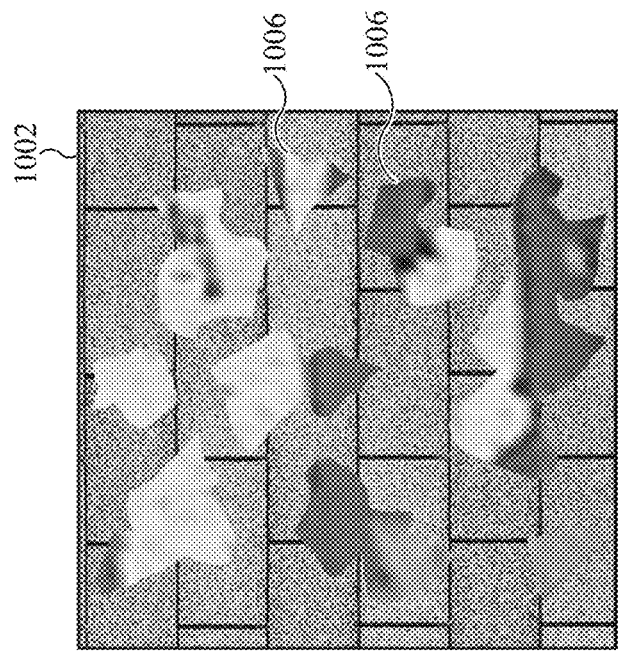
FIG. 10B shows the image of the structure roofing of FIG. 6 modified using the electronic representation of the second first level of deemed damage to produce an electronic representation of the structure damaged in accordance with the second level of deemed damage.
Figure 10A:
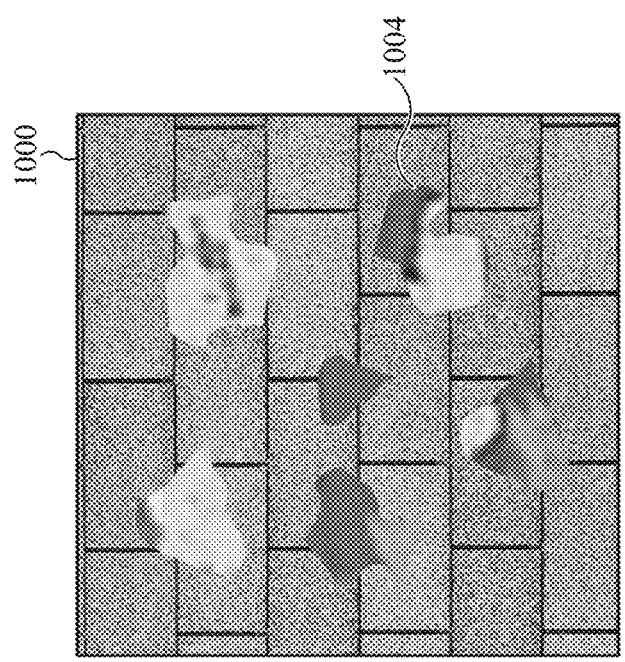
FIG. 10A shows the image of the structure roofing of FIG. 6 modified using the electronic representation of the first level of deemed damage to produce an electronic representation of the structure damaged in accordance with the first level of deemed damage.

FIG. 10A shows the original image 600 of the structure roofing of FIG. 6 modified using the electronic representation 810 of the first level of deemed damage to produce an electronic representation 1000 of the structure damage 1002 in accordance with the first level of deemed damage. FIG. 10B shows the original image 600 of the structure roofing of FIG. 6 modified using the electronic representation 910 of the second first level of deemed damage to produce an electronic representation 1005 of high-level structure damage 1007 in accordance with the second level of deemed damage.

Figure 11:
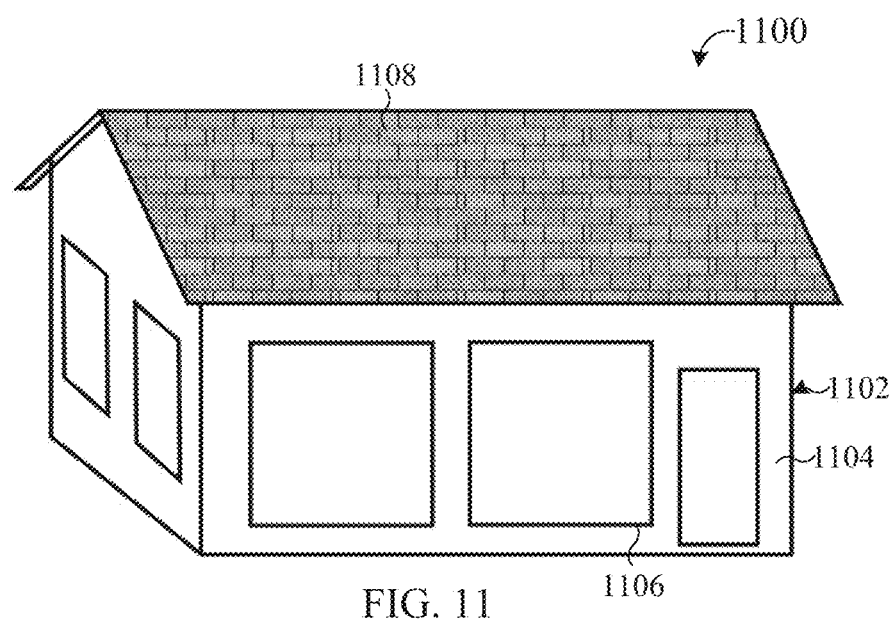
FIG. 11 shows an image of an actual structure on a property.

Referring now to FIGS. 11-14, additional methods are shown for modifying the images of respective original structures to produce an electronic representation the one or more structures modified with respective electronic representations of the respective deemed damage. FIG. 11 shows an image 1100 of an actual structure 1102 on a property, in this case a house. The image recognition processor 106 of the system 100 can identify the image 1100 as showing a "house." In some embodiments, one of the image recognition processor 106 and the graphics animation processor 108 can recognize the substructures of a typical house or actual structure 1102 to identify walls 1104, windows 1106 and/or roof 1108.

Figure 12:
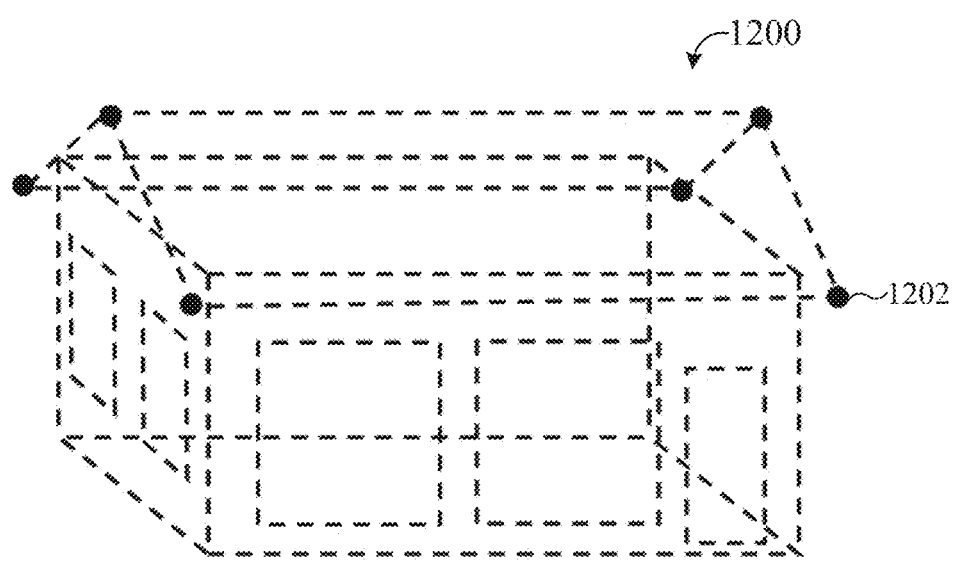
FIG. 12 shows a wireframe representation of the structure of FIG. 11 after recognition of the original image by the image recognition processor and processing into a wireframe by the graphics modeling processor.

Referring now to FIG. 12, after processing of the original image 1100 by the image recognition processor 106, and optionally, the identification of substructures 1104, 1106 and 1108, the system 100 can produce a wireframe representation 1200 of the actual structure 1102. In some embodiments the wireframe representation 1200 is produced by the graphics animation processor 108 and in other embodiments it is produced by other parts of the system 100. The wireframe representation 1200 can include coordinate locations 1202 corresponding to portions of the actual structure 1102. In the example of FIG. 12, the coordinate locations 1202 correspond to vertices of the roof 1108 in the original image 1100.

Figure 13:
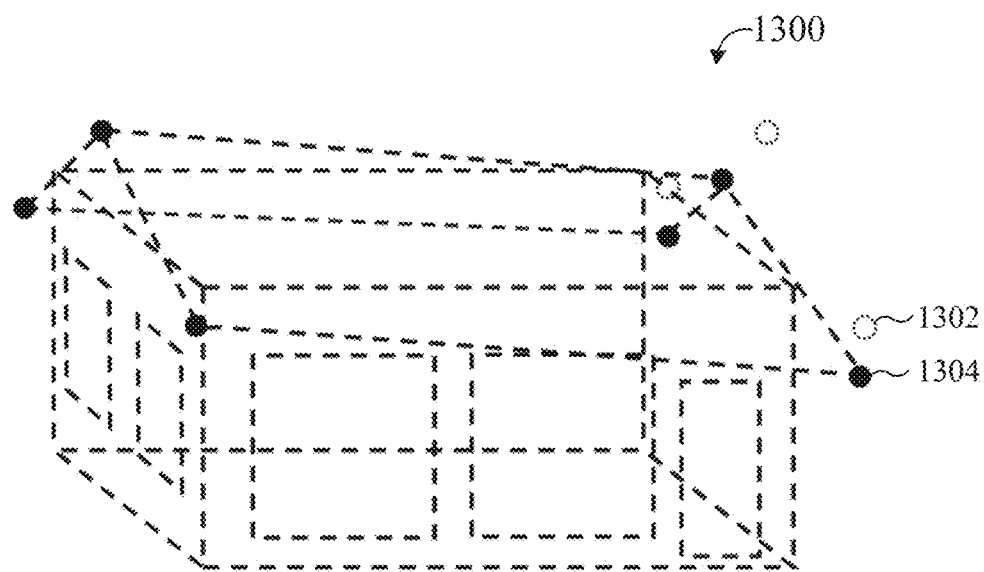
FIG. 13 shows a damaged wireframe representation produced by modifying the original wireframe representation of the structure of FIG. 11 in accordance with an assigned level of deemed damage received from the system processor.

As previously described, the system 100 can determine a respective deemed damage corresponding to each respective structure based on the deemed seismic action. FIG. 13 shows an electronic representation 1300 of a damaged wireframe produced by modifying the original wireframe representation 1200 of FIG. 12 in accordance with an assigned level of deemed damage received from the system processor 102. In some embodiments, the damaged wireframe 1300 is produced by displacing coordinate locations 1202 from their original location 1302 (shown in broken line) in wireframe 1200 to shifted locations 1304 (shown in solid), wherein the displacement between the original location 1302 and shifted locations 1304 is correlated to the assigned level of deemed damage. In the example of FIG. 13, only the roof structure is shown modified; in other embodiments additional coordinate locations, e.g., for walls, windows, etc., can also be displaced.

Figure 14:
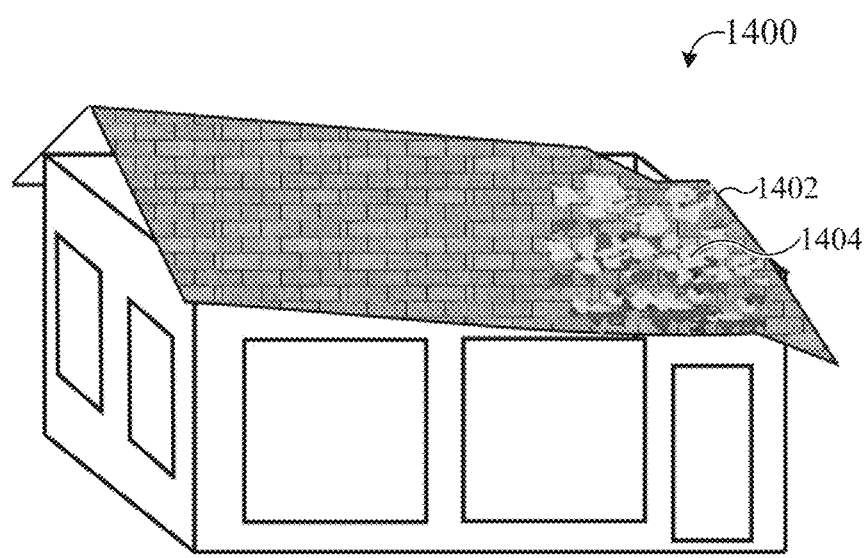
FIG. 14 shows an electronic representation of the structure of FIG. 11 damaged in accordance with the deemed damage level by rendering texture on the damaged wireframe representation and modifying the original texture with an electronic representation of damage in the texture in accordance with the assigned level of deemed damaged.

After modifying the wireframe representation 1200 of the original image to produce the damaged wireframe representation 1300, the system 100 can produce an electronic representation of the structure in accordance with the deemed damage level by rendering texture on the damaged wireframe representation. In some embodiments, the texture rendering for the electronic representation can be performed by the image rendering engine 110. Further, in some embodiments, the electronic representation of the structure can be further modified by replacing the original texture with an electronic representation of damage in the texture in accordance with the assigned level of deemed damaged (e.g., as described in connection with FIGS. 6-10B. For example, FIG. 14 shows an electronic representation structure 1400 of the structure 1102 of FIG. 11 damaged in accordance with the deemed damage level by rendering texture on the damaged wireframe representation to represent areas of structural damage 1402 and modifying the original texture with an electronic representation of damaged texture 1404 in accordance with the assigned level of deemed damaged.

Figure 15A:
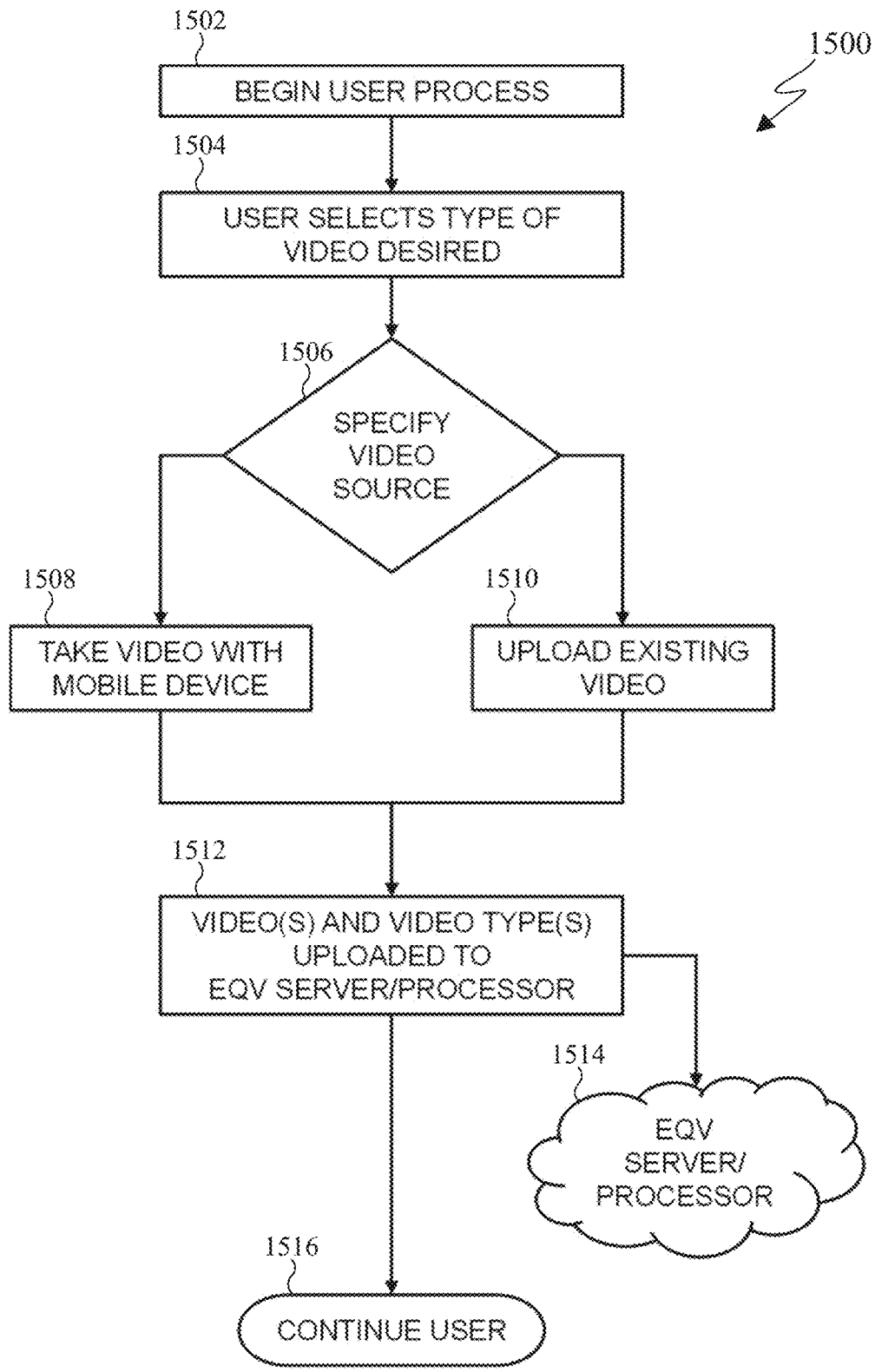
FIGS. 15A-15C are block diagrams showing a method for implementing, on a user device, a system for display of an electronic representation of physical effects and property damage resulting from a parametric earthquake event in accordance with this disclosure.
Figure 15B:
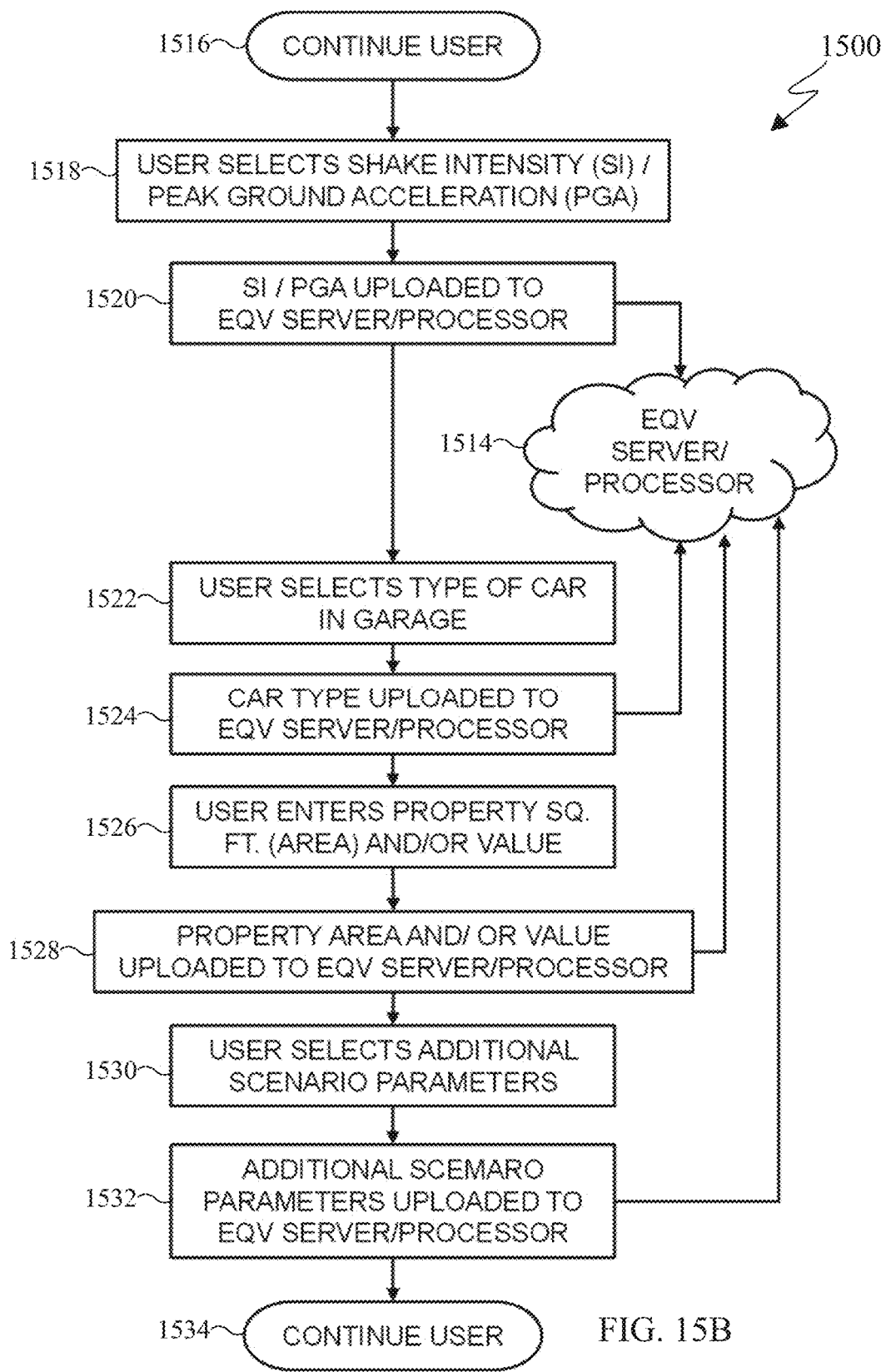
Figure 15C:
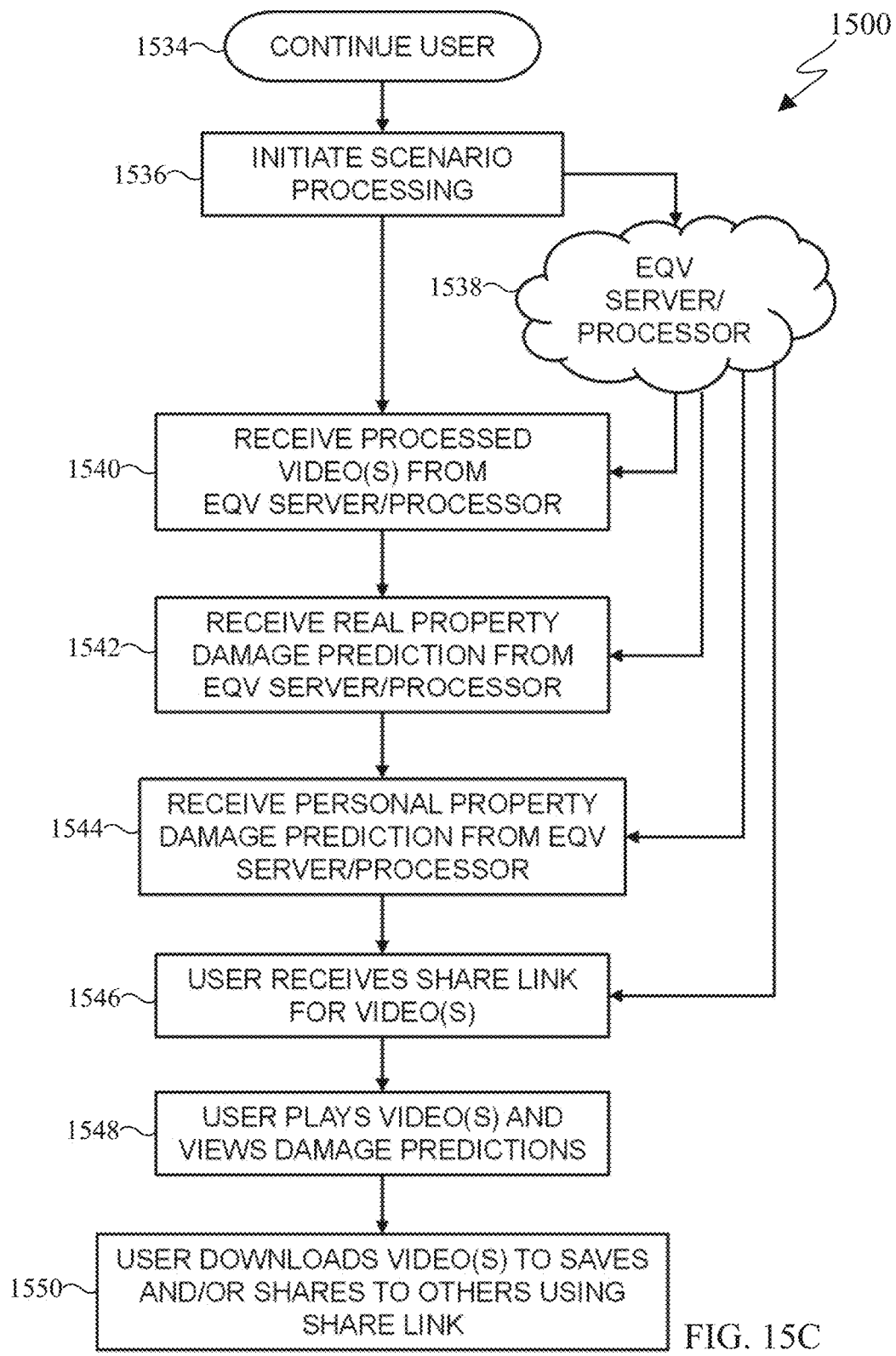

Referring now to FIGS. 15A-15C and FIGS. 16A-16E, there is illustrated a system 1500 for display of an electronic representation of physical effects and property damage resulting from a parametric earthquake event (hereinafter "Earthquake Visualization" system or "EQV" system) in accordance with another aspect. The EQV system 1500 can include hardware such as that in system 100 of FIG. 1, e.g., system server/processor 102, image recognition processor 106, graphics animation processor 108, and image rendering engine 110. The EQV system 1500 can include some apparatus, software and processes performed at a user location and other apparatus, software and processes performed at a remote location, wherein the user location and remote location are operably connected by a digital communication network, (e.g., communication network 104 of FIG. 1). In the illustrated embodiment, the EQV apparatus, software and processes performed at the user location are shown in FIGS. 15A-15C, the EQV apparatus, software and processes performed at the remote location are shown in FIGS. 16A-16E, and the interconnecting digital communication network is a global communication network, for example the internet. In other embodiments, the disclosed EQV apparatus, software and processes may be distributed differently between the user location and the remote location. In still other embodiments, the disclosed EQV apparatus, software and processes may be distributed between the user location and several remote locations. In addition to the internet, alternative digital communication networks can be used with the EQV system 1500 as long as they enable digital communications between the user location and the remote location.

Referring now specifically to FIG. 15A, a user initiates the EQV system 1500 on a computing device at the user location. The computing device can be a mobile communication device including, but not limited to, a smart phone, tablet, smart watch, a computer including, but not limited to, a desktop or laptop computer, or a home automation device including, but not limited to, an Amazon® Echo® or Google® Home® device. The user initiates the EQV system 1500 by downloading application software onto the computing device.

Summarizing some of the methods shown in FIGS. 15A-15C, with reference to selected blocks of the diagram (as denoted): (Block 1502) User initiates EQV App on mobile device. Optionally, EQV App determines user's location using GPS. Optionally, EQV App gets user info. and contact information.

User selects type of video desired in EQV App, including, but not limited to: Inside of structure; outside of structure; yard; garage with car(s); pool (Block 1506). Optionally, user takes video of property with mobile device camera using EQV App (Block 1508). Additionally, a user can upload existing videos (Block 1510). Video is uploaded to EQV server/processor 1514 using EQV App (Block 1512).

The process continues as shown in FIG. 15B (block 1516). The user selects SI/PGA using the EQV App (Block 1518). Optionally, user specified actual value. Optionally, user selects "historical value" for SI/PGA equivalent to values for named historical earthquake event. SI/PGA uploaded to EQV server/processor 1514 using EQV App (Block 1520).

The user can select classifications or identify specific objects, such as a type of car in a garage (Block 1522). The classifications or identified specific objects can be uploaded to the EQV server/processor 1514 (Block 1524). The user can select scene dimensions and other characteristics, such as property square feet and/or value of a property (Block 1526). The scene dimensions and other characteristics can be uploaded to the EQV server/processor 1514 (Block 1528). The user can select additional scenario parameters (Block 1530). The additional scenario parameters can be uploaded to the EQV server/processor 1514 (Block 1532).

The process continues as shown in FIG. 15C (Block 1534). The user can initiate scenario processing (Block 1536) at the EQV server/processor 1538. EQV server/processor 1538 can be the same as or different from EQV server/processor 1514. The user device can receive processed video(s) from the EQV server/processor 1538 (Block 1540). The user device can receive real property damage prediction(s) from the EQV server/processor 1538 (Block 1542). The user device can receive personal property damage prediction from the EQV server/processor 1538 (Block 1544).

The user device can receive a share link for one or more seismic damage video(s) (Block 1546). The user device can play the one or more seismic damage video(s) and views damage prediction (Block 1548). The user device can download the one or more video(s) to save and share to others using the share link (Block 1550).

Summarizing some of the methods shown in FIGS. 16A-16E with reference to selected blocks of the diagram 1600 (as denoted): EQV server/processor is initiated (Block 1602) and EQV server/processor processes uploaded video according to designated SI/PGA (Block 1604). The user then designates the type of video uploaded (Blocks 1606, 1622, 1640, 1656). In other embodiments, the type of video uploaded can be determined by the system, e.g., using image processing and/or machine learning.

Home interior video selected (Block 1606): Physics-based motion effects applied to video image of the interior structure during simulated event (Block 1608). Physics-based cracking effects applied to image of walls (Block 1610). Physics-based breakage effects applied to image of windows (Block 1612). Physics-based damage applied to image of ceilings (e.g., full or partial collapse) (Block 1614). Physics-based movement effects applied to image of furnishings (Block 1616).

Figure 16A:
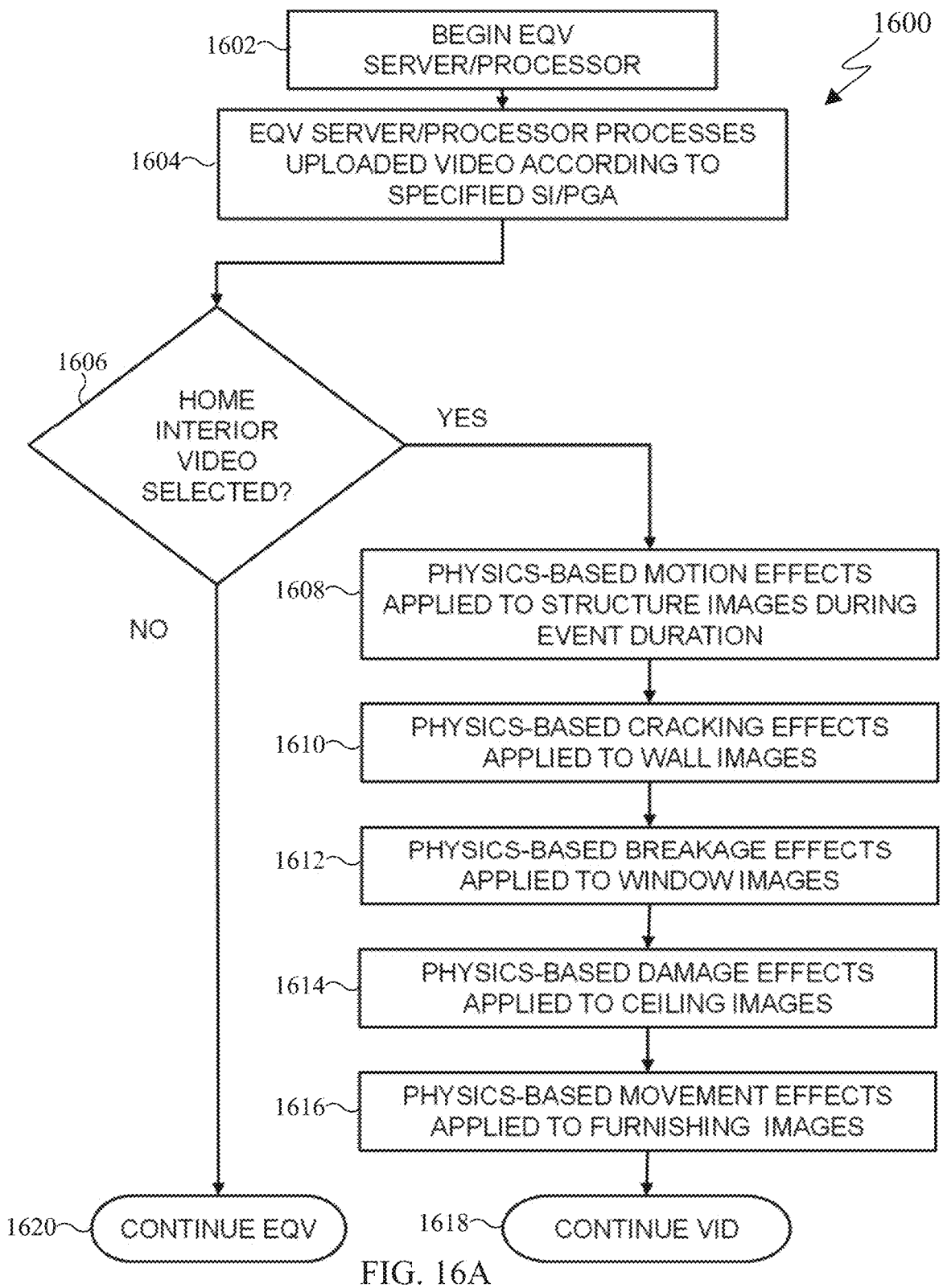
FIGS. 16A-16E are block diagrams showing a method for implementing, on a system server, a system for display of an electronic representation of physical effects and property damage resulting from a parametric earthquake event in accordance with this disclosure.
Figure 16B:
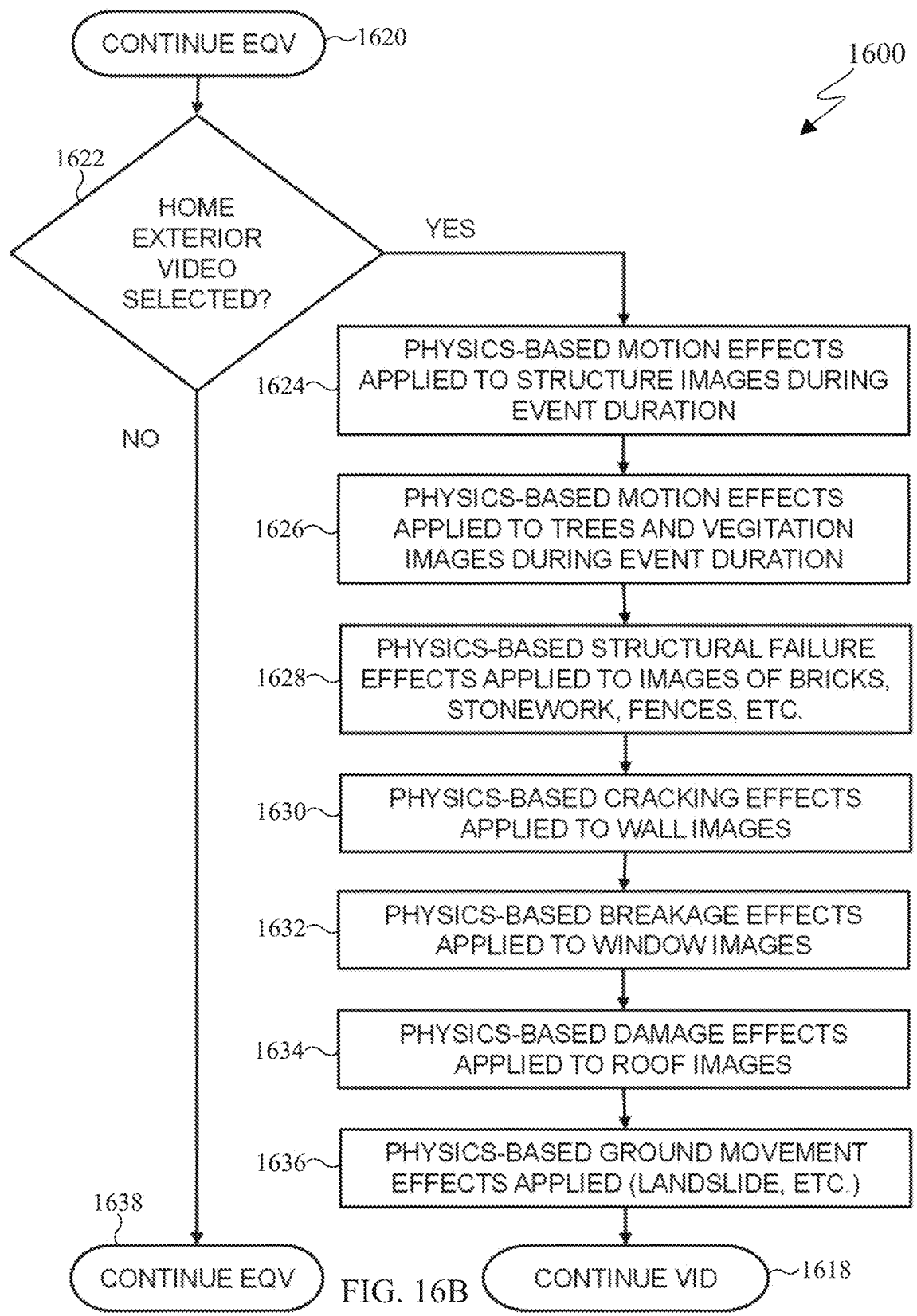

The diagram continues in FIG. 16B (Blocks 1618 and 1620). Home exterior video selected (Block 1622): Physics-based motion effects applied to image of the exterior structure during simulated event (Block 1624). Physics-based motion effects applied to images of trees and vegetation during event (e.g., dropping leaves; falling limbs; falling trees) (Block 1626). Physics-based structural failure applied to image of bricks, chimneys, fences (Block 1628). Physics-based cracking effects applied to image of walls (Block 1630). Physics-based breakage effects applied to image of windows (Block 1632). Physics-based damage effects applied to image of roof (e.g., full or partial collapse) (Block 1634). Physics-based earth movement effects applied according to designated SI/PGA (e.g., landslide; house movement on slope, etc.) (Block 1636).

Figure 16C:
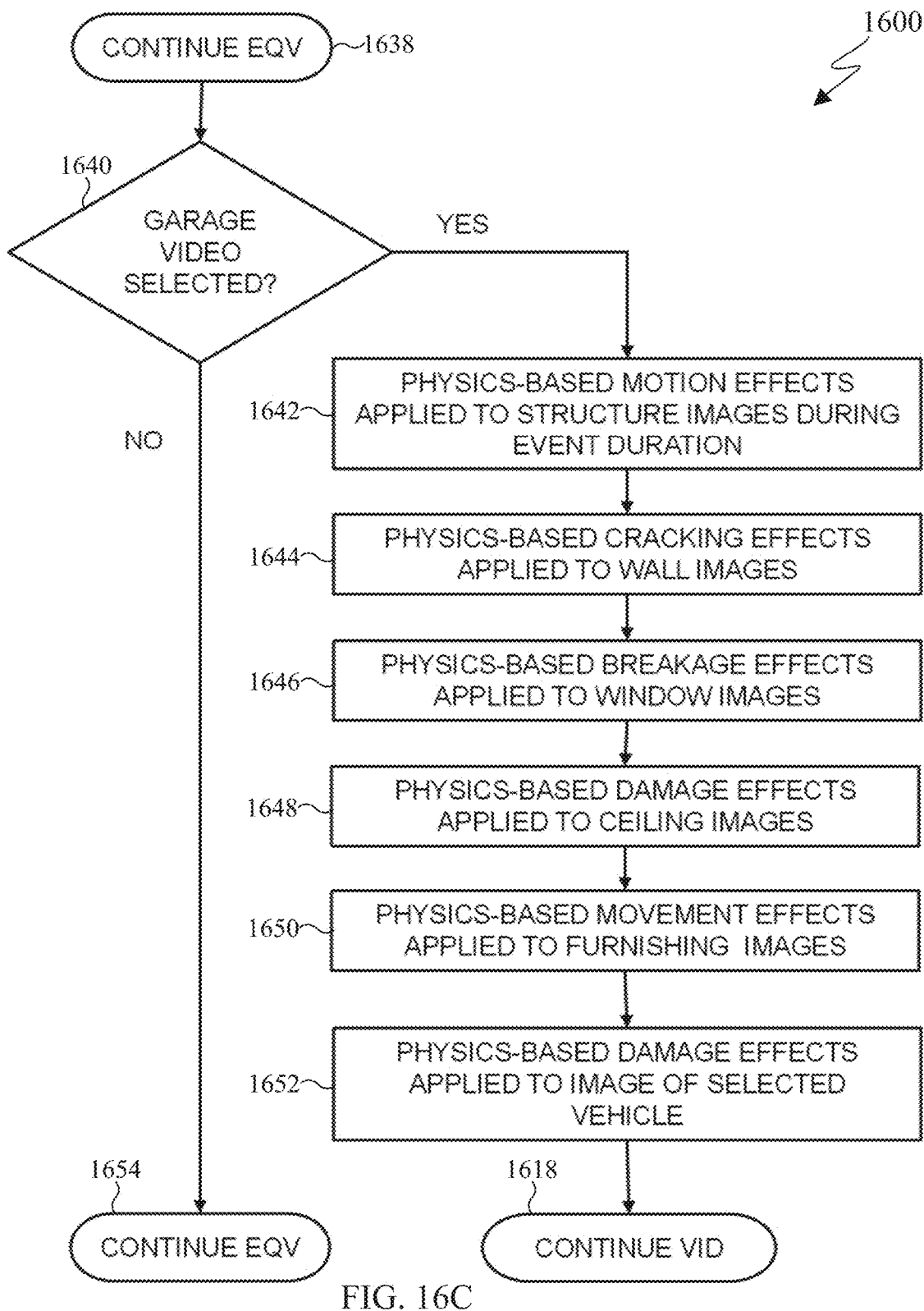

The diagram continues in FIG. 16C (Block 1638). Garage video can be selected (Block 1640) the same as the home interior, but add physics-based damage effects to structure images during event duration (Block 1642). Physics-based cracking effects can be applied to wall images (Block 1644). Physics-based breakage effects can be applied to window images (Block 1646). Physics-based damage effects can be applied to ceiling images (Block 1648). Physics-based movement effects can be applied to furnishing images (Block 1650). Physics-based damage effects applied to image of car(s) from structural collapse of garage (1652).

Figure 16D:
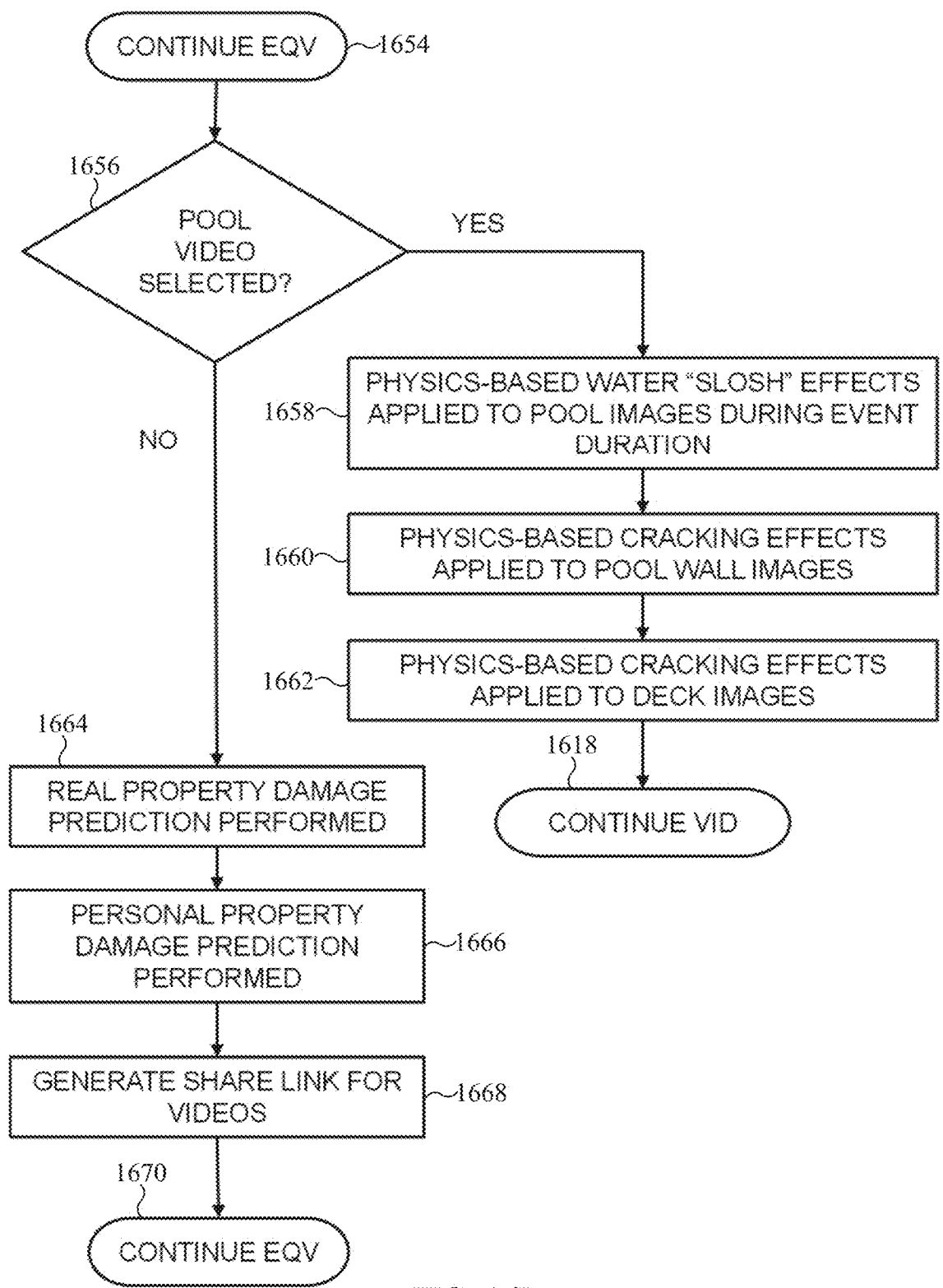

The diagram continues in FIG. 16D (Block 1654). Pool video can be selected (Block 1656): Physics-based water slosh effect added to water surface during simulated event (Block 1658). Physics-based cracking effects applied to image of walls (Block 1660). Physic-based cracking effects can be applied to decks (Block 1662).

Damage Predictors (optional): Real Property Damage Prediction can be performed (Block 1664); EQC Server/Processor determines approximate square feet of house and/or value of house from data source (public/private) based on GPS location from EQV App. (Alternative) User provides estimated real property value via EQV App. EQV Server/Processor calculated predicted value of real property damage for user-specified SI/PGA. Personal Property Damage Prediction can be performed (Block 1666). A share link can be generated for the videos (Block 1668).

Figure 16E:
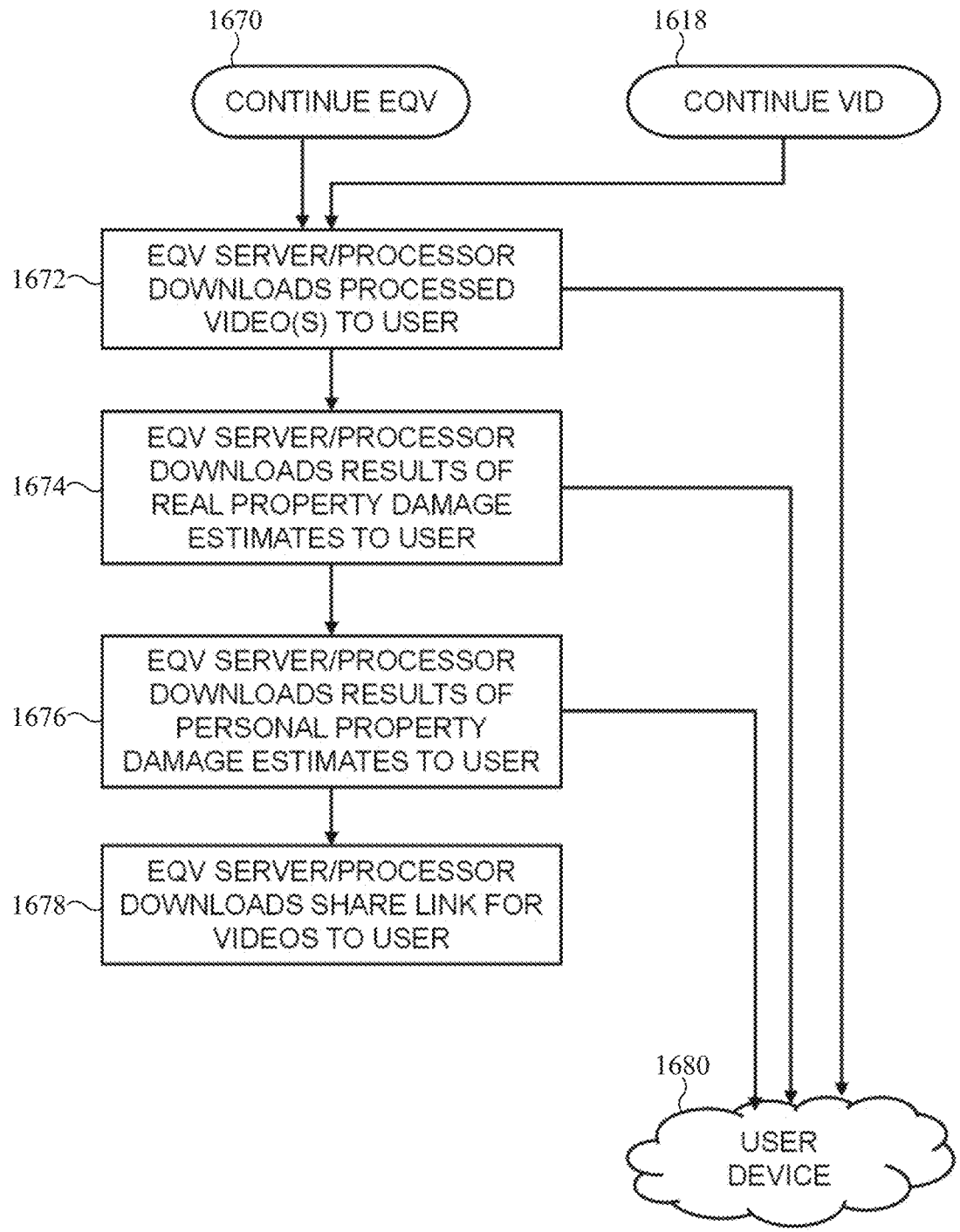

The diagram continues in FIG. 16E (Block 1670). As previously described, an image labeling or annotation tool may be incorporated into the system to detect, identify, recognize, and/or mark objects in the video and/or still images. The EQV Server/Processor counts personal property objects recognized in video (while adding effects), e.g., number lamps, number of paintings, number of tables, number of chairs, cars in garage (if applicable), etc. (as many labels as desired). EQV Server/Processor sets value to each labeled object based on database of values. (Alternative) User provides estimated personal property value via EQV App. EQV Server/Processor calculates predicted value of personal property damage for user-specified SI/PGA.

EQV server/processor downloads processed video to user device 1680 on EQV App (Block 1672). (Optional) EQV server/processor downloads predicted value of real property damage (Block 1674) and/or personal property damage (Block 1676) to the user device 1680. The EQV server/processor can download a share link (Block 1678) to the user device 1680.

After receiving the processed video from the EQV server/processor, the user at user device 114 plays video or views still photos showing electronic representation of structure motion and/or structure damage in accordance with the parametric seismic event and the geographic location of the property comprising the structures. Optionally, the user views predicted damage values. User selects new video or new SI/PGA. Repeat process if desired with different images, different locations, different event types and/or different event parameters.

Summarizing some of the methods relating to Effects Modeling in accordance with additional aspects: Motion (shake) effects added to entire video image based on designated SI/PGA (i.e., speed and magnitude are appropriate for PGA). Damage effects applied based on polygon modeling, texture sampling and texture substitution. Object in video is selected. Object is digitized into original polygon model (shape) and sampled for original texture (color and pattern). Object's original polygon model is deformed to create damaged polygon model; amount of deformation is based on designated SI/PGA. Object's original texture is replaced by damaged texture comprising original texture interspersed with contrasting "feature texture" (e.g., can be specific to type of damage such as cracks, exposed lumber, missing shingles, etc.); proportion of feature texture mixed to original texture is based on designated SI/PGA. Damaged object image is formed from damaged polygon model covered with damaged texture. Original object image is then overlayed by damaged object image in video.

Figure 17:
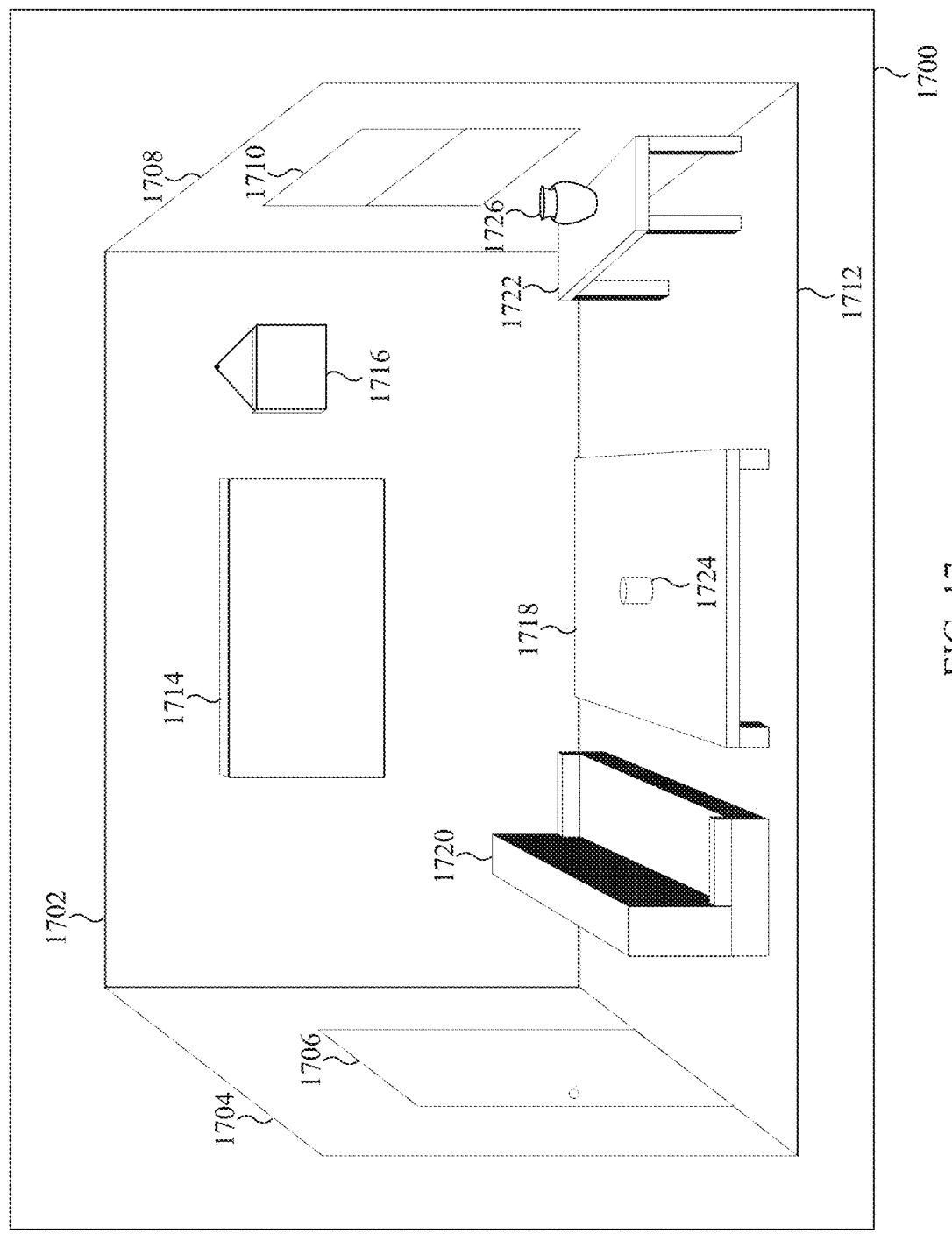
FIG. 17 is an image of an interior room of a structure in accordance with this disclosure.

Referring now to FIGS. 17, in some embodiments a structure, such as house 302 or garage 304 shown in FIG. 3, can include an interior room such as that pictured in interior image 1700. The interior image 1700 can be a still image or an image from a video. The interior image 1700 can capture a scene that includes structural components including one or more walls, such a first wall 1702, second wall 1704 including one or more doors 1706, and third wall 1708 including one or more windows 1710, a floor 1712, a ceiling, or any other suitable structural component. The scene of the interior image 1700 can also include personal items, including a television 1714 mounted on a wall (such as the first wall 1702), a picture 1716 mounted on a wall (such as the first wall 1702), a coffee table 1718 at a center of the floor 1712, a couch 1720 on the floor 1712 to a side of the coffee table 1718, a table 1722 against the third wall 1708 under the window 1710, a candle 1724 on the coffee table 1718, a vase 1726 on the table 1722, and any other suitable personal items.

Figure 18A:
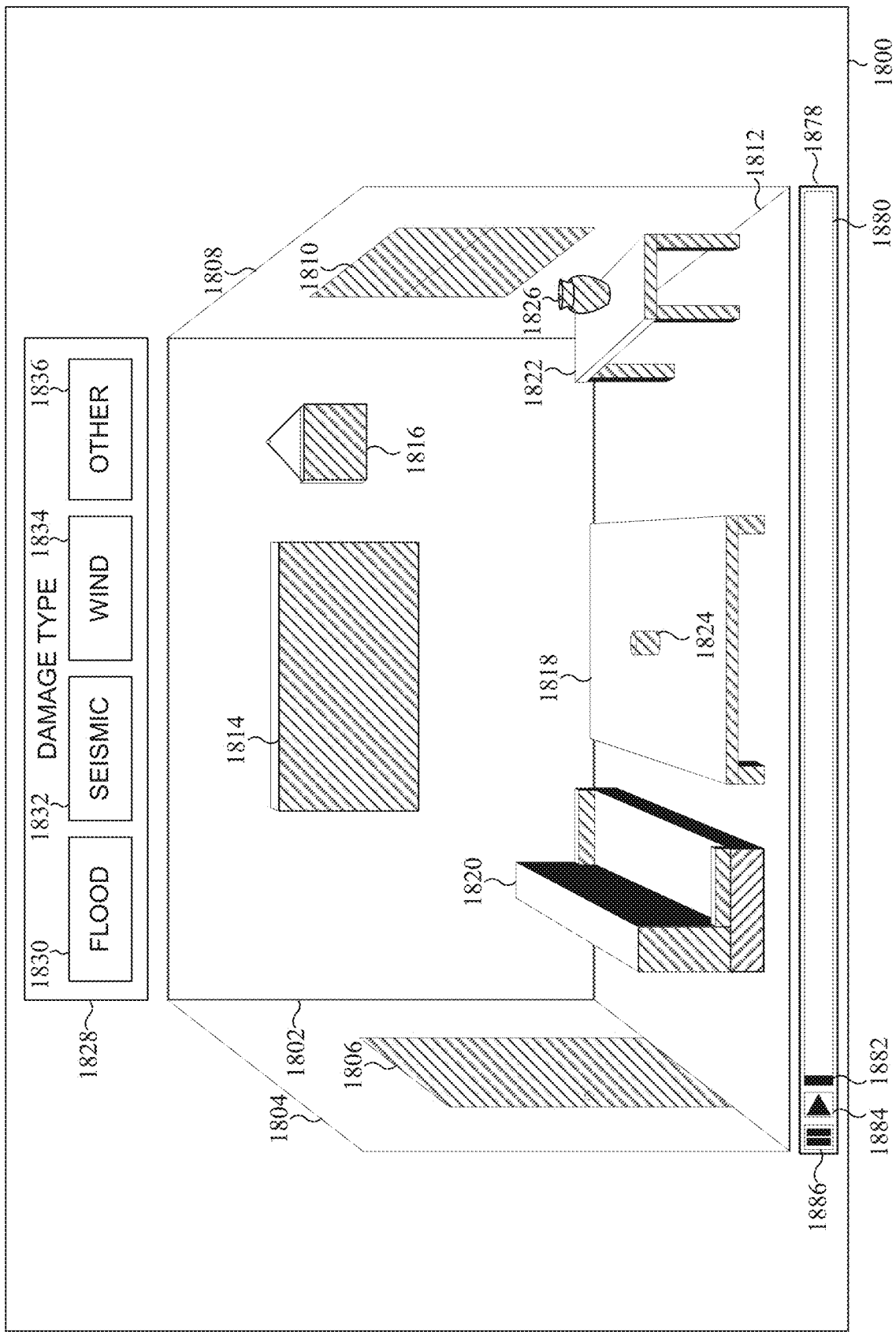
FIGS. 18A-18E are user interfaces for display of an electronic representation of physical effects and property damage resulting from a parametric natural disaster event in accordance with this disclosure.

Referring now to FIG. 18A, there is shown an exemplary user interface 1800. The first user device 114 can use the camera 116 to capture an interior image 1700 of the scene shown in FIG. 17. Alternatively, the interior image 100 can be retrieved from storage. The interior image 1700 is uploaded into the system either on a device or in a remote location. The user interface 1800 can be displayed on the display device 120 of the first user device 114. The system can process the interior image 1700 to generate digital representations 1802-1826 for each of the objects 1702-1726 shown in FIG. 17 for display on the user interface 1800. The generation of the digital representations 1802-1826 can occur in the user device 114 or in a server 102 that the user device 114 communicates with. The user interface 1800 can further include a damage selection window 1828 for selecting a type of damaging event to visualize in the user interface 1800. The damage selection window 1828 can include a flood input 1830, a seismic input 1832, a wind input 1834, or any other suitable input 1836. Once an input has been selected, additional windows related to the specific event can also be displayed. In certain embodiments, the additional windows are always displayed and the values are changed based on the selection of the damage selection window 1828.

Figure 18B:
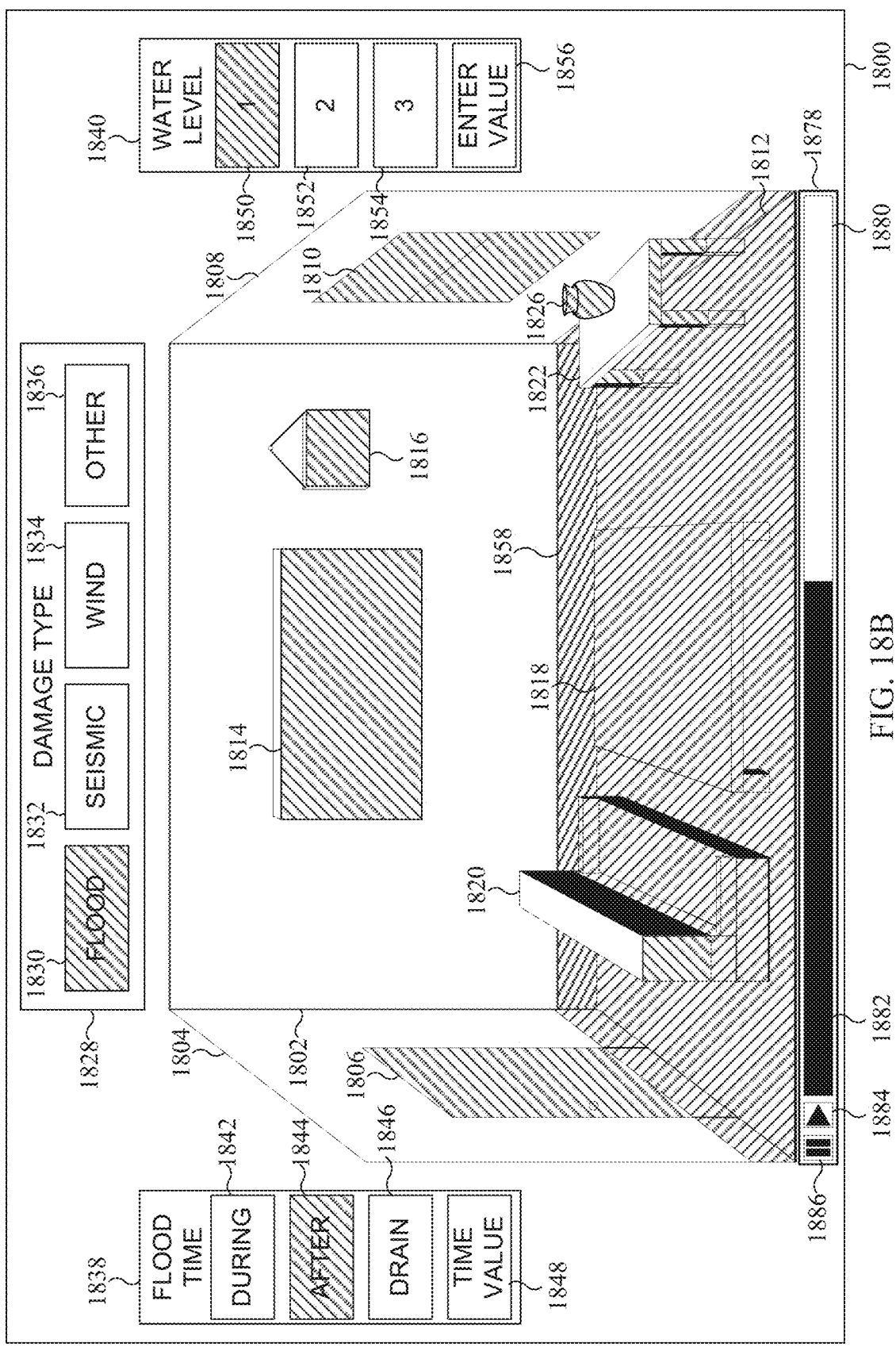

Referring now to FIG. 18B, the flood input 1830 has been selected on the damage selection window 1828 of the user interface 1800. Once the flood input 1830 is selected from the damage selection window 1828, a flood time window 1838 and water level selection window 1840 are displayed. The flood time selection window 1838 controls the time of the flooding event displayed on the user interface. The flood time selection window 1838 can have predetermined times set, such as a "during" input 1842 for showing a representation of the room while the flooding event is in progress, an "after" input 1844 for showing a representation of the room after the flooding event has ended but the water remains (shown selected in FIG. 18B), a "drain" input 1846 for showing a representation of the room after the water has been drained (shown in FIG. 18C), and time selection input 1848 for entering an intermediate time during the flooding event. The water level selection window 1840 can provide different predetermined levels of flood intensity including a first level input 1850 (shown selected in FIGS. 18B and 18C), a second level input 1852, a third level input 1854, "enter value" level input 1856, or any other suitable intensity level inputs. The predetermined levels can be based on height of water for historic storms, be a percentage of the room, or any other suitable way to determine a water level.

Figure 18C:
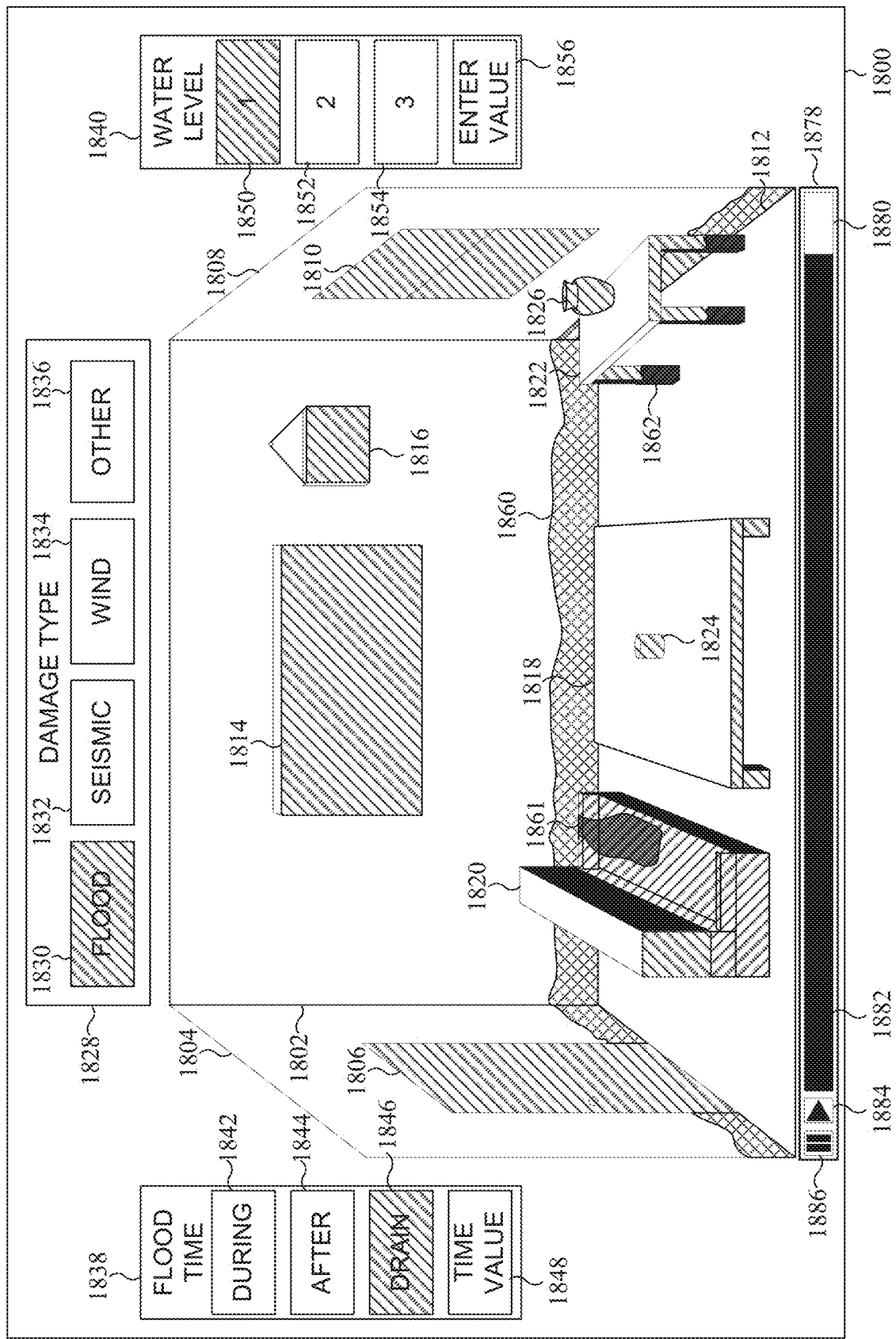

As shown in FIG. 18B, the flood input 1830 is selected on the damage selection window 1828, the after input 1844 is selected on the flood time selection window 1838, and the first level input 1850 is selected on the water level selection window 1840. The represented water level 1858 corresponds to the first level input 1850. The represented water level 1858 rises up the digital representation walls 1802, 1804, 1808, covers digital representation coffee table 1818, and partially covers the digital representation couch 1820 and the digital representation table 1822. As shown in FIG. 18C, the selection in the flood time selection window 1838 is changed from the after input 1844 to the drained input 1846. The water has been drained in the user interface 1800. The represented digital representation walls 1802, 1804, and 1808 now show digital representation mold 1860 or other damage. The digital representation couch 1820 can be made of a fabric and show digital representation stain(s) 1861. The digital representation table 1822 could be made of wood and show digital representation rot 1862.

Figure 18D:
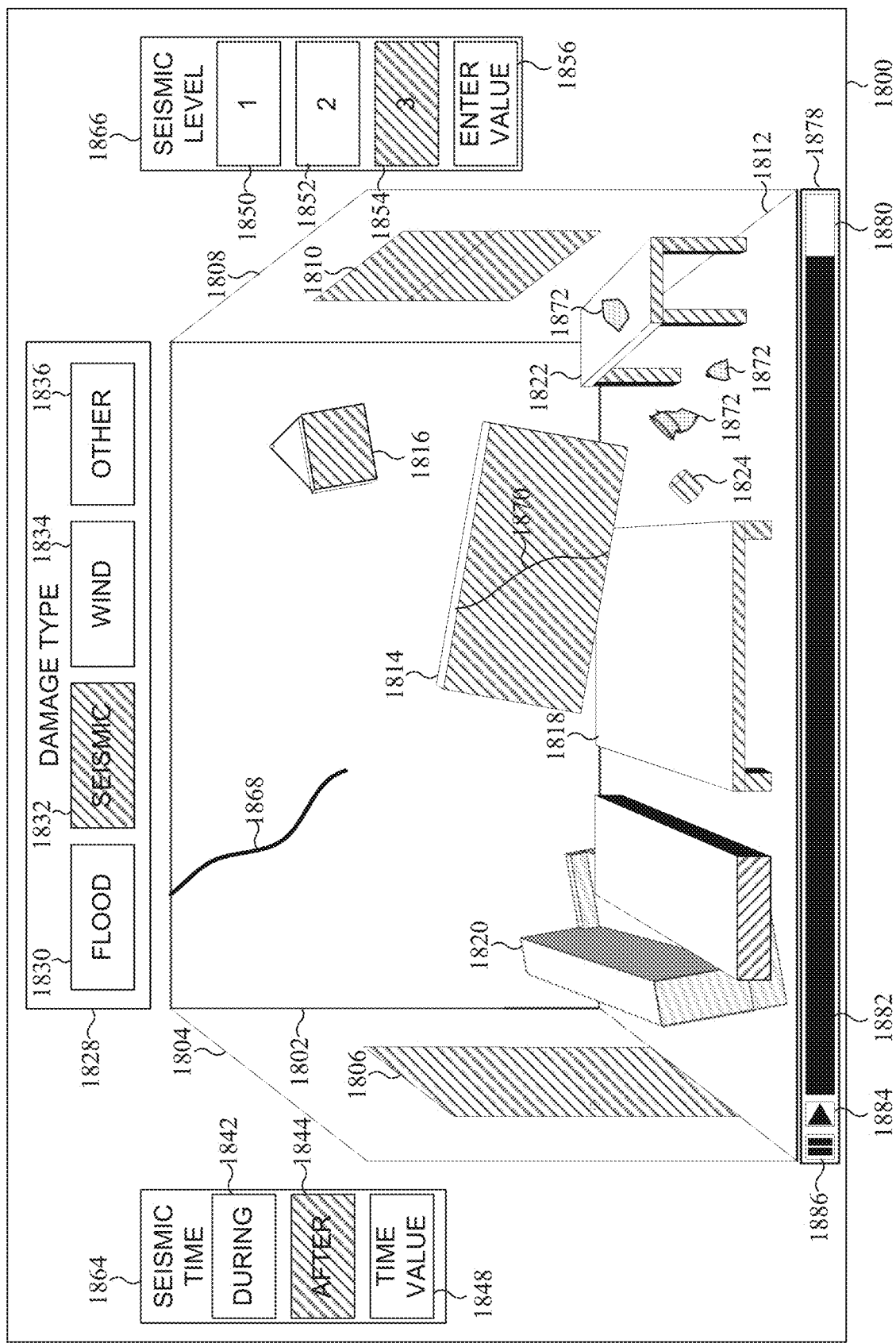

Referring now to FIG. 18D, the seismic input 1832 has been selected on the damage selection window 1828 of the user interface 1800. Once the seismic input 1832 is selected from the damage selection window 1828, a seismic time window 1864 and seismic intensity window 1866 are displayed. The seismic time window 1864 controls the time of the seismic event displayed on the user interface. The seismic time window 1864 can have predetermined times set, such as during input 1842 showing the room representation with the seismic event is in progress, an after input 1844 for showing the room representation after the seismic event has ended (shown selected in FIG. 18D), and time selection input 1848 for entering an intermediate time during the seismic event. The seismic intensity window 1866 can provide different predetermined levels of represented seismic intensity including a first level, a second level 1852, a third level 1854 (shown selected in FIG. 18D), an enter value level 1856, or any other suitable intensity levels. The predetermined levels can be based on strength of an earthquake for historic quake events or any other suitable way to determine a seismic level or massive vibration level.

The user interface 1800, shown in FIG. 18D, displays a representation of seismic damage that would be cause by an earthquake or other massive vibration event. The seismic damage caused a digital representation crack 1868 in the digital representation first wall 1802 from the ceiling or top of the digital representation first wall 1802. The digital representation picture 1816 is crooked, the digital representation television 1814 has fallen off the digital representation first wall 1802 and includes a digital representation crack 1870 in the screen. The vibrations caused the digital representation vase 1826 to fall and break into digital representation pieces 1872. The digital representation candle 1824 fell off the digital representation coffee table 1818. The digital representation couch 1820 has shifted.

Figure 18E:
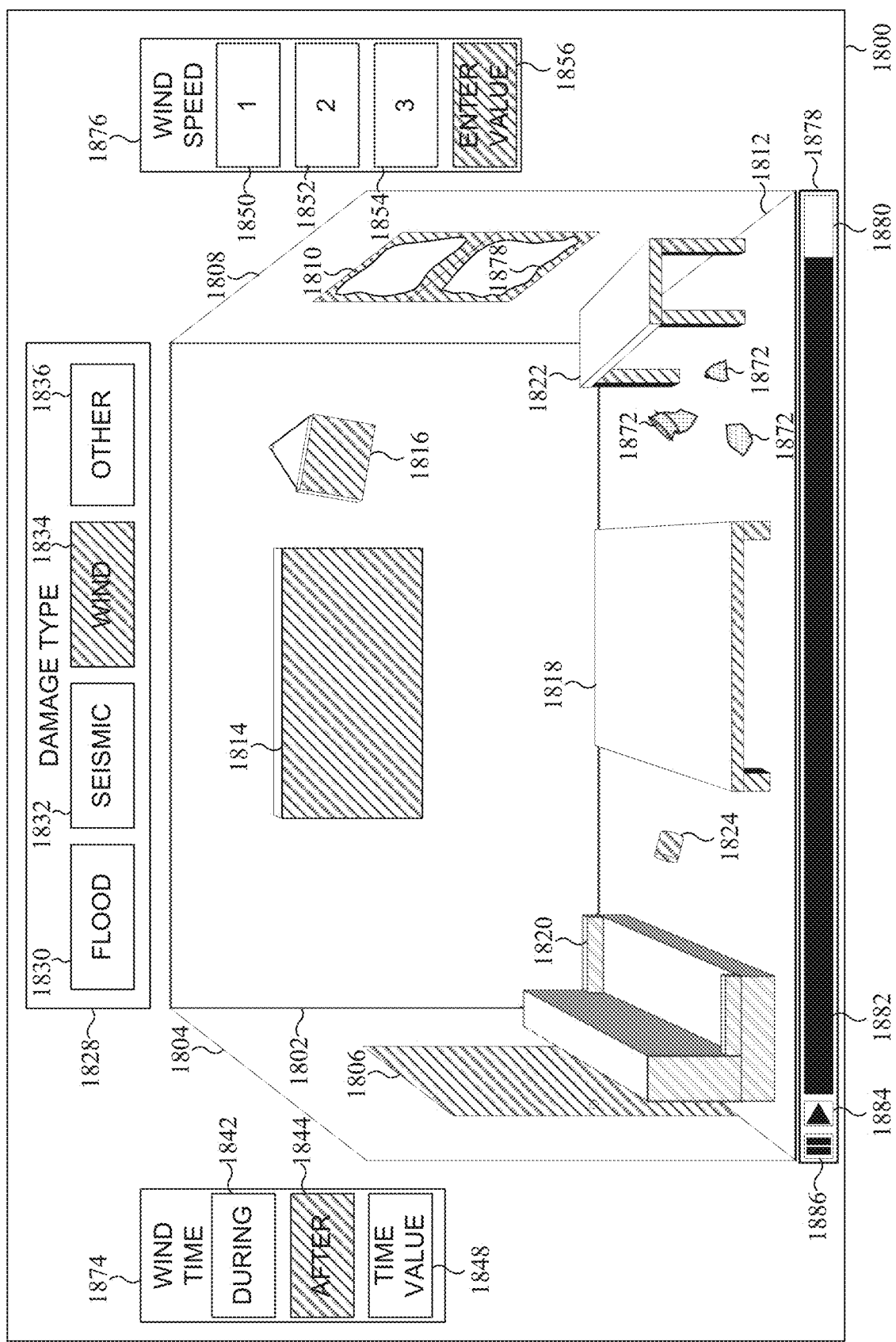

Referring now to FIG. 18E, the wind input 1834 has been selected on the damage selection window 1882 of the user interface 1800. Once the wind input 1834 is selected from the damage selection window 1828, a wind time window 1874 and wind speed selection window 1876 are displayed. The wind time window 1874 controls the time of the represented wind event displayed on the user interface. The wind time window 1874 can have predetermined times set, such as a during input 1842 the wind event is in progress, an after input 1844 for after the wind event has ended (shown selected in FIG. 18E), and time selection input 1848 for entering an intermediate time during the wind event. The wind speed selection window 1876 can provide different predetermined levels of represented wind intensity including a first level input 1850, a second level input 1852, a third level input 1854, enter value level input 1856 (shown in FIG. 18E), or any other suitable intensity levels. The predetermined levels can be based on strength of wind or category of historic storms or any other suitable way to determine a wind strength level.

As shown in FIG. 18E, the after input 1844 is selected such that the user interface 1800 displays the represented aftereffects of a wind damaging event. A specific value input 1856 has been entered in the wind speed selection window 1876. The value selected by the user was strong enough to shatter 1877 the digital representation window 1810 on the digital representation third wall 1808. The represented wind caused the digital representation picture 1816 to rotate and the digital representation couch 1820 to move back to the second wall 1804 blocking the digital representation door 1806. The represented wind strength knocked the digital representation candle 1824 off of the digital representation coffee table 1818. The represented wind also knocked the digital representation vase 1826 off of the digital representation table 1822 and break into digital representation pieces 1872.

As shown in FIGS. 18A-18E, the user interface 1800 can also include a destructive event control bar 1878. The destructive event control bar 1878 controls a timeline of the destructive event in the user interface 1800. The destructive event control bar 1878 can include a destructive event time indicator 1880 with a destructive event progress indicator 1882, a destructive event play button 1884, and a destructive event pause button 1886. The destructive event time indicator 1880 shows a total amount of time that the destructive event occurs. This could include amount of time for waters to recede and mold to form on the digital representation walls 1802, 1804, 1808 during a flooding event. The destructive event progress indicator 1882 indicates the current time in the of the destructive event displayed on the user interface 1800. The destructive event progress indicator 1882 can be selectively adjusted to adjust the video of the destructive event on the user interface 1800. The destructive event play button 1884 can start the video at the current time of the destructive event. The destructive event pause button 1886 can pause the video at the time of the destructive event.

Figure 19:
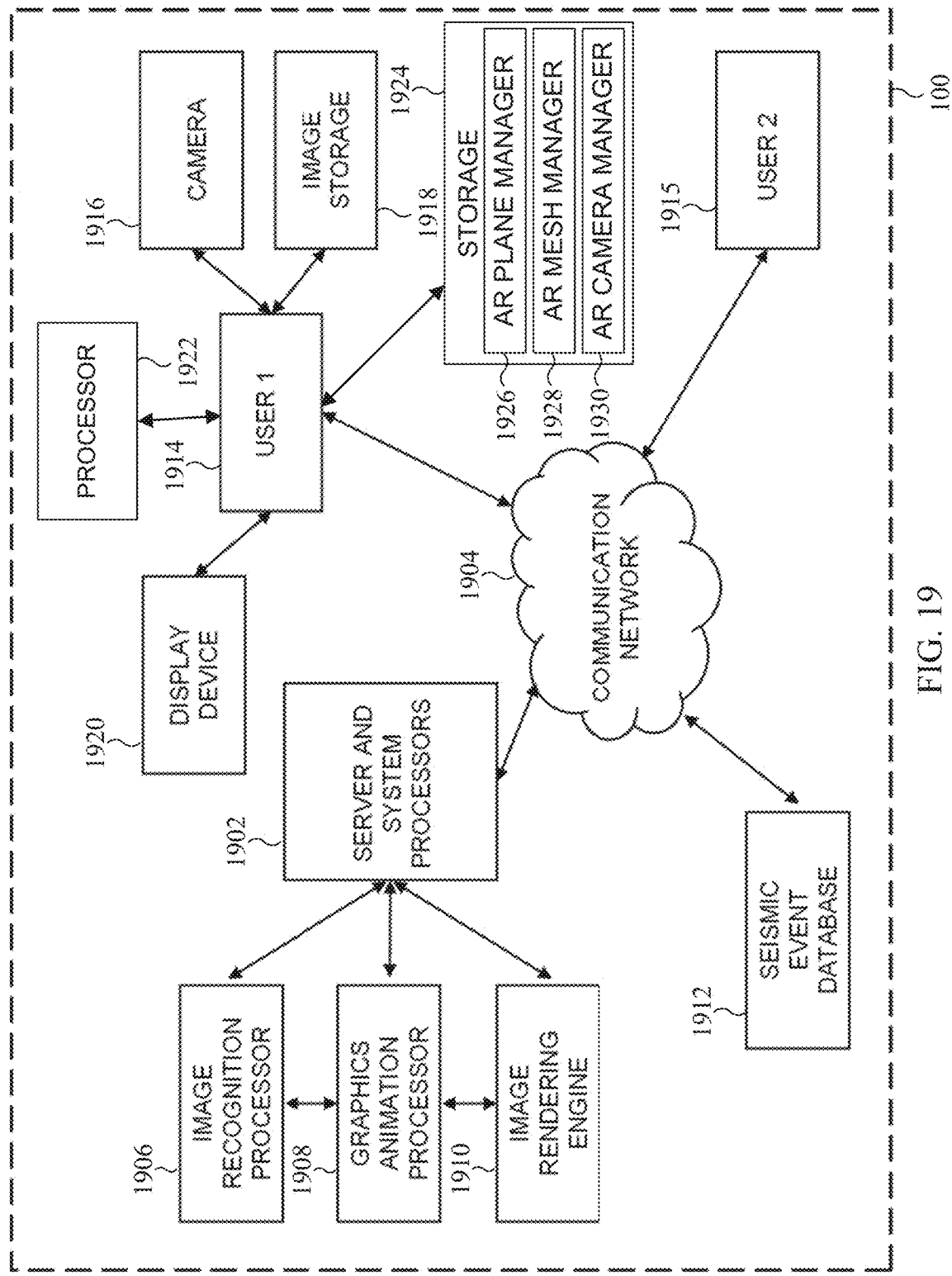
FIG. 19 is a block diagram of a system for display of an electronic representation of physical effects and property damage resulting from a parametric earthquake event in accordance with this disclosure.

FIG. 19 is a block diagram of a system for display of an electronic representation of physical effects and property damage resulting from a parametric earthquake event in accordance with various embodiments of the disclosure. As shown in FIG. 19, there is illustrated a system 1900 for display of an electronic representation of physical effects and property damage resulting from a parametric earthquake event in accordance with one aspect. Unless otherwise noted, in this application the terms "parametric earthquake event" and "parametric seismic event" have the same meaning. A parametric earthquake event is a set of parameters and values for defining an earthquake event in terms of scientific principles, e.g., physics and geological principles. Such parameters can include, but are not limited to, date, time, epicenter location, hypocenter location (i.e., focus), duration, magnitude, peak ground acceleration ("PGA"), and maximum shaking intensity ("SI"), maximum ground amplitude, mean ground amplitude, shaking frequency, soil type, rock type and fault classification. A parametric earthquake event can include some or all parameter values measured during an actual, i.e., "historical" earthquake event, but can also include some or all parameters values selected by a user. The system 1900 includes a system server 1902 or computing device. The system server 1902 contains one or more processors, RAM memory, storage units and communication interfaces for sending and receiving data to and from other devices. The system server 1902 may comprise a single machine or multiple machines, including virtual machines resident on "cloud servers." The system server 1902 is operably connected to a communication network 1904 and to one or more subsystems, e.g., an image recognition processor 1906, a graphics animation processor 1908 and/or an image rendering engine 1910. In some embodiments, the communication network 1904 is the internet; however, the communication network 1904 can be any type of network that allows the system server 1902 and subsystems 1906, 1908 and 1910 to communicate with one another and with a user device 1914. In the embodiment illustrated in FIG. 19, the server 1902 is directly connected to the subsystems 1906, 1908 and 1910; however, in other embodiments some or all of the subsystems may be connected to the server via the communication network 1904. In some embodiments, the subsystems 1906, 1908 and 1910 can communicate directly with one another for improved data transfer.

The image recognition processor 1906 can include or incorporate an image labeling or annotation tool (i.e., "labeling tool"). The labeling tool can be used to process and label the images for bounding box object detection and segmentation so that the image is readable by machines. In some embodiments, the labeling tool can utilize human assistance and in other embodiments the labeling tool can operate solely with machine learning or artificial intelligence processes. In some embodiments, different image labeling tools may be used for processing images of different image types (e.g., interior images, exterior images, etc.). Using the image labeling tools, the various objects in the provided image can be labeled for specific purposes. In some embodiments, labeled objects can be selected for replacement by a computer graphic object (e.g., 2D sprite or 3D polygon), which can be moved on-screen and otherwise manipulated as a single entity, e.g., for purposes of event animation. In some embodiments, labeled objects may be classified into different types or categories of objects for different purposes. For example, in some embodiments, labeled objects can be categorized for properties relating to event animation, e.g., movable-type objects, bendable-type objects, breakable-type objects, waterproof-type objects, water damageable-type objects, etc. In other embodiments, labeled objects can be categorized for properties relating to inventory or damage assessment, e.g., table-type objects, chair-type objects, window-type objects, door-type objects, hanging art-type objects, TV/computer screen-type objects, etc. Such classification may be performed by the image recognition processor 1906 or by another processor, e.g., the system processor 1902 or graphics animation processor 1908. The image labeling tools can use known or future-developed detection techniques for detection of the object including, but not limited to, semantic, bounding box, key-point and cuboid techniques.

A seismic event database 1912 is operably connected to the server 1902, either via the communication network 1904 or directly. The seismic event database 1912 stores parametric seismic event data corresponding to one or more earthquakes or other seismic events. The parametric seismic event data can include, but is not limited to, values for the following parameters: event name, event date, event epicenter location, event focus (i.e., hypocenter) location, event duration, event magnitude, event PGA, event maximum shaking intensity ("SI"), event maximum ground amplitude, event mean ground amplitude, and event shaking frequency for each seismic event. The seismic events data in the seismic event database 1912 may be actual historical earthquake data, "relocated" earthquake data (i.e., where the majority of the data corresponds to a historical earthquake, but the epicenter/hypocenter location is changed to a different location) or hypothetical earthquake data specified by a user or otherwise generated. In some embodiments, the seismic event database 1912 can be located within the server 1902 or one of the subsystems. In some embodiments, the seismic event database 1912 can include data and/or values from public or private earthquake reporting agencies, such as the U.S. Geological Survey.

User devices 1914, 1915 can connect to the system 1900 through the communication network 1904. The user devices 1914, 1915 can be mobile devices such as mobile phones, tablets, laptop computers or they can be stationary devices such as desktop computers or smart appliances including, but not limited to, smart televisions. In some embodiments, aspects of the current system 1900 may include downloadable software or "apps" resident on the user devices 1914, 1915 and/or non-downloadable software (e.g., "cloud based software") that remains resident on the server 1902 or other elements of the system 1900 and is accessed by the user device 1914 via a web browser or other network interface.

Using the user devices 1914, 1915, system users can upload images of actual property via the network 1904 to the server 1902. The images of actual property can be captured using a camera 1916 on the first user device 1914 or from images stored in memory 1918, e.g., a computer memory, hard drive, flash drive or other data storage technology. The images can be video programs, audiovisual programs and/or single or multiple still photo images. User devices 1914 can also transmit additional information to the server 1902 regarding the images, including, but not limited to, the geographic location of the property in the images (either entered by the user as text, captured via GPS or wireless location information on the user device 1914, or captured vis geotagging information on the image file), the address of the property in the images, the name and/or other contact information of the user, a desired parametric seismic event and/or desired seismic parameters to be used in creating a parametric seismic event. Desired seismic parameters can include strength of the seismic event, duration of the seismic event, etc. Each of the seismic parameters can be input on the user devices 1914, 1915 by any suitable means. For example, the seismic parameters can be input or selected using a predetermined list, a slider associated with different values of the seismic parameters, a knob, a number entry. The inputs can be physical components on the user device 1914, 1915 or virtual representations on a display 1920 of the user device 1914, 1915.

The system 1900 processes, using an image recognition processor 1906, the received images and identifies one or more structures comprising the property. The system 1900 retrieves parametric data regarding a designated seismic event from the seismic event database 1912. The system 1900 defines a key data pair corresponding to the specified geographic location and the designated seismic event. The system 1900 determines key attributes relating the key data pair. The key attributes correlate to how the parametric seismic data changes for distant geographic locations (i.e., at a distance from the event). In some embodiments, the values of key attributes are determined based principles known in physics and/or geology including, but not limited to principles of seismic attenuation, resonant vibration and/or soil behavior factors. In some embodiments, the values of key attributes are determined based on seismic attenuation factors and the distance between the property and the event center. In some embodiments, the values of key attributes are determined based on resonant vibration factors, the shaking frequency of the event, and the mass and/or resonant frequency of structures. In some embodiments, the values of key attributes are determined based on soil behavior factors and the soil at the property location, the event center, and/or at intervening geological features. Some key attributes may vary in direct (i.e., linear) proportion to the distance between the geographic location of the property/structure and the seismic event center, whereas other key attributes may vary according to reciprocal square of distance, logarithmic decay of distance or other mathematical functions relating to the distance. In some embodiments, the values of key attributes are selected by a user. Other key attributes may vary depending on other factors such as intervening geological features rather than distance. The system 1900 determines, using a computer such as the system processor 1902, values of a deemed seismic action at the specified geographic location by modifying the parametric data for the designated seismic event using all relevant key attributes. In some embodiments, multiple sets of values of the key attributes are predetermined. In this case, the system processor 1902 prepares a plurality of videos each combination of key attributes for each value of the key attributes.

In certain embodiments, the images of actual property can be captured using a camera 1916 on the first user device 1914 or from images stored in memory 1918, e.g., a computer memory, hard drive, flash drive or other data storage technology. User devices 1914 can also store additional information regarding the images, including, but not limited to, the geographic location of the property in the images (either entered by the user as text, captured via GPS or wireless location information on the user device 1914, or captured vis geotagging information on the image file), the address of the property in the images, the name and/or other contact information of the user, a desired parametric seismic event and/or desired seismic parameters to be used in creating a parametric seismic event. Desired seismic parameters can include strength of the seismic event, duration of the seismic event, etc. Each of the seismic parameters can be input on the user devices 1914, 1915 by any suitable means. For example, the seismic parameters can be input or selected using a predetermined list, a slider associated with different values of the seismic parameters, a knob, a number entry. The inputs can be physical components on the user device 1914, 1915 or virtual representations on a display 1920 of the user device 1914, 1915.

The processor 1922 on the user devices 1914, 1915 can process the received images and identifies one or more structures comprising the property. The processor 1922 can retrieve parametric data regarding a designated seismic event from the seismic event database 1912 via the communication network 1904. The processor 1922 can define a key data pair corresponding to the specified geographic location and the designated seismic event. The processor 1922 can determine key attributes relating the key data pair. The key attributes correlate to how the parametric seismic data changes for distant geographic locations (i.e., at a distance from the event). In some embodiments, the values of key attributes are determined based principles known in physics and/or geology including, but not limited to principles of seismic attenuation, resonant vibration and/or soil behavior factors. In some embodiments, the values of key attributes are determined based on seismic attenuation factors and the distance between the property and the event center. In some embodiments, the values of key attributes are determined based on resonant vibration factors, the shaking frequency of the event, and the mass and/or resonant frequency of structures. In some embodiments, the values of key attributes are determined based on soil behavior factors and the soil at the property location, the event center, and/or at intervening geological features. Some key attributes may vary in direct (i.e., linear) proportion to the distance between the geographic location of the property/structure and the seismic event center, whereas other key attributes may vary according to reciprocal square of distance, logarithmic decay of distance or other mathematical functions relating to the distance. In some embodiments, the values of key attributes are selected by a user. Other key attributes may vary depending on other factors such as intervening geological features rather than distance. The processor 1922 can determine values of a deemed seismic action at the specified geographic location by modifying the parametric data for the designated seismic event using all relevant key attributes. In some embodiments, multiple sets of values of the key attributes are predetermined. In this case, the processor 1922 can prepare a plurality of videos each combination of key attributes for each value of the key attributes.

The user device 1914, 1915 can also include a storage device 1924. A memory and a persistent storage are examples of storage devices 1924, which represent any structure(s) capable of storing and facilitating retrieval of information (such as data, program code, and/or other suitable information on a temporary or permanent basis). The storage device 1924 may represent a random access memory or any other suitable volatile or non-volatile storage device(s). The storage device 1924 may contain one or more components or devices supporting longer-term storage of data, such as a read only memory, hard drive, Flash memory, or optical disc.

The storage device 1924 can also include an AR plane manager application 1926, an AR mesh manager application 1928, and an AR camera manager application 1930. The processor 1922 can run the AR plane manager application 1926, the AR mesh manager application 1928, and the AR camera manager application 1930 for display or an electronic representation of physical effects and property damage resulting frame a parametric natural disaster event.

The AR plane manager application 1926, run using the processor 1922, can extract AR planes from a scene. The AR planes can be 3D planes that can be defined by a position, an orientation, and bounds. The AR planes can be rendered on a display 1920. The AR planes can also be classified into categories, such as wall, floor, ceiling, door, window, seat, table, none, etc.

The AR mesh manager application 1928 can mesh the Lidar point cloud in an AR wrapper. For example, the AR wrapper can be AR Foundation provided by Unity on platforms such as Apple iOS, such as iOS system ARKIT for Visual Inertial Odometry and 3D meshing, and Google Android. The 3D mesh consists of vertices, triangle definitions, and surface normal, as shown in FIG. 22. The 3D mesh can be organized in a form of regions. Each region can contain a 3D mesh, where the 3D mesh can be managed and updated independently from other 3D meshes.

The AR camera manager application 1930 can provide a tracked six degree of freedom pose of a camera 1916 at every frame. The AR camera manager application 1930 can extract a camera image and camera parameters at each frame for computer vision applications.

Although FIG. 19 illustrates an example of a system for display of an electronic representation of physical effects and property damage resulting from a parametric earthquake, various changes may be made to FIG. 19. For example, various components in FIG. 19 may be combined, further subdivided, replicated, omitted, or rearranged and additional components may be added according to particular needs.

Specifically, in some embodiments, the system for display of an electronic representation of physical effects and property damage resulting from a parametric earthquake event can be provided in a stand-alone mobile device such as, but not limited to, a mobile phone, tablet or similar consumer electronic device. In such embodiments, the user device 1914 itself incudes the processor 1922, display device 1920, input device (e.g., touch screen), camera 1916 (including optical cameras and, optionally, Lidar or other distance sensors), image storage 1918 and storage device 1924. In such mobile device-based embodiments, the device 1914 may also include an image recognition processor 1906, graphics animation processor 1908 and/or image rendering engine 1910 implemented in hardware or software on the mobile device instead of, or in addition to, processors accessed remotely through a network 1904 and server 1902. In such mobile device-based embodiments, the device 1914 may also include a seismic event database 1912 stored in the memory device instead of, or in addition to, a seismic event database accessible via the network.

Figure 20A:
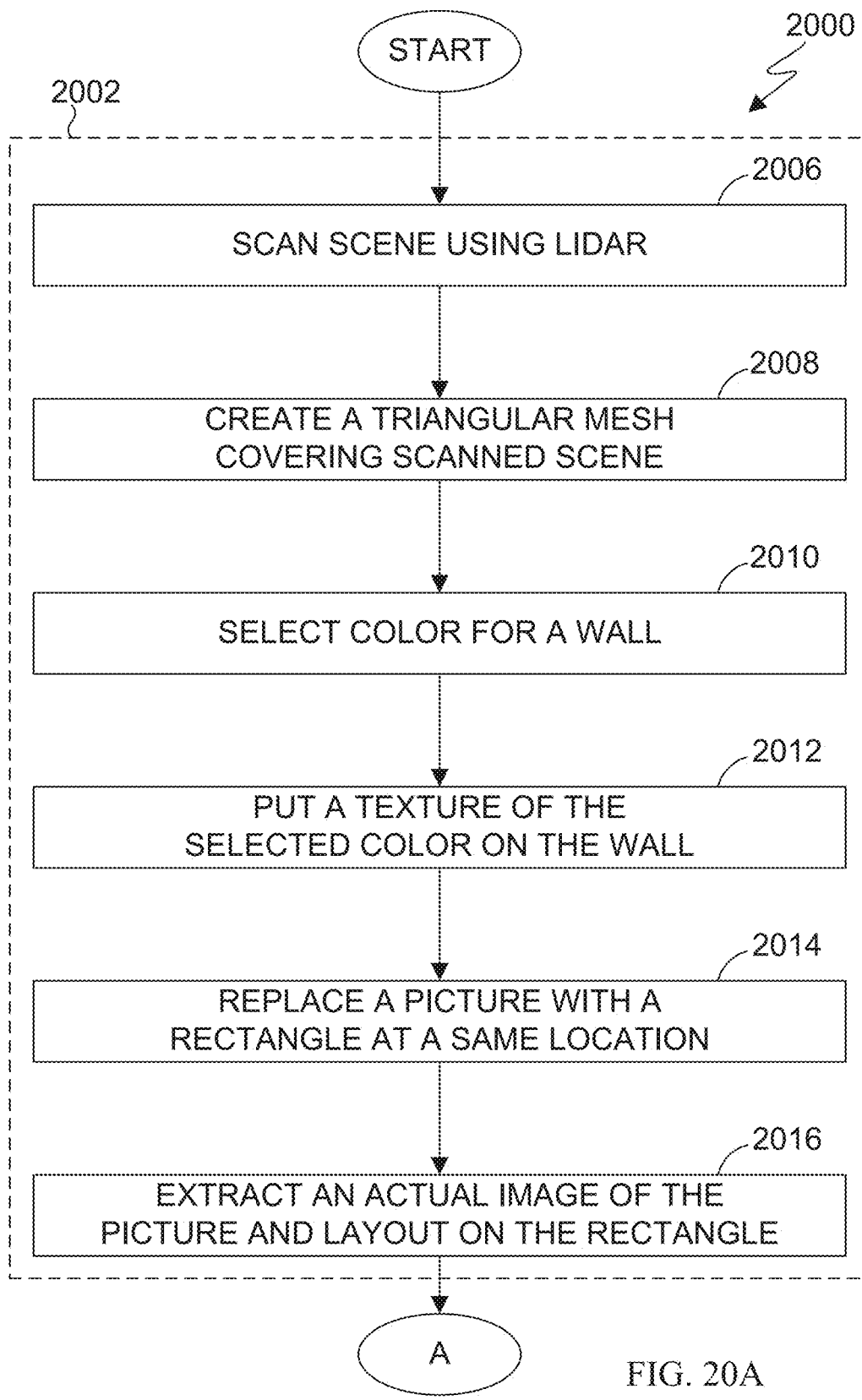
FIGS. 20A and 20B illustrate an example method for an AR earthquake visualization and assessment process in accordance with this disclosure.
Figure 20B:
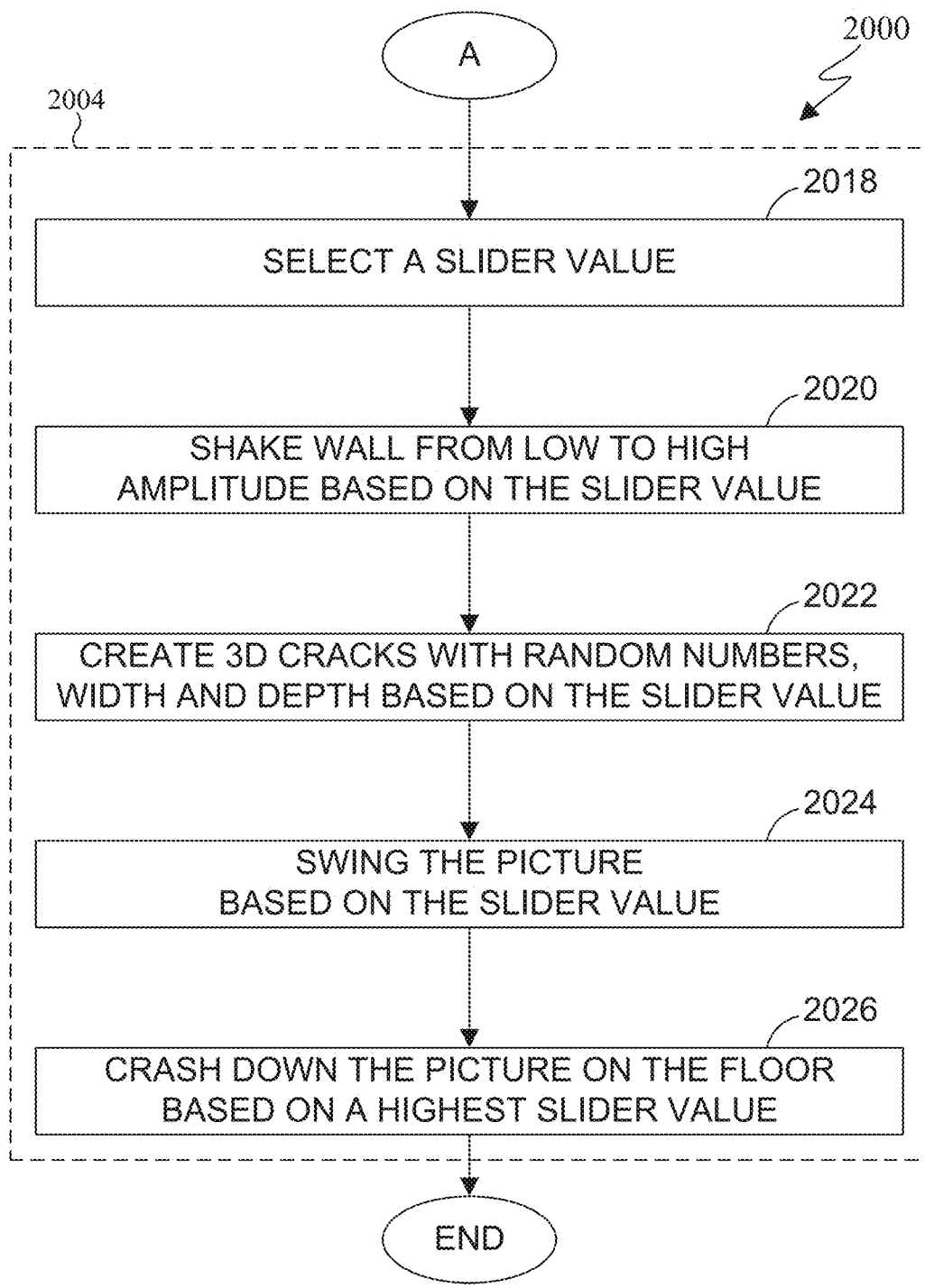

FIGS. 20A and 20B illustrate an example method for an AR earthquake effect visualization and assessment process 2000 in accordance with this disclosure. As shown in FIGS. 20A and 20B, the AR earthquake effect visualization process 2000 is provided to produce a visual representation of possible damage that would be caused in an earthquake. The earthquake effect visualization process can include a scene generation subprocess 2002 shown in FIG. 20A and a simulation sub-process 2004 shown in FIG. 20B.

As shown in the scene generation subprocess 2002 of FIG. 20A, the processor 1922 can scan a scene using an optical recognition method in operation 2006. In certain embodiments, the scene can be an interior of a room and one or more walls of the room can be scanned. The user device 1914 can further include a time-of-flight camera 1916 or Lidar sensor, which the processor 1922 can operate to scan the one or more walls, ceilings and/or floors of the room. The processor 1922 can group and detect scanned points from the scene into planes, which are stored in the AR plane manager 1926. In some embodiments, the operation 2006 includes detecting planes in the scene using the depth information from the optical camera and/or Lidar camera 1916. In some embodiments, the detection of planes in the scene of operation 2006 further includes determining, using the information from scan, that planes detected in the scene can be classified as one or more walls, ceilings and/or floors. In some embodiments, the determination of planes detected in the scene further comprises using 3-D camera position information or 6-D camera position and orientation information in association with the depth information.

The processor 1922 can also operate the camera 1916 to capture the wall, ceiling or floor as an orientation of the user device 1914 is rotate and moved around the room. One or more sensors of the user device 1914 can capture details for determining a camera pose for the camera 1916 as each frame of the wall, ceiling or floor is captured. The camera pose can be saved along with the Lidar information or each could be stored separately with a respective time stamp to match.

The processor 1922 can create a network mesh covering a scanned scene in operation 2008. In some embodiments, the network mesh can be a triangular mesh. In some embodiments, the network mesh can be a point cloud. In some embodiments, each surface or point of the mesh is determined based on a distance and/or orientation from an initial reference point. In some embodiments, each surface of the mesh is determined based on a distance and/or orientation from one or more planes in the scene. The network mesh can be determined based on a combination of the Lidar and the camera pose. In certain embodiments, the camera can be used in combination with the camera pose and other sensors on the user device 1914 to create the network mesh. The network mesh can be formed using one or more shapes, such as a triangular mesh.

The processor 1922 can select a texture for an AR background in operation 2010. The texture can be based on an image of the scene captured by the camera 1916. The processor 1916 can analyze the image and determine a texture for the AR background. Different types of textures that can be selected could include color, pattern, etc. The AR background can have one or more textures that can be selected. In certain embodiments, the camera can process an image of a wall in a room and determine a color and pattern for the wall to be used for the texture of the AR background to simulate the color and pattern on the actual wall. Alternatively, the texture of the AR background can be preselected on a user device, selected at the time of mesh generation, or read from a default setting in the memory. While a texture close to the actual background of the scene is preferable in some embodiments, a texture that is different from the background can be chosen in some instances to more clearly distinguish the AR background from objects in the scene.

The processor 1922 can put the selected texture on the AR background in operation 2012. Once the texture is selected based on operation 2010, the processor 1922 can build a mesh for a point cloud or a mesh for a 3D depth image as triangle definitions. The selected texture can be viewed on the display 1920 overlaid as texture on the generated mesh. This mesh is virtually placed in the scene on top of the background currently captured by the camera 1916 of the user device 1914. A dimension (e.g., depth or distance from the camera) for the background captured from the camera 1916 can be determined and the selected texture can be implemented in front of or behind physical objects in the scene where the background may be not visible. Using the depth value associated with each pixel in the background, the generated mesh with the selected texture can be placed relative (in front of/behind) to the objects in the background. This can be used to selectively hide or show objects in the scene.

The processor 1922 can replace an actual object in the scene with a corresponding AR shape (i.e., AR object) and at a corresponding location in the scene in operation 2014. Objects in the scene can be identified in front of the background. Objects in the scene may include, but are not limited to, all types of furnishings and personal property within residence or building such as tables, chairs, sofas, lamps, cabinets, chests, desks, books, bookcases, shelves, beds, stoves, ovens, microwave ovens, dishes, cups, glasses, window curtains, window blinds, pictures, artwork, clocks, vases, rugs, carpets, televisions, radios, electronic equipment (collectively "furnishings"). In some embodiments, the objects in the scene can be identified by evaluating the previously-created mesh for specific predetermined patterns. Such predetermined patterns may include, but are not limited to, mesh contours, mesh contour borders, mesh flatness, mesh depth from background (e.g., distance in front of the wall), mesh orientation from background (e.g., angle to wall). Such predetermined patterns may be stored in the memory 1924 of the user device 1914. In some embodiments, identified objects in the scene may be classified into one or more categories of like objects. In some embodiments, the method may allow the user to confirm whether the classification of the identified object in the scene is correct. In some embodiments, the user may be able to edit the classification of an identified object. The processor 1922 can determine dimensions, orientation, and position within the scene for each detected object. The processor 1922 can use the dimensions of the object to create a corresponding AR shape and use the orientation and position within the scene for placing the AR shape as an overlay for the object in the display 1920. The AR shape can correspond to a 3D representation of the object. The processor 1922 can extract and layout an actual image of the object in operation 2016. The processor 1922 uses the camera 1916 to capture one or more fames and can identify the object in the image frame using the position information to identify the object scene. The portion of the image frame corresponding to the position of the object can be extracted. The extracted portion of the image can be overlaid on the 3D shape as a virtual representation of the object. The virtual representation of the object refers to the 3D shape with the actual image overlaid. The actual image and the 3D shape can be manipulated as the virtual representation of the object.

For example, in one embodiment the operation 2014 may evaluate the mesh, identify an object in a scene, and then classify the object into a category of like objects, e.g., a framed artwork (i.e., "picture"), by evaluating one or more predetermined patterns in the mesh such as: a) rectangular shape, i.e., mesh face bounded by four straight contour lines; b) flatness, i.e., mesh face at a substantially constant (i.e., within a preselected tolerance) distance above the underlying background plane; c) shallowness, i.e., average distance of face mesh above the underlying background plane is within a preselected tolerance; and/or d) frame presence, i.e., presence of a substantially constant (i.e., within a preselected tolerance) mesh color around the edges of the object. In some embodiments, the method may request user confirmation that the object is correctly classified as a framed artwork. Once the object is identified as framed artwork, the processor 1922 can use the dimensions of the actual object to create a corresponding AR shape with the characteristics of a framed artwork. The processor 1922 may use the orientation and position of the actual object within the scene for initially placing the AR framed artwork as an overlay for the actual framed artwork in the display 1920. In other words, the AR object, in this case a rectangle, may be initially displayed in front of the actual object in the view shown on the display 1920. The AR background may be modified to extend over the area coinciding with the actual object in the view shown on the display 1920. A photo image of the actual object may be applied as a texture to the surface of the AR shape. Thus, the AR shape may initially appear to the user as the same shape and position of the actual object. The processor 1922 can subsequently move the position of the AR framed artwork on the display screen 1920 and the image of the actual framed artwork will be obscured by the AR background so that it is not visible on the display screen. In this manner, the AR framed artwork will appear to the user observing the display screen 1920 to be the actual framed artwork, but the AR framed artwork can be manipulated by the processor 1922, e.g., to move, to oscillate, to fall and/or to break, despite the fact that the actual framed artwork remains unmoved and intact.

As shown in the simulation subprocess 2004 of FIG. 20B, the processor 1922 can select one or more slider values in operation 2018. The slider values can be controls for a parameter or attribute of the seismic activity. For example, the slider can control an intensity, a time period, etc. Additional parameters or attributes of the seismic activity not controlled by a slider can have values entered prior to the simulation or read from a memory 1918. The processor 1922 can show a slider or other mechanism for selecting the parameter value or attribute of the seismic activity on the display 1920. In certain embodiments, the slider can control a current intensity and seismic activity would continuously occur at the selected current intensity until the current intensity is set to zero on the slider. In some embodiments, a touch-screen or physical buttons, voice commands or other inputs can be used for entering parameters or attributes of the seismic activity instead of, or in addition to, the slider.

The processor 1922 can generate simulated (e.g., AR) seismic activity for the scene in operation 2020. The AR seismic activity can be shown to the user through the display 1920 of the user device 1914. The AR seismic activity can cause the portion of the AR background that is currently visible to shift in the frame of view on the display 1920. The edge of the background can be moved in and out of the frame in the display according to the one or more slider values.

The processor 1922 can display simulated (i.e., AR) cracks in the AR background shown on the display 1920 based on the slider value in operation 2022. In some embodiments, the processor 1922 can dynamically generate AR cracks in the AR background during a simulated seismic event, i.e., the cracks may grow in length or width as the seismic event progresses. In some embodiments, the processor 1922 can create a random number of AR cracks with varying paths, widths and/or depths based on the slider value in operation 2022. In some embodiments, the processor 1922 can generate AR cracks featuring parallax shading to give the cracks the appearance of three-dimensional depth and width based on the point of view. The selected intensity of the simulation can be a factor for the crack generation. The crack generation can also be determined based on an amount of time that has passed and/or a total time of the simulation. For example, additional cracks may be formed as the time of the simulated seismic activity continues. In addition, the dimension of the cracks can change over time and based on the factors of the seismic activity.

In operation 2024, the processor 1922 can move or manipulate an AR object (i.e., the virtual representation of the object) shown on the display 1920 during a simulation of a seismic event. In some embodiments, the processor 1922 may determine the type of a movement or a manipulation to be applied to an AR object based on one or more seismic characteristics input by the user or received from the system. In some embodiments, the processor 1922 may determine the type of a movement or a manipulation to be applied to an AR object based on the category of like objects into which the object has been classified. In some embodiments, the processor 1922 may determine the type of a movement or a manipulation to be applied to an AR object based on specified or sensed characteristics of the AR object including, but not limited to the object's mass, size and/or material. In some embodiments, the processor 1922 may determine the type of a movement or a manipulation to be applied to the AR object by applying a combination of the factors described above. Types of movements of the AR object that may be applied by the processor 1922 and shown on the display 1920 include, but are not limited to, translation, rotation, oscillation, falling and rolling. Type of manipulations of the AR object that may be applied by the processor 1922 and shown on the display 1920 include, but are not limited to, cracking, breaking, burning, leaking, sparking and soiling. For example, if an object in the scene is classified as a type of object that may be manipulated with "oscillation," the processor 1922 can show the AR object swinging back and forth about a hinge point during the seismic event, and the magnitude of the swinging may be selected based on a seismic characteristic set by the slider value and/or on a characteristic of the object, such as its size. The virtual representation of the object can swing in relation to the background of the scene. In addition, if there are multiple AR objects in a scene, each virtual representation may swing independently from other virtual representations. In certain embodiments, a virtual representation of a picture frame can swing on a wall. While the virtual representation is swinging, the actual object is obscured by the wall set as a background in order for the swinging motion to not be disrupted by the actual picture frame.

In operation 2026, the processor 1922 can apply secondary manipulation types to the AR objects during a simulation of a seismic event. A secondary manipulation can be any manipulation that is applied only when predetermined conditions are met during a simulated seismic event. For example, if the AR object has a primary manipulation type of "oscillation" during a seismic event, the AR object may have a secondary manipulation type of "fall" if the magnitude of the shaking exceeds a preselected level, or if the shaking duration exceeds a preselected period. Thus, the processor 1922 will initially show the AR object oscillating (i.e., swinging) during a simulated seismic event, but will only show the AR object falling if the preselected conditions are met. If the preselected conditions are not met, the AR object will continue swinging according to the primary manipulation type. In some embodiments, the processor 1922 may show the virtual representation of the object fall to the floor based on a highest slider value in operation 2026. The virtual representation of the object can realistically drop to the floor using standard physics for a falling motion of the virtual representation. When the virtual representation of the object reaches another object or a ground level, the virtual representation can react with the other object or the ground level. For instance, a force could be applied to the other object based on the virtual representation dropping to the floor. The virtual representation can break or crack by the processor 1922 dividing the virtual representation into two or more part virtual representations. For instance, a picture frame can reach the ground level and cause a crack through the picture frame creating two separate parts of the picture frame. The two parts of the picture frame may operate independently for a remaining time of the simulation.

The virtual representation and background can be shaken independently. For example, a first picture frame can move independently from a second picture frame and a wall. The processor 1922 can create a set of parent coordinate transforms in an application, such as Unity. The parent transform can be an intermediate coordinate system between the world coordinate and children coordinates. The processor 1922 can set all sub-meshes from all regions that have a first face classification, such as "floor", to a first transform (also referred to as a parent transform) and all sub-meshes from all regions that have a second classification, such as "wall", to a second transform (also referred to as a child transform). The processor 1922 can set meshes that belong to a plane selected by a user as well as a plane with render cracks to a third transform. The processor 1922 can apply separate random shaking to each of the parent transforms in order to simulate differently classified virtual objects. Parent meshes ensure that a position of the sub meshes with respect to the parent transform remain constant. However, the position of the parent transform with respect to the world is allowed to change. This allows all meshes assigned to a common classification to move together.

The shaking and falling of objects, such as picture frames, can be performed by implementing Rigid body mechanics using a physic engine, such as but not limited to Unity Physics Engine, which is a standard game engine functionality provided by Unity. The standard game engine can simulate accelerations, connections, joints, and collisions between virtual objects. The selected wall plane and each picture frame can be assigned rigid body functionalities, which allows the objects to interact with each other in forms such as collisions, forces, constraints, and accelerations. The physics engine can provide functions that allow rigid bodies to relate to each other in a form of constraints. The physics engine can then iteratively solve multi-body simulation to give a position of the rigid bodies given the current position, constraints, and external forces/accelerations. The overall steps for this procedure can include (1) assigning rigid body functionalities to various identified AR objects in the scene, (2) adding constraints, such as joints, links, etc. between the instantiated virtual objects, and (3) adding acceleration or movement to one or more AR objects.

Although FIGS. 20A and 20B illustrate an example method for an earthquake effect visualization process 2000, various changes may be made to FIGS. 20A and 20B. For example, while shown as a series of steps, various steps in FIGS. 20A and 20B may overlap, occur in parallel, occur in a different order, or occur any number of times.

Figure 21A:
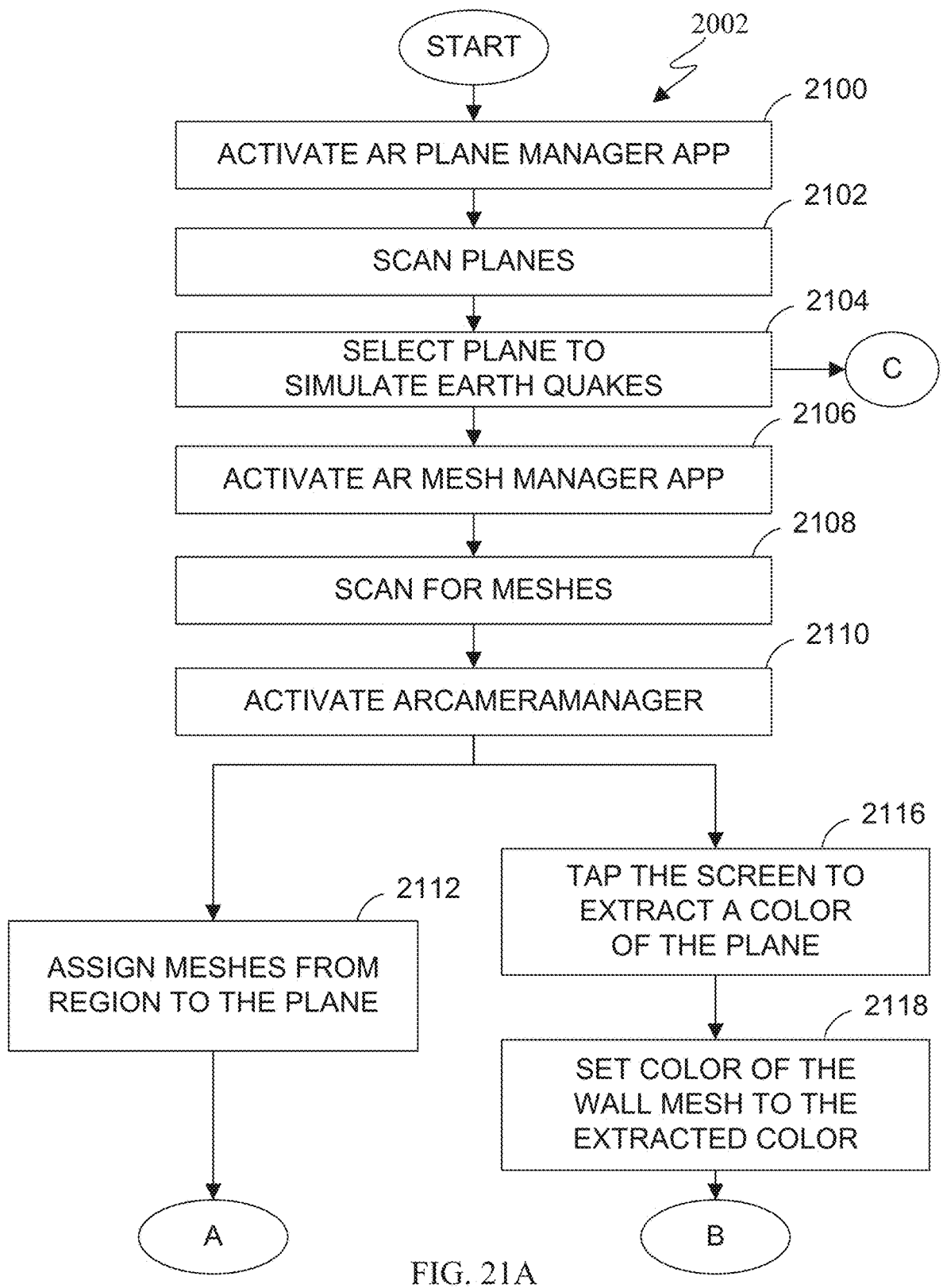
FIGS. 21A and 21B illustrate an example method for a scene generation process in accordance with this disclosure.
Figure 21B:
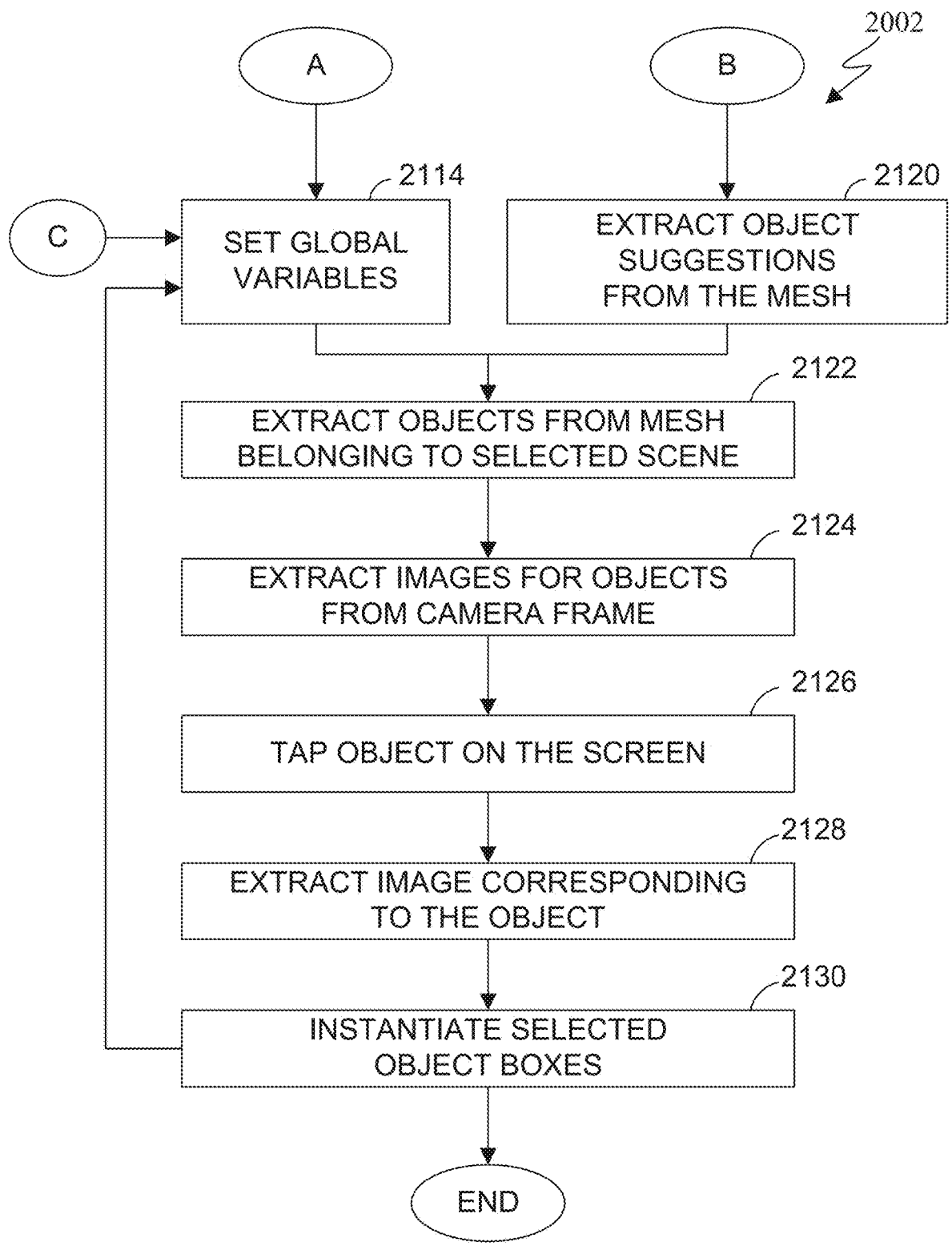

FIGS. 21A and 21B illustrate an example method for scene generation process 2002 in accordance with this disclosure. As shown in FIG. 21A, the processor 1922 can activate AR plane manager application 1926 in operation 2100. The AR plane manager application 1926 can create, update and remove objects with AR plane components.

The processor 1922 can scan planes in a scene in operation 2102. The planes can be converted to AR planes by the AR plane manager application 1926. The scanning of the planes can be performed by a Lidar sensor and a camera sensor. While the planes are scanned, other sensors on the user device 1914 can detect different information to be used with lidar information and camera information. Details of the AR plane can include position information, orientation information, bound information, etc. The planes can be classified by the AR plane manager application 1926. Non-limiting examples of classifications of the planes can include wall, floor, ceiling, door, window, none, etc.

The processor 1922 can select one or more planes to simulate an earthquake in operation 2104. The plane can be selected based on a current frame captured by the camera, selected by a user, etc. In certain embodiments, the planes can be selected based on a number of objects associated with the plane, between the camera and the plane, etc.

The processor 1922 can activate an AR mesh manager application 1928 in operation 2106. The AR mesh manager application 1928 can manage network meshes generated by the user device 1914. The AR mesh manager application 1928 can create, update, and/or remove virtual objects in response to the environment.

The processor 1922 can scan for meshes in operation 2108. The AR mesh manager application 1928 can be used to manage, store in memory, or perform operations on the meshes scanned by the processor. The meshes can be defined and/or categorized by the AR mesh manager application 1928 as belonging to various object classes such as but not limited to wall, floor, door, window, seat, none, etc. Meshes can be associated with objects in the scene in addition to a background. For example, meshes can be defined as part of a wall and part of one or more picture frames on the wall.

The processor 1922 can activate an AR camera manager application 1930 in operation 2110. The AR camera manager application 1930 can provide texture information and light estimation information. The AR camera manager application 1930 can also provide camera calibration parameters such as focal length, principle point, etc. The AR camera manager application 1930 can extract a camera image and camera parameters (such as camera pose parameters).

The processor 1922 can set global variables for the earthquake and also data extracted from the scanning process in operation 2114. The global variables can be received from a user selection on the display 1920 or input of the user device 1914. Non-limiting examples of the global variables can include seismic intensity, seismic duration, direction of seismic origin, etc. The global variables can also include variables associated with the selected plane, meshes that are not associated with the plane, meshes that are associated with the plane, virtual representations of object, etc.

The processor 1922 can extract a color of a selected plane in operation 2116. In certain embodiments, the user device 914 can receive an input from a user for selecting a color of the selected plane, such as a tap on the display 1920 of the user device 1914. The AR camera manager application 1930 can provide a camera image and the processor 1922 can determine a location in the camera image corresponding to a location of the tap on the display 1920. The processor 1922 can determine a color at the location in the camera image to extract. In certain embodiments, the processor 1922 can extract a color based on other factors, such as but not limited to color at user tap position, an average color of the wall, a pattern on the wall, etc.

The processor 1922 can set a color for a mesh according to the extracted color in operation 2118. The AR camera manager application 1930 and/or processor 1922 can take the extracted color and apply the color to the mesh corresponding to the background of the scene. In certain embodiments, the AR camera manager application 1930 can apply the extracted color to a wall in a room.

The processor 1922 can extract object suggestions from the mesh in operation 2120. The processor 1922 can identify meshes corresponding to one or more objects in the scene. The meshes of different objects in the scene can overlap and the processor 1922 can distinguish different objects using the AR camera manager application 1930.

The processor 1922 can extract objects from the mesh belonging to a selected scene in operation 2122. Meshes that are not assigned to one or more of the planes, backgrounds, walls, etc. can be determined by the processor to be objects. The objects can be individually processed by the processor 1922 for details of the objects, such as dimensions, orientation, position, etc. The extraction of the objects from the mesh is described in greater detail corresponding to the FIGS. 23A and 23B.

The processor 1922 can extract images for an object in a camera frame in operation 2124. The processor 1922 can extract one or more camera images supplied by the AR camera manager application 1930. The camera images can be continuously captured based on movement of the AR camera in order to capture the object from different angles. In certain embodiments, the processor 1922 can capture camera images including one or more picture frames.

The processor 1922 can determine that vertexes of the objects are clearly visible in the camera frame in operation 2126. Using the AR camera manager application 1930, the processor 1922 can identify each vertex of an object shown in the camera image. Camera images where the object is only partially visible can be skipped or used for clearly identified vertexes.

The processor 1922 can extract an image corresponding to the object in operation 2128. The details of the objects can be used by the processor 1922 to identify an actual object in the camera image and extract a partial image for the actual object. For example, the processor 1922 can identify a picture frame in one or more camera images and make sure that all the corners of the picture frame are clearly visible in each camera image. The extraction of the image corresponding to the objects is described in greater detail corresponding to the FIGS. 24-26C.

The processor 1922 can instantiate selected objects in operation 2130. The processor 1922 uses the AR camera manager application to overlay the actual image of the object over the corresponding meshes associated with the object in the AR scene. For example, an actual image of a picture frame can be overlaid over meshes associated with the picture frame.

Although FIGS. 21A and 21B illustrate an example method for scene generation process 2002, various changes may be made to FIGS. 21A and 21B. For example, while shown as a series of steps, various steps in FIGS. 21A and 21B may overlap, occur in parallel, occur in a different order, or occur any number of times.

FIG. 22 illustrates example meshes for assigning to a plane in accordance with this disclosure. As shown in FIG. 22, meshes can be assigned to a plane, such as in operation 2112. A goal of operation 2112 is to separate meshes into belonging to a plane or not belonging to a plane, such as a wall. The AR mesh manager application 1928 can define each mesh, such as a first mesh 2200 and a second mesh 2202, as a list of vectors, such as a first vertex 2204, a second vertex 2206, a third vertex 2208, and a fourth vertex 2210, in a 3D space, a triangle defection, a face classification, etc. For example, the vectors in 3D space can be defined as ([0, 0, 0], [1, 0, 0,], [1, 1, 0], [0, 1, 0]). The triangle definition can be defined by the vertices as ([0, 2, 1], [0, 3, 2]), where the first mesh 2200 is formed of the first vertex 2204, the third vertex 2208, and the second vertex 2206, and the second mesh 2202 is formed of the first vertex 2204, the fourth vertex 2210, and the third vertex 2208. The face classifications can be defined as wall or none as shown in FIG. 22.

The AR wall plane that was selected during the plane scan process provides information such as plane position and orientation, plane boundaries in a plane space coordinate, and a 3D parametric plane equation [a, b, c, d] such that ax+by+cz+d=0 for all 3D points [x, y, z] that lie on the plane.

Using this information, the processor 1922 to perform operation 2112 uses a function to separate mesh points from belonging to a room plane and not belonging to the room plane, depending on whether the points satisfy the following conditions. (1) Points can be at most 0.1 m from a plane surface. Therefore, the at most absolute value of distance of a point [x1, y1, z1] to plane [a, b, c, d] is less than 0.1 m. (2) The point, lies within the plane boundaries to check if a point lies inside the plane boundaries. First transform the point from world space to plane space. Let x_W=[x1, x2, x3] be the point in world space and x_P=[xp1, xp2, xp3] be the point in plane space, R_p be the rotation matrix of the plane in world space, and P=[P1, P2, P3] be the position of the plane in world coordinates. Then the transformation shown in equation 1 holds and the inverse transformation is shown in equation 2.

$$x\_W = R\_p * x\_P + P \tag{1}$$

$$x\_P = \text{Inverse}(R\_p) * (x\_W - P) \tag{2}$$

(3) The processor 1922 can check whether the point in plane space x_P lies inside the boundaries of the plane. The y coordinate of the point can be dropped in order to obtain a corresponding 2D coordinate of the point in the plane space. i.e. x_P=[xp1, xp2, xp3]==[xp1, xp3] in the 2D plane space, since the normal of the plane is the local y axis. (4) Finally to find out whether the point x_P belongs to the plane or outside the plane, the processor 1922 can compute the Winding Number for the points. If the winding number of the point does not equal to 0, then the point lies inside the plane boundaries. If the winding number of the point equals 0, the point lies outside the plane boundaries.

Although FIG. 22 illustrates an example meshes for assigning to a plane, various changes may be made to FIG. 22. For example, various components in FIG. 22 may be combined, further subdivided, replicated, omitted, or rearranged and additional components may be added according to particular needs.

FIGS. 23A and 23B illustrate an example object extraction 2300 from mesh in accordance with this disclosure. As shown in FIG. 23A, an object, such as a picture frame, can be extracted from a mesh. From operation 2112, the meshes can be categorized as a wall mesh 2302 or a none mesh 2304 at this point. Using the AR mesh manager 1928, the processor 1922 can get the classification for each triangle in the mesh. The processor 1922 can identify the triangles that are classified as "none". The bounds of the disjointed meshes 2306 that have a classification of "none" can be used as initial bound cuboid 2308 as picture frame proposals.

The processor 1922 can use a modified version of the union find algorithm with path optimization to determine the bounds 2306 of the disjointed meshes. The union find algorithm was originally designed to solve Kruskal's minimum spanning tree algorithm. The main goal of the union find algorithm is to have an efficient method of extracting and storing disjoint sets of nodes in a tree. The processor 1922 can find the disjoined meshes 2306 of vertices inside a mesh that belongs to the class "none". As a non-limiting example, two picture frames exist inside of a single Mesh definition and need to be separated into two sub-meshes. The processor 1922 can use union operation to group two nodes into a single group and a find operation to find a parent of the group to which a node belongs to. This method can be adapted by assigning nodes to each vertex 2204-2210 in the mesh as a node and use the triangle definitions as union operations as shown in FIG. 23B.

As shown in FIG. 23B, each vertex 2204-2210 is assigned individual parent meshes. The goal is to set the parents of those vertices that are joined by a line to a common parent. According to the triangle definition [0, 3, 2] results in lines joining the indices [0, 3], [3, 2], [0, 2], which leads to join operations [0, 3], [3, 2], [0, 2]. The first step uses union operation [0, 2] to assign the third vertex 2208 as a child of the first vertex 2204. The second step uses operation [3, 2] to assign the second vertex 2206 as a child of the third vertex 2208. The third step uses operation [0, 3] but both have already been assigned to the group making this operation redundant. This operation is repeated for each triangle with a face classification as "none". The maximum bounding cube 2308 can be computed by extracting the maximum span of all the vertices of each sub-mesh. The bounding cube 2308 is then displayed to the user as a prospective object, such as a prospective picture frame.

Although FIGS. 23A and 23B illustrates an example object extraction 2300 from mesh, various changes may be made to FIGS. 23A and 23B. For example, various components in FIGS. 23A and 23B may be combined, further subdivided, replicated, omitted, or rearranged and additional components may be added according to particular needs.

Figure 24:
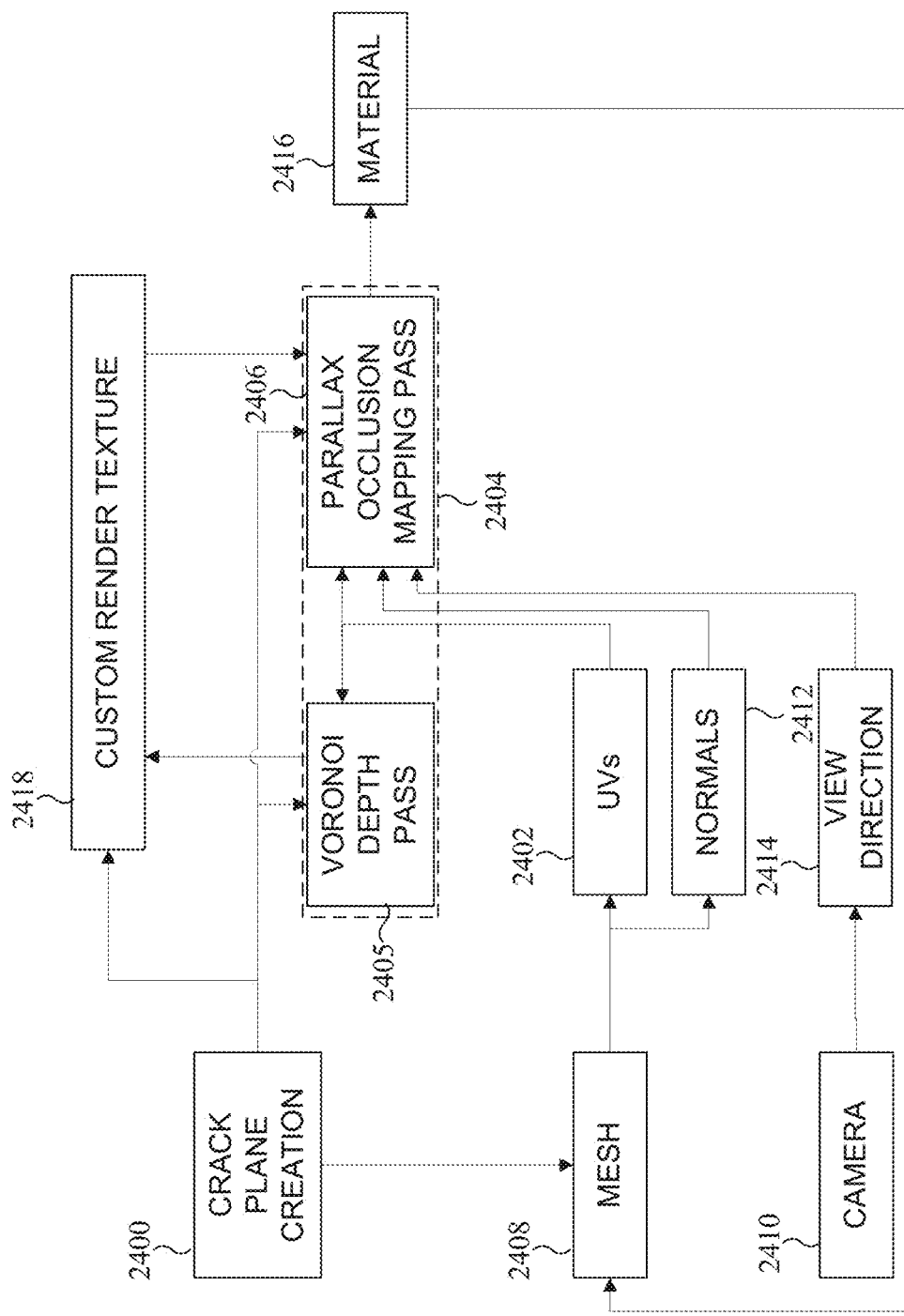
FIG. 24 illustrates an example method for a crack creation algorithm in accordance with this disclosure.

FIG. 24 illustrates an example method for a crack creation algorithm 2400 in accordance with this disclosure. As shown in FIG. 24, a crack creation algorithm can utilize shader processes that rely on modern mobile GPUs for efficient parallel processing, allowing real-time display of many previously expensive graphics algorithms. The crack creation algorithm used here is performed in two main passes. The first pass utilizes Voronoi noise functions to create a crack-like grayscale depth map. This pass solely requires standardized UV coordinates as an input (as well as custom variables for modifying noise density, width, etc). This shader pass is saved to memory via a texture buffer (known in Unity as a custom render texture [CRT]) to be sent to the second shader pass. The second pass utilizes a technique known as parallax occlusion mapping (POM) to cheaply create a sense of 3D depth. As inputs, this pass requires mesh UVs, mesh normal vectors, camera view direction, and a texture (the CRT from the initial pass), as well as depth amount custom parameter. POM requires a depth texture for sampling and thus it is necessary to create a texture in the first pass that is then passed to the POM algorithm in a second pass.

The crack creation algorithm 2400 can utilize UV mapping 2402 to project the shader algorithm 2404 onto the chosen mesh. The UV mapping algorithm 2402 is described in greater detail in FIGS. 25A and 25B. The Voronoi noise algorithm 2404 is described in greater detail in FIGS. 26A-26C.

The crack creation algorithm 2400 can utilize a mesh 2408 and a camera image 2410 to form pseudo 3D cracks on a plane. The crack creation algorithm 2400 can obtain mesh information such as UV coordinates and normal (x, y, z) vectors 2412 from the chosen mesh 2408. The camera image 2410 can include other details, such as camera pose information, that can be used to determine a view direction 2414 that is applied in the parallax occlusion mapping (POM) pass.

Voronoi noise is a noise function that utilizes distance functions between tiled points to obtain consistent cell like boundaries and spaces. To create a randomized domain of the Voronoi noise, the Voronoi noise pass algorithm 2405 can choose a random seed that connects to multiple randomizers. For example, the random seed can be chosen based on a time in the application. The randomizers can take a standardized UV input (linear gradient from 0-1 on x and y axis) and offset/scale the standard UV coordinates (0-1) randomly in order to generate different variations of noise for displacement. To obtain more vertical or horizontal cracks, the scaling of the UV coordinates can be adjusted separately. These UV values are plugged into two Voronoi noise generation subshaders, a subshader used for the U values 2504 (X-axis) and a subshader used for the V values 2506 (Y-axis). The two subshaders can be centered around 0 (−0.5 to 0.5) and combined into a single image consisting of U displacement on a red channel and V displacement on a green channel. The processor 1922 can use a multiply value to scale a displacement and/or distortion amount to be applied to the main Voronoi generation. The displacement/distortion amount can be added to an initial UV coordinate of the mesh geometry in a process known as domain warping. This warped UV space is then plugged into a final Voronoi subshader as the UV input. The processor 1922 can clamp the output using a smoothstep function to create sharp cell-like edges. This is saved into the memory via a custom render texture feature from Unity.

The custom render texture algorithm 2418 can allow an output of a shader to be saved into a texture and passed to various locations with Unity and allow for multiple passes. Within the crack plane creation script 2400, the Voronoi depth shader can be called with desired parameters to render into a texture via the custom render texture algorithm 2418.

The texture from the custom render texture algorithm 2418 can be used as an input to the parallax occlusion mapping (POM) pass algorithm 2406. The POM pass algorithm 2406 can apply shader to a mesh material 2416 as a final output to be shown with the display.

Although FIG. 24 illustrates an example method for scene generation process 2002, various changes may be made to FIG. 24. For example, while shown as a series of steps, various steps in FIG. 24 may overlap, occur in parallel, occur in a different order, or occur any number of times.

Figure 25A:
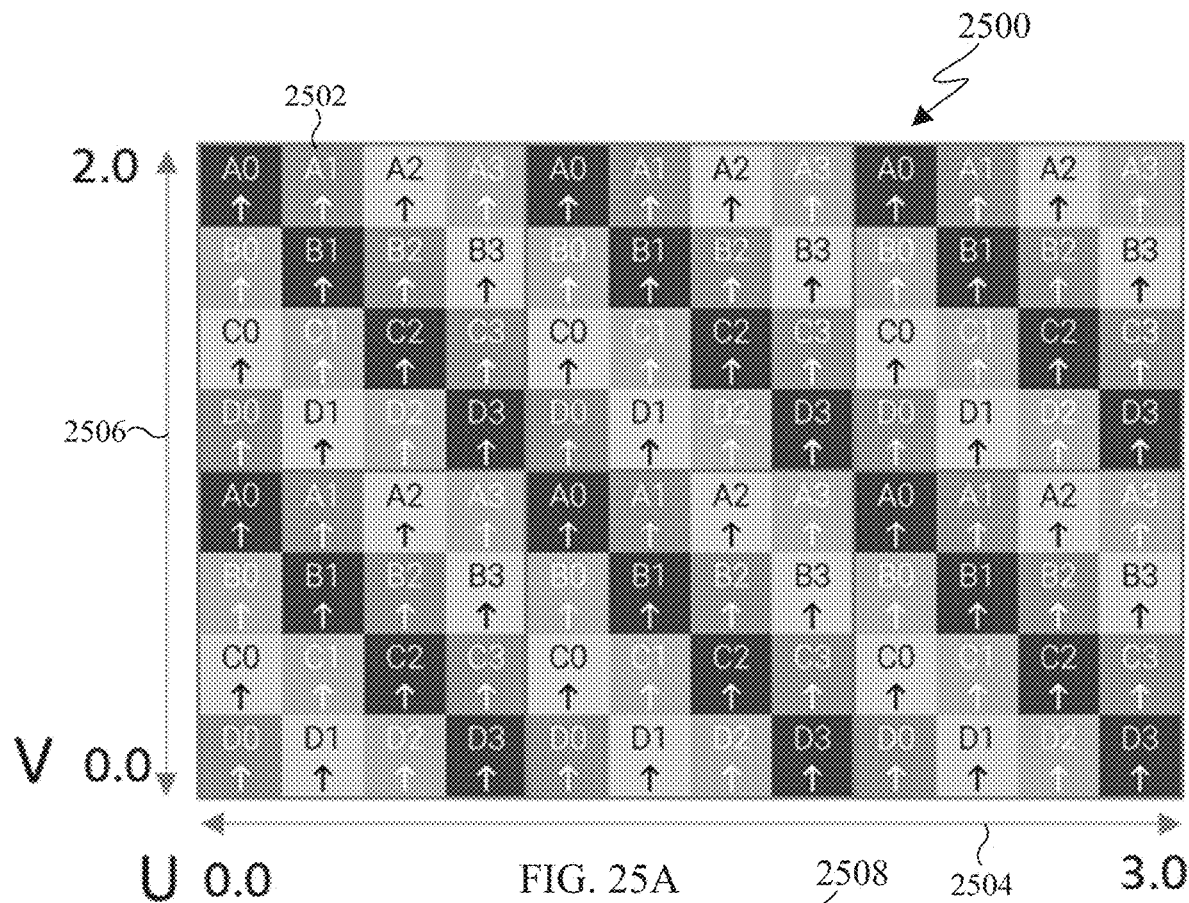
FIGS. 25A and 25B illustrate an example UV mapping for the crack creation algorithm in accordance with this disclosure.
Figure 25B:
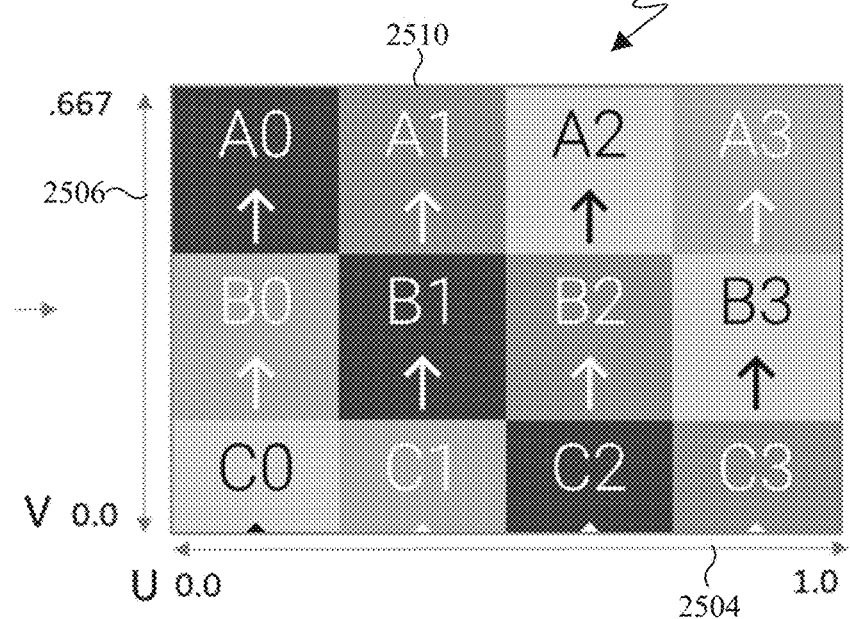

FIGS. 25A and 25B illustrate an example UV mapping algorithm 2402 for the crack creation algorithm 2400 in accordance with this disclosure. As shown in FIGS. 25A and 25B, UV checker maps 2500 and 2501 are examples for showing how to fit a texture onto a rectangular surface while keeping an aspect ratio. In certain embodiments, the UV checker map can be replaced by the crack shader. In certain embodiments, crack width and depth can be adjusted based off a scaling amount of the UVs to cheaply fit the shader onto various shaped walls. UV mapping can be used to project a procedurally generated texture onto the selected wall plane geometry from a capture process. The captured geometry can designate UV coordinates to a specific location on the mesh where 2D textures can be mapped. In certain embodiments, the values for the 2D texture can be between 0.0 and 1.0.

The processor 1922 can hold the UV blocks 2502 as a steady size. Therefore, a number of UV blocks 2502 is proportional to a size of the wall and, as the wall size increases, more UV blocks 2502 are utilized. UV blocks 2502 can be normalized between 0 and 1 in order to keep a constant aspect ratio. To normalize, an absolute value of the minimum value for the U value 2504 and V value 2506 to the actual values of the U value 2504 and the V value 2506 for each UV block 2502. The actual values of the U value 2504 and the V value 2506 for each UV block 2502 can be divided by a maximum value between the U values 2504 and the V values 2506. For example, the maximum value for the U value 2504 is 3.0 and for the V value 2506 is 2.0, which means the maximum value used to divide with is 3.0 resulting in a normalized UV table 2508 of normalized UV blocks 2510.

Although FIGS. 25A and 25B illustrate an example UV mapping for the crack creation algorithm, various changes may be made to FIGS. 25A and 25B. For example, various components in FIGS. 25A and 25B may be combined, further subdivided, replicated, omitted, or rearranged and additional components may be added according to particular needs.

Figure 26C:
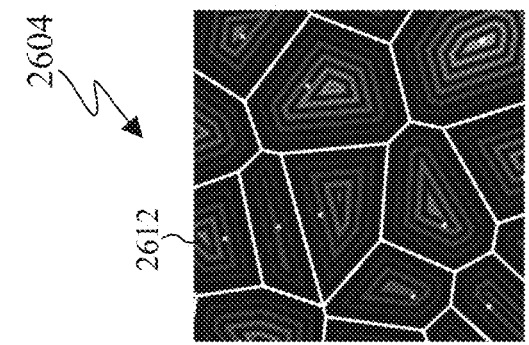
FIGS. 26A-26C illustrate an example Voronoi noise for the crack creation algorithm in accordance with this disclosure.
Figure 26B:
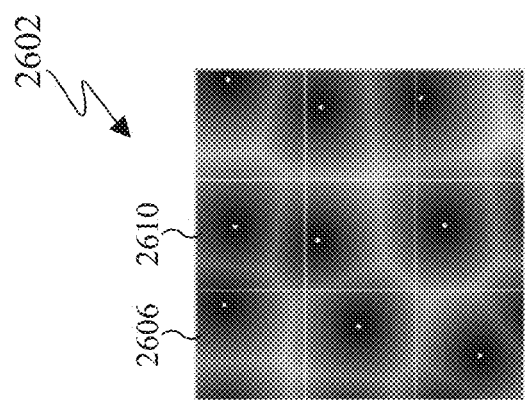
Figure 26A:
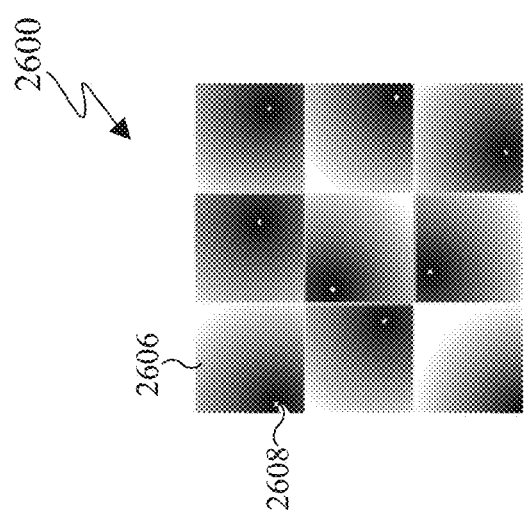

FIGS. 26A-26C illustrate an example Voronoi noise pass algorithm 2405 for the crack creation algorithm 2400 in accordance with this disclosure. While the Voronoi noise pass algorithm 2405 is described being performed by processor 1922, the Voronoi noise pass algorithm 2405 can also be performed as a shader pass using a parallel computation graphic processing unit. In particular, FIG. 26A illustrates an individual cell distance function 2600, FIG. 26B illustrates a neighbor cell distance function 2602, and FIG. 26C illustrates a Voronoi block 2604. As shown in FIGS. 26A-26C, a Voronoi noise pass algorithm 2405 can be used to define and delineate proximal regions around UV blocks 2502 using the boundaries of the UV blocks 2502. The processor 1922 can subdivide the normalized UV block 2510 from the UV table 2508 to get smaller square cells 2606. The processor 1922 can randomly generate a point 2608 in the cells 2606. A distance can be calculated for each pixel in the cell 2606 from the point 2608 in the respective cell 2606.

The Voronoi noise pass algorithm 2405 can generate a usable seamless distance function by searching neighboring cells 2610. The processor 1922 can calculate a distance from each pixel to a nearest point either in a respective cell or a neighboring cell. This distance calculation is performed to determine a minimum distance to a point from the current pixel across all searched cells. The neighbor cell distance function 2602 is shaded to reflect this distance calculation for each pixel to the closest point in any cell, as shown in FIG. 26B.

As shown in FIG. 26C, the Voronoi block 2604 has the borders from the cells 2606 redrawn to show Voronoi cells 2612. Instead of a search of one cell 2606 around a current cell, a more accurate two cell search can be performed. When points in neighbor cells are close together, a one cell radius can lead to distortions near borders. To create an edge effect on the Voronoi cells 2612, a second closest point is tracked along with the closest point to calculate the distance to cell borders. A distance function of the second closest point can be assigned a variable F2 and a distance function of the closest point can be assigned a variable F1. Using F1 and F2, the processor 1922 can determine pseudo-border on the Voronoi cells 2612 with help of a smoothstep function and/or clamping function.

Although FIGS. 26A-26C illustrate an example Voronoi noise 2600 for the crack creation algorithm, various changes may be made to FIGS. 26A-26C. For example, various components in FIGS. 26A-26C may be combined, further subdivided, replicated, omitted, or rearranged and additional components may be added according to particular needs.

Figure 27:
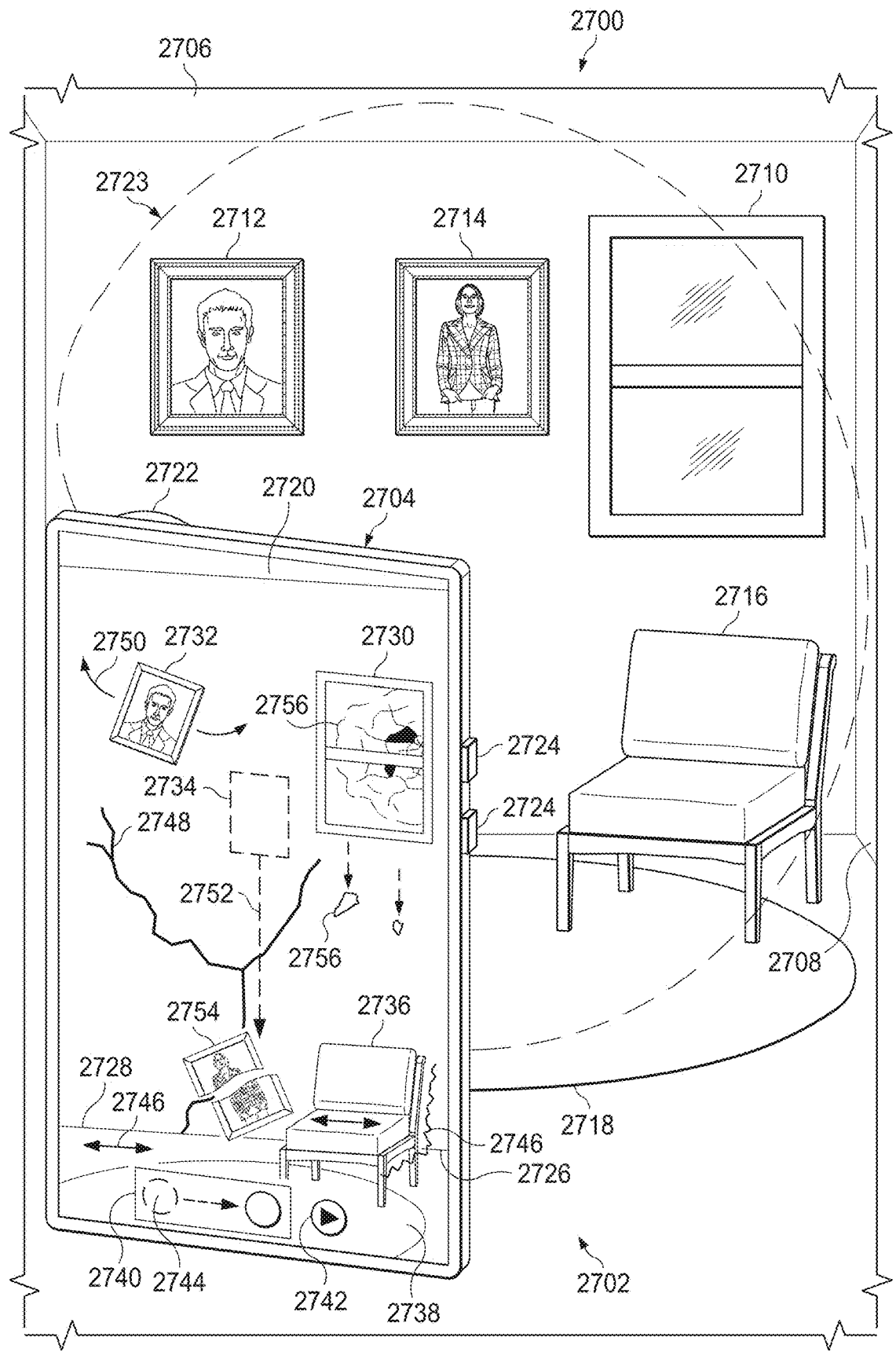
FIG. 27 illustrates an example AR earthquake visualization and assessment system in accordance with this disclosure, namely, from the viewpoint of a user holding a mobile device (the user's hand is not shown) displaying an AR earthquake scene based on the actual room scene visible behind the mobile device.

FIG. 27 illustrates an example AR earthquake visualization and assessment 2700 in accordance with this disclosure.

In particular, FIG. 27 illustrates the user's point of view as the user holds a mobile device directed towards a portion of the room (the user's hand is not shown). The system is shown generating an AR earthquake scene on the display screen based on the actual room scene visible behind the mobile device. As shown in FIG. 27, The AR earthquake visualization and assessment 2700 can include a scene 2702 and a user device 2704. The scene 2702 includes a wall 2706, a floor 2708, a window 2710, a first picture 2712, a second picture 2714, a chair 2716, and a rug 2718. However, the scene 2702 can include any other type of object and any number of a specific object.

The user device 2704 can include a display 2720, one or more sensors 2722 (e.g., optical camera, time of flight camera, etc.), and one or more physical inputs 2724 (e.g., buttons, switches, etc.). The user device 2704 can use a scan area 2723 one or more sensors 2722 to scan the scene 2702 and detect the background (e.g., wall 2706 and floor 2708) and objects (a window 2710, a first picture 2712, a second picture 2714, a chair 2716, and a rug 2718). The user device 2704 can create virtual or AR representations of the scene 2702 and present representations on the display 2720. For example, the display 2720 shows an AR wall 2726, an AR floor 2728, an AR window 2730, an AR first picture 2732, an AR second picture 2734, an AR chair 2736, and an AR rug 2738 corresponding to the respective backgrounds 2706 and 2708 and objects 2710-2718.

The AR backgrounds and AR objects can have characteristics individually determined applied during and/or after the scanning process. For example, a weight, material, roughness factor, etc. can be estimated for an AR object. The characteristics can be used for each manipulation of the AR background and the AR objects. In certain embodiments, a value can be assigned to each of the AR backgrounds and the AR objects. The value can be based on a purchase value, an actual value, an input value, a replacement value, etc. The values can be stored in a table, such as inventory table 2800 shown below in FIG. 28, in the memory of the user device 2704, which can be viewed separately or in combination with the AR environment. The values can also be shown with AR objects as each AR object is selected or as the value is determined. The values that are shown with the AR objects can disappear after a period of time or approval by the user. The values can be adjusted by the user.

Values for damage can be determined based which of the following AR effects are applied to a respective AR background or AR object. The values for damage can be based on a repair value, a replacement value, etc. The values for damage can be calculated based on an estimated amount of damage and for an amount of damage exceeding a threshold, an AR object can be considered fully damaged or destroyed. The values for damage can be saved in the table in the memory of the user device 2704. The damage values can be shown on the respective AR background or AR object that receives the damage. The damage values can disappear after a period of time or selection from a user. The damage values can include a total damage for the seismic activity applied to AR representation of the scene 2702.

As shown in FIG. 27, the AR background and AR objects can be manipulated on the display 2720 while remaining unaffected in the scene 2702. As the user device 2704 is moved around the room, the display 2704 updates a current status of the objects. The one or more sensors 2722 can capture the actual room and the display can show the room in a current state of seismic activity. The display 2720 can also display controls (such as a seismic attribute control 2740 and a start button 2742. The seismic attribute control 2740 can an input 2744 that can be adjusted. The adjustment can control the seismic attribute, such as intensity, duration, etc., by controlling the input 2744. In the illustrated example, the input 2744 can be a slide mechanism, value entry, knob, etc. The input 2744 can be controlled on a touchable display or using the one or more physical inputs 2724. The start button 2742 initiates a seismic event on the display based on the input 2744 provided on the seismic attribute control 2740.

The display 2720 can apply a vibration or shaking effect 2746 to an AR background or an AR object, such as the AR wall 2726 and the AR floor 2728. The shaking effect 2746 can be applied equally to the AR backgrounds or can be applied stronger or weaker to the specific AR backgrounds. The shaking effect 2746 applied to the AR background can be additionally applied to each of the AR objects in a manner of equal characteristics or reduced effectiveness characteristics. The reduced effectiveness characteristics can include lower shaking intensity transferred from the background, lower resistance (increased duration of shaking), etc. An amount of the vibration for the AR background or AR object can be controlled based on the input 2744 to the seismic attribute control 2740.

The display 2720 can apply a cracking effect 2748 on an AR background or an AR object, such as the AR wall 2726. The cracking effect 2748 can cause a 3D crack to form in the AR background. The 3D crack can be viewed from different angles to show a depth to the 3D crack. The cracking effect 2748 can include a 3D crack that extends from a first AR background to a second AR background. For example, the cracking effect 2748 can begin on the AR wall 2726 and extend to an AR ceiling, an AR second wall, and/or the AR floor 2728. A 3D crack on an AR background, such as the AR wall 2726, can extend behind and hidden an AR object to continue extending past the AR object in view on the display 2720. A size and growth rate for the 3D crack on the AR background or AR object can be controlled based on the input 2744 to the seismic attribute control 2740.

The display 2720 can apply a swinging effect 2750 to an AR object, such as the AR first picture 2732. The swinging effect 2750 can cause the AR object to shake similarly to the AR background contacting the AR object due to a fixed pendulum that the swinging occurs about. The swinging effect 2750 on the AR object can include a translation component equal to the vibration or shaking effect 2746 of the AR background. A swing rate for the swinging of AR object can be controlled based on the input 2744 to the seismic attribute control 2740.

The display 2720 can apply a falling effect 2752 to an AR object, such as the AR second picture 2734. The falling effect 2752 can move the AR object separately from the AR background and other AR objects. The falling effect 2752 can be based on gravity for controlling a falling rate and/or a falling speed. The falling effect 2752 can use an estimated or determined weight of the AR object to determine a force that could be applied to other AR objects and/or AR backgrounds. A timing for the falling of AR object can be controlled based on the input 2744 to the seismic attribute control 2740.

In certain embodiments, a secondary effect can be applied to an AR object, such as the AR second picture 2734. For example, a falling effect on an AR object causes the AR object to forcefully contact an AR background, such as the AR floor 2728, or another AR object, such as the AR chair 2736. A secondary effect of the falling effect could be a breaking effect 2754. The display can apply the breaking effect 2754 to the AR object, such as the AR second picture

2734. Other examples of secondary effects can include, a bouncing effect, a ricochet effect, a merge effect, striking effect, etc.

The breaking effect 2754 can cause the AR object to split into multiple AR partial objects. Each of the multiple AR partial objects can be smaller than the AR object before the split. In certain embodiments, the multiple AR partial objects can collectively be approximately equal to the broken AR object. An amount of AR partial objects can be based on an original size of an AR object, a force applied to the AR object during simulation from one or more other AR effects, etc.

A shatter effect 2756 can cause an AR object to have multiple AR partial objects splits from a main AR object, such as AR window 2730 or an AR mirror. The shatter effect 2756 can be a primary effect from the seismic damage or a secondary effect from another AR object forcefully interacting with the original AR object. For example, the AR window 2730 can shatter due directly to the vibrations from a seismic event or from an AR object, such as the AR second painting 2734 or generation of a random AR object, such as an AR branch of a tree, an AR power line, etc., falling through the AR object, such as AR window 2730.

Although FIG. 27 illustrates an example AR earthquake visualization and assessment 2700, various changes may be made to FIG. 27. For example, various components in FIG. 27 may be combined, further subdivided, replicated, omitted, or rearranged and additional components may be added according to particular needs.

Figure 28A:
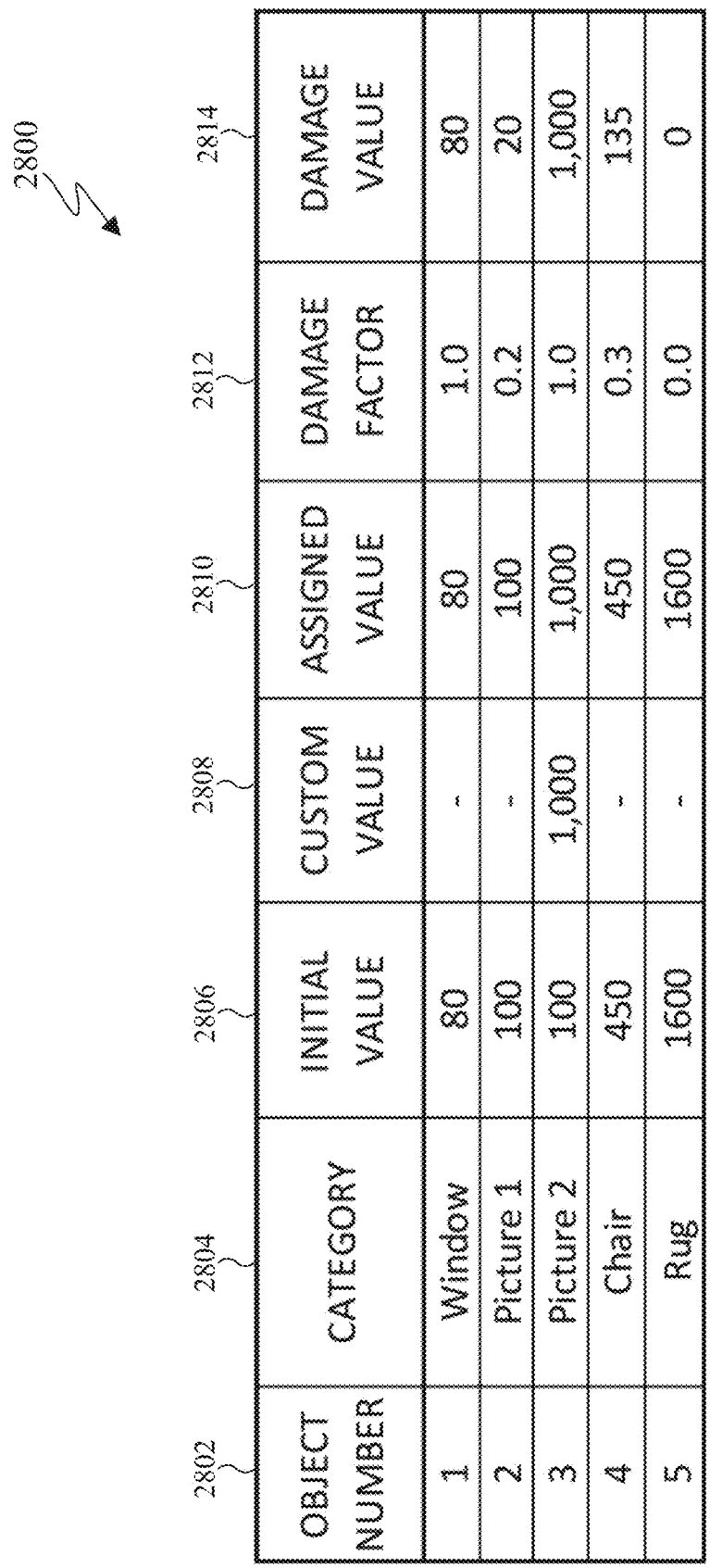
FIGS. 28A and 28B illustrate example inventory tables for objects and backgrounds identified in the scene in accordance with this disclosure.
Figure 28B:
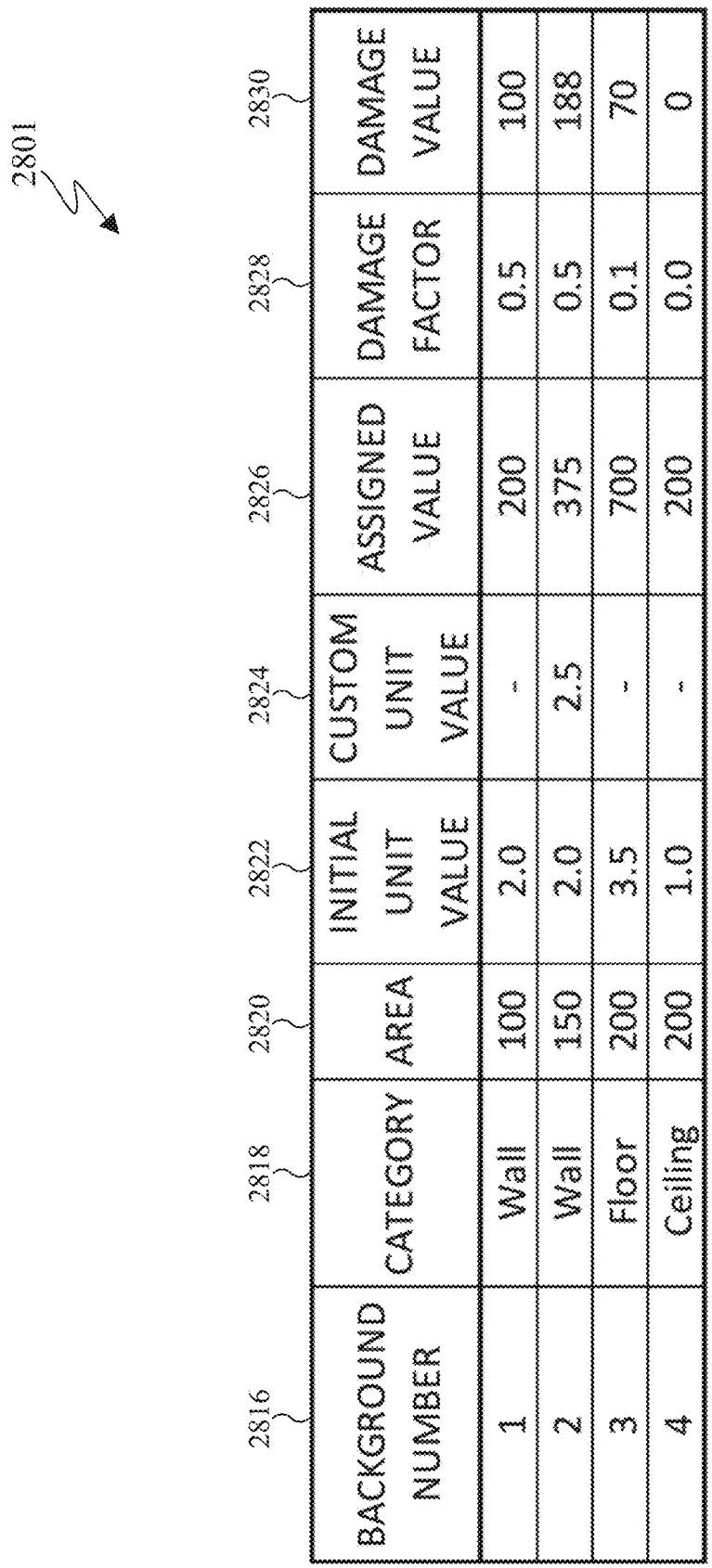

FIG. 28 illustrate an example inventory tables for objects and backgrounds identified in a scene 2702 in accordance with this disclosure. In particular, FIG. 28A illustrates an example object inventory table 2800 and FIG. 28B illustrates an example background inventory table 2801. As shown in FIG. 28A, an object inventory table 2800 can be populated with AR objects identified in a scene scanning process above. The inventory table can include an object number 2802, an object category 2804, an initial value 2806, a custom value 2808, an assigned value 2810, a damage factor 2812, and a damage value 2814. In certain embodiments, a new table can be generated for each newly identified scenes. When a scene identifies a previously scanned scene, the original table corresponding to the previously scanned scene can be amended or added. For instance, the objects added to the previously scanned scene can be added to additional rows of the table. Objects that no longer appear in the previously scanned scene can be removed from the table, a note can be added to the object row in the table, or otherwise marked as no longer in the previously scanned scene.

The object number 2802 can be an ordered number assigned for an object. The object number 2802 can be a unique number for the scanned scene. In certain embodiments, objects in different scenes are given unique object numbers 2802 for any scene that the user device has captured. In certain embodiments, object numbers 2802 can be unique for a specific location. In certain embodiments, each location can have object numbers 2802 assigned as series. For example, the object number 2802 can be four digits and the first two digits are assigned a grouping of scenes and the second two digits are assigned in order for each scene.

The object category 2804 can be a general narrative for the identified object. In order to determine an object category 2804, the user device can compare the captured image to a database of standard objects. In certain embodiments, the identification of the object can be performed by a server sent an image, video, or point cloud of the identified object. The object can be identified by any standard object identification method. The object category 2804 can be identified by the user primarily or secondarily after one or more of the user device and a remote server cannot match a description to the object. The object category 2804 can also provide a fragility characteristic of the object. For example, a vase on a table could provide a description of warning regarding possibility of destruction, damage, secondary damage, etc.

The initial value 2806 can be determined for each of the scanned objects. The processor 1922 can determine an initial value 2806 based on the object category 2804. The initial value 2806 can be a value of an object determined by the user device or the remote server. The initial value 2806 could be a minimum value, a medium value, a mean value, a maximum value, etc. The initial value 2806 could be a wholesale value, a purchase value, a market value, a replacement value, etc.

The custom value 2808 can be input by a user. A prompt could be provided to the user after an AR object is selected for generation on the display. The user could input the custom value 2808 using the physical buttons. The user could provide the custom value 2808 by scanning a barcode or other visual code for identifying an object. In certain embodiments, the custom value 2808 can be entered on another remote user device.

The assigned value 2810 is the value used for totaling a total value of items in a scene. The assigned value 2810 can be determined based on whether a value is entered in the custom value 2808. For example, the assigned value 2810 can be the custom value 2808 when a value is entered for the input value 2808 or the custom value 2808 is greater than 0. The assigned value 2810 can be the initial value 2806 when the custom value 2808 is not entered or the custom value 2808 is approximately equal to 0 or an insignificant value compared to the initial value 2806.

The damage factor 2812 can be a factor related to damage of the object. The damage factor 1812 can be determined based on a threshold level earthquake, a historic level earthquake (for a region), a maximum earthquake, or an earthquake controlled on the display by the user. The damage factor 1812 can be a factor related to an object being considered totally destroyed or a factor of damage where an object is considered destroyed. The damage factor 1812 could be a factor related to a chance that an object is destroyed in an average or low damage producing earthquake. In certain embodiments, a scene 2702 can be scanned following an actual earthquake and the damage factor 2812 can reflect an amount of actual damage of the identified objects. The damage factor can be determined based on the seismic effects applied to the specified object.

The damage value 2814 is a value for the amount of damage cause by the seismic event. The damage value 2814 can be determined based on the seismic effects applied to the specified object. The damage value 2814 can be determined by multiple the assigned value 2810 by the damage factor 2812.

As shown in FIG. 28B, a background inventory table 2801 can be populated with AR backgrounds identified in a scene scanning process above. The inventory table can include a background number 2816, a background category 2818, an area 2820 of the background, an initial unit value 2822, a custom unit value 2824, an assigned value 2826, a damage factor 2828, and a damage value 2830. In certain embodiments, a new table can be generated for each newly identified scenes. When a scene identifies a previously scanned scene, the original table corresponding to the previously scanned scene can be amended or added.

The background number 2816 can be an ordered number assigned for a background. The background number 2816 can be a unique number for the scanned scene. In certain embodiments, background in different scenes are given unique background numbers 2816 for any scene that the user device has captured. In certain embodiments, background number 2816 can be unique for a specific location. In certain embodiments, each location can have background number 2816 assigned as series. For example, the background number 2816 can be four digits and the first two digits are assigned a grouping of scenes and the second two digits are assigned in order for each scene. The background numbers 2816 can also be unique from the object numbers 2802.

The background category 2818 can be a general narrative for the identified background. In order to determine a background category 2818, the user device can compare the captured image to a database of standard backgrounds. In certain embodiments, the identification of the background can be performed by a server sent an image, video, or point cloud of the identified background. The background can be identified by any standard background identification method. The background category 2818 can be identified by the user primarily or secondarily after one or more of the user device and a remote server cannot match a description to the background.

The background area 2820 is an area of the background in the scene. The processor 1922 can determine the background area 2820 during the scanning process. A time of flight camera can capture edges of a background, such as a wall, and calculate a total size for the background area 2820. The background area 2818 can be any standard measurements units.

The initial unit value 2822 can be determined for each of the scanned backgrounds. The processor 1922 can determine an initial unit value 2822 based on the background category 2818. The initial unit value 2822 can be a value per measurement unit of the background area 2820. The initial unit value 2822 can be a value of a background determined by the user device or the remote server. The initial unit value 2822 could be a minimum value, a medium value, a mean value, a maximum value, etc.

The custom unit value 2824 can be input by a user. A prompt could be provided to the user after an AR background is selected for generation on the display. The user could input the custom unit value 2824 using the physical buttons. The user could provide the custom unit value 2824 by scanning a barcode or other visual code for identifying a background. In certain embodiments, the custom unit value 2824 can be entered on another remote user device.

The assigned value 2826 is the value used for totaling a total value of items in a scene. For the background assigned value 2826, the value is a total of the initial unit value 2822 or custom unit value 2824 multiplied by the background area 2820. The assigned value 2826 can be determined based on whether a value is entered in the custom unit value 2824. For example, the assigned value 2826 can be the custom value 2824 when a value is entered for the custom value 2824 or the custom value 2824 is greater than 0. The assigned value 2810 can use the initial unit value 2822 when the custom unit value 2808 is not entered or the custom unit value 2824 is approximately equal to 0 or an insignificant value compared to the initial unit value 2822.

The damage factor 2812 can be a factor related to damage of the background. The damage factor 1812 can be determined based on a threshold level earthquake, a historic level earthquake (for a region), a maximum earthquake, or an earthquake controlled on the display by the user. The damage factor 1812 can be a factor related to an object being considered totally destroyed or a factor of damage where an object is considered destroyed. The damage factor 1812 could be a factor related to a chance that an object is destroyed in an average or low damage producing earthquake. In certain embodiments, a scene 2702 can be scanned following an actual earthquake and the damage factor 2812 can reflect an amount of actual damage of the identified backgrounds. The damage factor can be determined based on the seismic effects applied to the specified background.

The damage value 2814 is a value for the amount of damage cause by the seismic event. The damage value 2814 can be determined based on the seismic effects applied to the specified background. The damage value 2814 can be determined by multiple the assigned value 2810 by the damage factor 2812.

Although FIGS. 28A and 28B illustrate example inventory tables for objects and backgrounds identified in a scene 2702, various changes may be made to FIGS. 28A and 28B. For example, various components in FIGS. 28A and 28B may be combined, further subdivided, replicated, omitted, or rearranged and additional components may be added according to particular needs.

Figure 29:
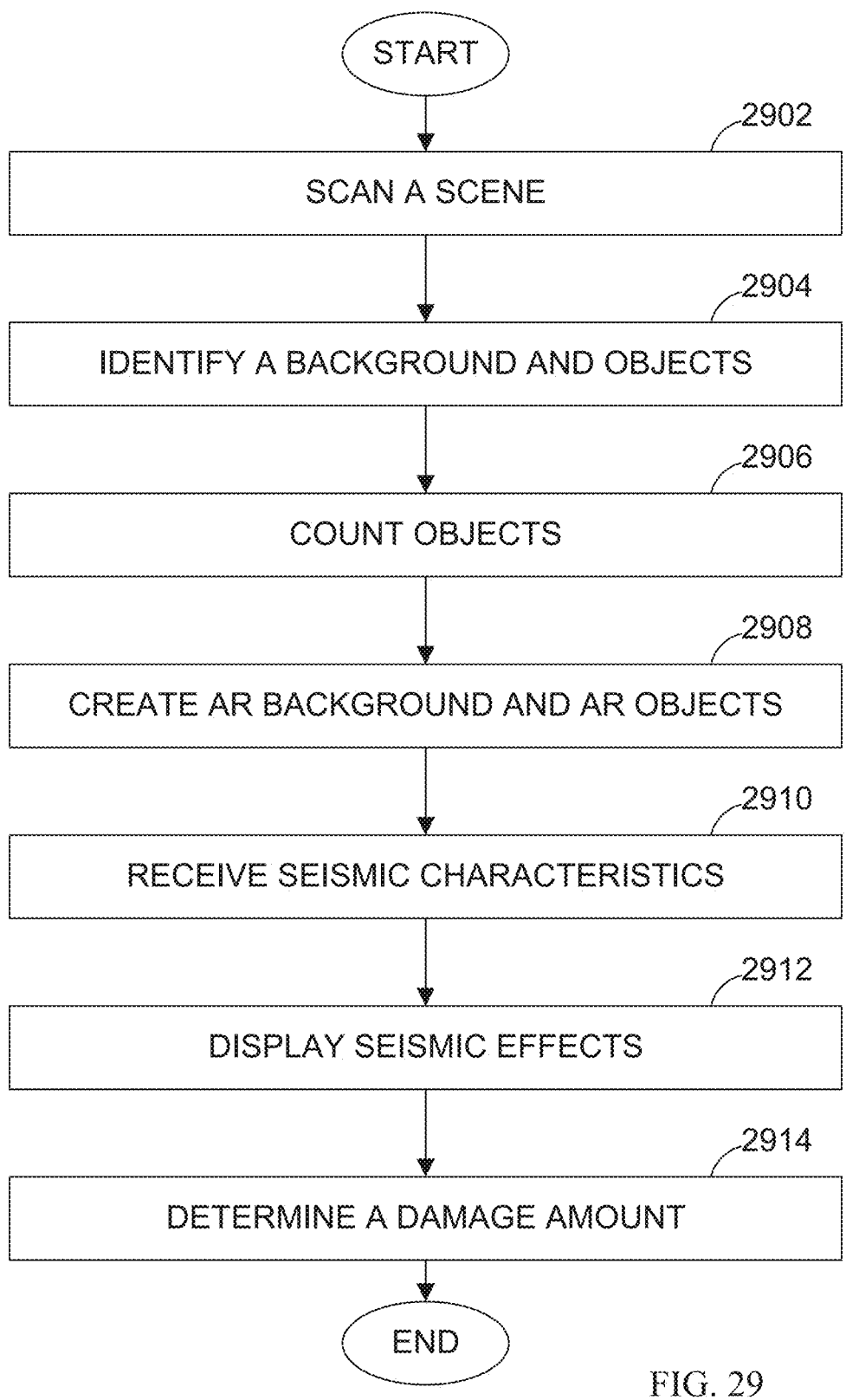
FIG. 29 illustrates an example method for an AR earthquake visualization and assessment process in accordance with this disclosure.

FIG. 29 illustrates an example method for an AR earthquake visualization and assessment process 2900 in accordance with this disclosure. As shown in FIG. 29, the processor 1922 can scan a scene 2702 using an optical recognition method in operation 2902. In certain embodiments, the scene 2702 can be an interior of a room and one or more walls 2706 of the room can be scanned. The user device 1914 can further include a time-of-flight camera 1916 or Lidar sensor, which the processor 1922 can operate to scan the one or more walls 2706, ceilings and/or floors 2708 of the room. The processor 1922 can determine a distance to different points on the wall 2706, ceiling and/or floor 2708 using Lidar. In some embodiments, the operation 2902 includes detecting planes in the scene 2702 using the depth information from the optical camera and/or Lidar camera 1916. In some embodiments, the detecting planes in the scene 2702 of operation 2902 further includes determining, using the depth information from scan, that planes detected in the scene 2702 are one or more walls 2706, ceilings and/or floors 2708 present in the scene 2702. In some embodiments, the determining that planes detected in the scene 2702 are one or more walls 2706, ceilings and/or floors 2708 present in the scene 2702 further comprises using 3-D camera position information or 6-D camera position and orientation information in association with the depth information.

The processor 1922 can also operate the camera 1916 to capture the wall 2706, ceiling or floor 2708 as an orientation of the user device 1914 is rotate and moved around the room. One or more sensors of the user device 1914 can capture details for determining a camera pose for the camera 1916 as each frame of the wall 2706, ceiling or floor 2708 is captured. The camera pose can be saved along with the Lidar information or each could be stored separately with a respective time stamp to match.

The processor 1922 can identify a background and objects in a scene 2702 in operation 2904. The processor 1922 can scan the scene 2702 for meshes. The meshes can be defined and/or categorized by the processor 1922. The meshes can also be associated with a specified plane or specified planes by the processor 1922. Meshes can be associated with objects in the scene in addition to a background. For example, meshes can be defined as part of a wall and part of one or more picture frames on the wall. In order to identify backgrounds, the processor 1922 can assign one or more meshes from a region to the plane. The processor 1922 can use the extracted camera image to determine a plane for each of the meshes. The meshes can be classified and associated with a specified plane by the processor 1922.

The processor 1922 can extract object suggestions from the mesh. The processor 1922 can identify meshes corresponding to one or more objects in the scene 2702. The meshes of different objects in the scene can overlap and the processor 1922 can distinguish different objects. The processor 1922 can extract objects from the mesh belonging to a selected scene. Meshes that are not assigned to one or more of the planes, backgrounds, walls, etc. can be determined by the processor to be objects. The objects can be individually processed by the processor 1922 for details of the objects, such as dimensions, orientation, position, etc.

The processor 1922 can count the objects in operation 2906. Counting the objects can include taking an inventory of the objects in the scene 2702 and placing the information in an inventory table 2800. The objects can be assigned an object number 2802 that can be used to relate a row on the table to an AR object by the processor 1922. A description 2804 of the objects can be determined while counting. The description 2804 of the objects can allow a user to quickly and easily determine which row corresponds to a specific AR object or object in a scene. The description 2804 can include a name of the object, a position of the object, characteristics of the object, etc. The counting of the objects can also include an accounting of the objects and an estimated value 2806 or other value can be determined.

The processor 1922 can create one or more AR backgrounds and one or more AR objects from the background and objects identified in the scene 2702 in operation 2908. The processor 1922 can extract a color of a selected plane. In certain embodiments, the user device 914 can receive an input from a user for selecting a color of the selected plane, such as a tap on the display 1920 of the user device 1914. The camera can provide a camera image and the processor 1922 can determine a location in the camera image corresponding to a location of the tap on the display 1920. The processor 1922 can determine a color at the location in the camera image to extract. In certain embodiments, the processor 1922 can extract a color based on other factors, such as amount of the color in the scene, an average color of the wall, etc. The processor 1922 can set a color for a mesh according to the extracted color. The processor 1922 can take the extracted color and apply the color to the mesh corresponding to the background of the scene. In certain embodiments, the processor 1922 can apply the extracted color to a wall, a floor, and/or a ceiling in a room.

The processor 1922 can extract images for an object in a camera frame. The processor 1922 can extract one or more camera images supplied by the AR camera. The camera images can be continuously captured based on movement of the AR camera in order to capture the object from different angles. In certain embodiments, the processor 1922 can capture camera images including one or more picture frames. The processor 1922 can determine that vertexes of the objects are clearly visible in the camera frame in operation 2126. Using the AR camera, the processor 1922 can identify each vertex of an object shown in the camera image. Camera images where the object is only partially in the camera image can be skipped or used for clearly identified vertexes. The processor 1922 can extract an image corresponding to the object in operation 2128. The details of the objects can be used by the processor 1922 to identify an actual object in the camera image and extract a partial image for the actual object. For example, the processor 1922 can identify a picture frame in one or more camera images and make sure that all the corners of the picture frame are clearly visible in each camera image. The processor 1922 can instantiate selected objects in operation 2130. The processor 1922 can overlay the actual image of the object over the corresponding meshes associated with the object in the AR scene. For example, an actual image of a picture frame can be overlaid over meshes associated with the picture frame.

The processor 1922 can receive seismic characteristics in operation 2910. The seismic characteristics can be received from a user, read from a memory of the user device, received from another user device, received from a remote server. For example, seismic characteristics or seismic algorithm can be stored in a memory of the user device. The user can be presented an input, such as a slider, to control a seismic characteristic, such as a seismic intensity. The slider values can be controls for a parameter or attribute of the seismic activity. For example, the slider can control an intensity, a time period, etc. Additional parameters or attributes of the seismic activity not controlled by a slider can have values entered prior to the simulation or read from a memory 1918. The processor 1922 can show a slider or other mechanism for selecting the parameter value or attribute of the seismic activity on the display 1920. In certain embodiments, the slider can control a current intensity and seismic activity would continuously occur at the selected current intensity until the current intensity is set to zero on the slider. In some embodiments, a touch-screen or physical buttons, voice commands or other inputs can be used for entering parameters or attributes of the seismic activity instead of, or in addition to, the slider.

The processor 1922 can display seismic effects based on the seismic characteristics in operation 2912. The processor 1922 can generate simulated (e.g., AR) seismic activity for the scene in operation 2020. The AR seismic activity can be shown to the user through the display 1920 of the user device 1914. The AR seismic activity can cause the portion of the AR background that is currently visible to shift in the frame of view on the display 1920. The edge of the background can be moved in and out of the frame in the display according to the one or more slider values.

The processor 1922 can display simulated (i.e., AR) cracks in the AR background shown on the display 1920 based on the slider value in operation 2022. In some embodiments, the processor 1922 can dynamically generate AR cracks in the AR background during a simulated seismic event, i.e., the cracks may grow in length or width as the seismic event progresses. In some embodiments, the processor 1922 can create a random number of AR cracks with varying paths, widths and/or depths based on the slider value in operation 2022. In some embodiments, the processor 1922 can generate AR cracks featuring parallax shading to give the cracks the appearance of three-dimensional depth and width based on the point of view. The selected intensity of the of the simulation can be a factor for the crack generation. The crack generation can also be determined based on an amount of time that has passed and/or a total time of the simulation. For example, additional cracks may be formed as the time of the simulated seismic activity continues. In addition, the dimension of the cracks can change over time and based on the factors of the seismic activity.

In operation 2024, the processor 1922 can move or manipulate an AR object (i.e., the virtual representation of the object) shown on the display 1920 during a simulation of a seismic event. In some embodiments, the processor 1922 may determine the type of a movement or a manipulation to be applied to an AR object based on one or more seismic characteristics input by the user or received from the system. In some embodiments, the processor 1922 may determine the type of a movement or a manipulation to be applied to an AR object based on the category of like objects into which the object has been classified. In some embodiments, the processor 1922 may determine the type of a movement or a manipulation to be applied to an AR object based on specified or sensed characteristics of the AR object including, but not limited to the object's mass, size and/or material. In some embodiments, the processor 1922 may determine the type of a movement or a manipulation to be applied to the AR object by applying a combination of the factors described above. Types of movements of the AR object that may be applied by the processor 1922 and shown on the display 1920 include, but are not limited to, translation, rotation, oscillation, falling and rolling. Type of manipulations of the AR object that may be applied by the processor 1922 and shown on the display 1920 include, but are not limited to, cracking, breaking, burning, leaking, sparking and soiling. For example, if an object in the scene is classified as a type of object that may be manipulated with "oscillation," the processor 1922 can show the AR object swinging back and forth about a hinge point during the seismic event, and the magnitude of the swinging may be selected based on a seismic characteristic set by the slider value and/or on a characteristic of the object, such as its size. The virtual representation of the object can swing in relation to the background of the scene. In addition, if there are multiple AR objects in a scene, each virtual representation may swing independently from other virtual representations. In certain embodiments, a virtual representation of a picture frame can swing on a wall. While the virtual representation is swinging, the actual object is obscured by the wall set as a background in order for the swinging motion to not be disrupted by the actual picture frame.

In operation 2026, the processor 1922 can apply secondary manipulation types to the AR objects during a simulation of a seismic event. A secondary manipulation can be any manipulation that is applied only when predetermined conditions are met during a simulated seismic event. For example, if the AR object has a primary manipulation type of "oscillation" during a seismic event, the AR object may have a secondary manipulation type of "fall" if the magnitude of the shaking exceeds a preselected level, or if the shaking duration exceeds a preselected period. Thus, the processor 1922 will initially show the AR object oscillating (i.e., swinging) during a simulated seismic event, but will only show the AR object falling if the preselected conditions are met. If the preselected conditions are not met, the AR object will continue swinging according to the primary manipulation type. In some embodiments, the processor 1922 may show the virtual representation of the object fall to the floor based on a highest slider value in operation 2026. The virtual representation of the object can realistically drop to the floor using standard physics for a falling motion of the virtual representation. When the virtual representation of the object reaches another object or a ground level, the virtual representation can react with the other object or the ground level. For instance, a force could be applied to the other object based on the virtual representation dropping to the floor. The virtual representation can break or crack by the processor 1922 dividing the virtual representation into two or more part virtual representations. For instance, a picture frame can reach the ground level and cause a crack through the picture frame creating two separate parts of the picture frame. The two parts of the picture frame may operate independently for a remaining time of the simulation.

The virtual representation and background can be shaken independently. For example, a first picture frame can move independently from a second picture frame and a wall. The processor 1922 can create a set of parent coordinate transforms in an application, such as Unity. The parent transform can be an intermediate coordinate system between the world coordinate and children coordinates. The processor 1922 can set all submeshes from all regions that have a first face classification, such as "floor", to a first transform (also referred to as a parent transform) and all submeshes from all regions that have a second classification, such as "wall", to a second transform (also referred to as a child transform). The processor 1922 can set meshes that belong to a plane selected by a User as well as a plane with render cracks to a third transform. The processor 1922 can apply separate random shaking to each of the parent transforms. Parent meshes ensure that a position of the sub meshes with respect to the parent transform remain constant. However, the position of the parent transform with respect to the world is allowed to change. This allows all meshes assigned to a common classification to move together.

The shaking and falling of objects, such as picture frames, can be performed by implementing Rigid body mechanics using a physic engine, such as a Unity Physics Engine. The selected wall plane and each picture frame can be assigned rigid body functionalities, which allows the objects to interact with each other in forms such as collisions, forces, constraints, and accelerations. The physics engine can provide functions that allow rigid bodies to relate to each other in a form of constraints. The physic engine can then iteratively solve multi-body simulation to give a next position of the rigid bodies given external forces. The overall steps for this procedure can include (1) assigning rigid bodies to a picture frame and a wall mesh, and (2) adding a revolute hinge joint constraint between picture frame and wall mesh.

The processor 1922 can determine a damage amount 2812 for the scene 2702 in operation 2914. The damage amount 2812 can be calculated as the simulation is in progress and/or after the simulation of seismic activity is completed. The damage amount 2812 can be calculated as a percentage, fraction, value, etc. The damage amount 2812 can be individually calculated for each AR object. The processor 1922 can utilize specific effects applied to an object and an intensity of the effect applied. For instance, an object that falls twice a distance as a similar object could be determined to have more damage. The processor 1922 can also determine a fragility of an object. For example, the processor 1922 can assign more damage to a vase falling an equal distance to a book.

Although FIG. 29 illustrates an example method for an AR earthquake visualization and assessment process 2900, various changes may be made to FIG. 29. For example, while shown as a series of steps, various steps in FIG. 29 may overlap, occur in parallel, occur in a different order, or occur any number of times.

It will be appreciated by those skilled in the art having the benefit of this disclosure that these methods and systems for display of an electronic representation of physical effects and property damage resulting from a parametric natural disaster event provides an augmented reality presentation of the personalized effect of an earthquake on actual objects around a user. It should be understood that the drawings and detailed description herein are to be regarded in an illustrative rather than a restrictive manner, and are not intended to be limiting to the particular forms and examples disclosed.

On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for displaying an augmented reality (AR) representation of physical effects and property damage resulting from a parametric earthquake event, comprising:
    scanning, using one or more sensors of a user device, a scene in proximity to an electronic device;
    identifying, in the scene, a background and objects between the background and the electronic device;
    creating an AR background for the background of the scene and a respective AR object for each of the objects in the scene;
    displaying, on a display of the electronic device, the AR background and the respective AR objects overlaid over the background and objects identified by the electronic device;
    receiving at least one seismic characteristic from a user of the user device; and
    adjusting the displayed AR objects and the displayed AR background in the scene using at least one seismic effect based on the at least one received seismic characteristic.

2. A method in accordance with claim 1, further comprising:
    displaying the AR background overlaid over the object in the scene when the respective AR object is moved due to the at least one seismic effect.

3. A method in accordance with claim 1, wherein displaying the at least one seismic effect on the AR objects comprises:
    applying a first seismic effect independently on the AR objects and a second seismic effect on the AR background based on the at least one receive seismic characteristic, wherein the first seismic effect is different from the second seismic effect.

4. A method in accordance with claim 1, wherein the at least one seismic characteristic is received using a slider on the display of the electronic device.

5. A method in accordance with claim 4, wherein the slider is configured to control a current intensity value of the at least one seismic effect on the AR objects.

6. A method in accordance with claim 5, further comprising:
    receiving an adjustment of the slider while the at least one seismic effects is applied to the AR object; and
    adjusting the at least one seismic effects based on the adjustment of the current intensity value of the slider.

7. A method in accordance with claim 5, wherein the at least one seismic effect applied to the AR object when the current intensity value is below a threshold is different than when the current intensity value is at and above the threshold.

8. A non-transitory computer readable medium, for displaying an augmented reality (AR) representation of physical effects and property damage resulting from a parametric earthquake event, containing instructions that when executed cause a processor to:
    scan, using one or more sensors of a user device, a scene in proximity to an electronic device;
    identify, in the scene, a background and objects between the background and the electronic device;
    create an AR background for the background of the scene and a respective AR object for each of the objects in the scene;
    display, on a display of the electronic device, the AR background and the respective AR objects overlaid over the background and objects identified by the electronic device;
    receive at least one seismic characteristic from a user of the user device; and
    adjust the displayed AR objects and the displayed AR background in the scene using at least one seismic effect based on the at least one received seismic characteristic.

9. A non-transitory computer readable medium in accordance with claim 8, wherein the instructions when executed further cause the processor to:
    display the AR background overlaid over the object in the scene when the respective AR object is moved due to the at least one seismic effect.

10. A non-transitory computer readable medium in accordance with claim 8, wherein the instructions when executed cause the processor to display the at least one seismic effect on the AR objects comprise instructions that when executed cause the processor to:
    apply a first seismic effect independently on the AR objects and a second seismic effect on the AR background based on the at least one receive seismic characteristic, wherein the first seismic effect is different from the second seismic effect.

11. A non-transitory computer readable medium in accordance with claim 8, wherein the at least one seismic characteristic is received using a slider on the display of the electronic device.

12. A non-transitory computer readable medium in accordance with claim 11, wherein the slider is configured to control a current intensity value of the at least one seismic effect on the AR objects.

13. A non-transitory computer readable medium in accordance with claim 12, wherein the instructions when executed further cause the processor to:
    receive an adjustment of the slider while the at least one seismic effects is applied to the AR object; and
    adjust the at least one seismic effects based on the adjustment of the current intensity value of the slider.

14. A non-transitory computer readable medium in accordance with claim 12, wherein the at least one seismic effect applied to the AR object when the current intensity value is below a threshold is different than when the current intensity value is at and above the threshold.

15. A method for displaying an augmented reality (AR) representation of physical effects and property damage resulting from a parametric earthquake event, comprising:
    scanning, using one or more sensors of a user device, a scene in proximity to an electronic device;
    identifying, in the scene, a background and objects between the background and the electronic device;
    identifying classifications or characteristics of the objects;
    creating an AR background for the background of the scene;
    creating a respective AR object for each of the objects in the scene based on the identified classifications or identified characteristics of the objects;

displaying, on a display of the electronic device, the AR background and the respective AR objects overlaid over the background and objects identified by the electronic device;

receiving at least one seismic characteristic from a user of the user device;

adjusting the displayed AR objects and the displayed AR background in the scene using at least one seismic effect based on the at least one received seismic characteristic; and transmitting the respective AR objects with associated identified classifications or associated identified characteristics of the objects to an external database.

16. A method in accordance with claim 15, wherein the identified classification of at least one of the objects includes a type of object.

17. A method in accordance with claim 15, wherein the identified characteristics of at least one of the objects includes dimensions of the object.

18. A method in accordance with claim 15, wherein the identified characteristics of at least one of the objects includes a user input value of the object.

19. A method in accordance with claim 15, wherein the identified characteristics of at least one of the objects includes an object mass, an object size, and an object material.

20. A method in accordance with claim 15, wherein the identified classification of at least one of the objects includes a category for the object.

\* \* \* \* \*